United States Patent
Baek et al.

(10) Patent No.: US 10,645,566 B2
(45) Date of Patent: May 5, 2020

(54) METHOD AND APPARATUS FOR ACCESSING CELLULAR NETWORK FOR SIM PROFILE

(71) Applicant: Samsung Electronics Co., Ltd., Gyeonggi-do (KR)

(72) Inventors: Youngkyo Baek, Seoul (KR); Duckey Lee, Seoul (KR); Jonghan Park, Bucheon-si (KR); Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/642,197

(22) Filed: Jul. 5, 2017

(65) Prior Publication Data

US 2018/0014178 A1 Jan. 11, 2018

(30) Foreign Application Priority Data

Jul. 5, 2016 (KR) .................. 10-2016-0085051
Aug. 2, 2016 (KR) .................. 10-2016-0098649

(51) Int. Cl.
*H04W 8/18* (2009.01)
*H04W 8/26* (2009.01)
(Continued)

(52) U.S. Cl.
CPC ............. *H04W 8/183* (2013.01); *H04W 8/20* (2013.01); *H04W 8/265* (2013.01);
(Continued)

(58) Field of Classification Search
CPC ....... H04W 8/183; H04W 8/20; H04W 8/205; H04W 12/08; H04W 4/005; H04W 12/06;
(Continued)

(56) References Cited

U.S. PATENT DOCUMENTS 8,965,366 B1    2/2015    Somayajula et al.
9,378,043 B1    6/2016    Zhang et al.
(Continued)

FOREIGN PATENT DOCUMENTS

WO    2015042189 A1    3/2015
WO    2016093758 A1    6/2016

OTHER PUBLICATIONS

Communication from Related Application; U.S. Appl. No. 15/641,640; Final Office Action dated Feb. 23, 2018; 18 pages.
(Continued)

*Primary Examiner* — Jianxun Yang

(57) ABSTRACT

The present disclosure relates to a communication technique that combines a 5G communication system for supporting a data rate that is higher than that of a beyond 4G system with IoT technology, and a system thereof. The present disclosure may be applied to intelligent services on the basis of 5G communication technology and IoT related technology, such as smart home, smart building, smart city, smart car or connected car, health care, digital education, retail, security and safety related services. Disclosed is a method for causing a cellular network itself to receive provisioning of a SIM profile to make it possible to use a normal cellular network service.

20 Claims, 38 Drawing Sheets

(51) Int. Cl.
*H04W 8/20* (2009.01)
*H04W 60/00* (2009.01)
*H04B 1/3816* (2015.01)
*H04W 84/04* (2009.01)

(52) U.S. Cl.
CPC ........... *H04B 1/3816* (2013.01); *H04W 8/205* (2013.01); *H04W 60/00* (2013.01); *H04W 84/042* (2013.01)

(58) Field of Classification Search
CPC ......... H04W 4/001; H04W 8/24; H04W 8/18; H04W 8/265; H04B 1/3816; G06F 21/313; G06F 21/41; G06F 2221/2117; H04L 41/0803; H04L 67/34
See application file for complete search history.

(56) References Cited

U.S. PATENT DOCUMENTS

| | | | |
|---|---|---|---|
| 9,392,457 | B2 | 7/2016 | Laden et al. |
| 2010/0061386 | A1 | 3/2010 | Olsson et al. |
| 2010/0272115 | A1 | 10/2010 | Ramankutty |
| 2010/0278108 | A1 | 11/2010 | Cho et al. |
| 2011/0268086 | A1 | 11/2011 | Liang et al. |
| 2012/0063464 | A1 | 3/2012 | Mehta |
| 2012/0135713 | A1 | 5/2012 | Lee et al. |
| 2012/0207104 | A1 | 8/2012 | Liang et al. |
| 2013/0157673 | A1* | 6/2013 | Brusilovsky ............ H04W 4/70 455/450 |
| 2015/0163056 | A1* | 6/2015 | Nix ....................... H04L 9/0869 380/46 |
| 2015/0208291 | A1 | 7/2015 | Lee et al. |
| 2015/0304988 | A1 | 10/2015 | Jin |
| 2015/0312873 | A1 | 10/2015 | Cormier et al. |
| 2015/0359026 | A1 | 12/2015 | Iwai et al. |
| 2016/0127132 | A1 | 5/2016 | Lee et al. |
| 2016/0142855 | A1* | 5/2016 | Yu ........................... H04W 4/70 455/419 |
| 2016/0174065 | A1 | 6/2016 | Li et al. |
| 2016/0227471 | A1 | 8/2016 | De Foy et al. |
| 2017/0041733 | A1* | 2/2017 | Babbage ............... H04W 8/205 |
| 2017/0289788 | A1* | 10/2017 | Lalwaney ........... H04L 41/0803 |
| 2017/0318450 | A1 | 11/2017 | Salkintzis |
| 2017/0359768 | A1 | 12/2017 | Byun et al. |
| 2019/0268757 | A1* | 8/2019 | Yi ........................ H04W 8/205 |

OTHER PUBLICATIONS

International Search Report, dated Oct. 20, 2017, regarding International Application No. PCT/KR2017/007163, 3 pages.
International Search Report, dated Oct. 30, 2017, regarding International Application No. PCT/KR2017/007167, 3 pages.
Office Action, regarding U.S. Appl. No. 15/641,640, dated Sep. 22, 2017, 26 pages.
European Patent Office, "Supplementary European Search Report," Application No. EP17824528.8, dated Dec. 21, 2018, 11 pages.
3GPP TR 33-812 V9.2.0 (Jun. 2010), Technical Report, 3rd Generation Partnership Project; Technical Specification Group Services and System Aspects; Feasibility study on the security aspects of remote provisioning and change of subscription for Machine to Machine (M2M) equipment (Release 9), Jun. 2010, 87 pages.
Supplementary European Search Report dated Mar. 26, 2019 in connection with European Patent Application No. 17 82 4526, 12 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.7.0 (Jun. 2016), 372 pages.
"3rd Generation Partnership Project; Technical Specification Group Services and System Aspects; Study on Architecture for Next Generation System (Release 14)", 3GPP TR 23.799 V0.5.0 (May 2016), 179 pages.

* cited by examiner

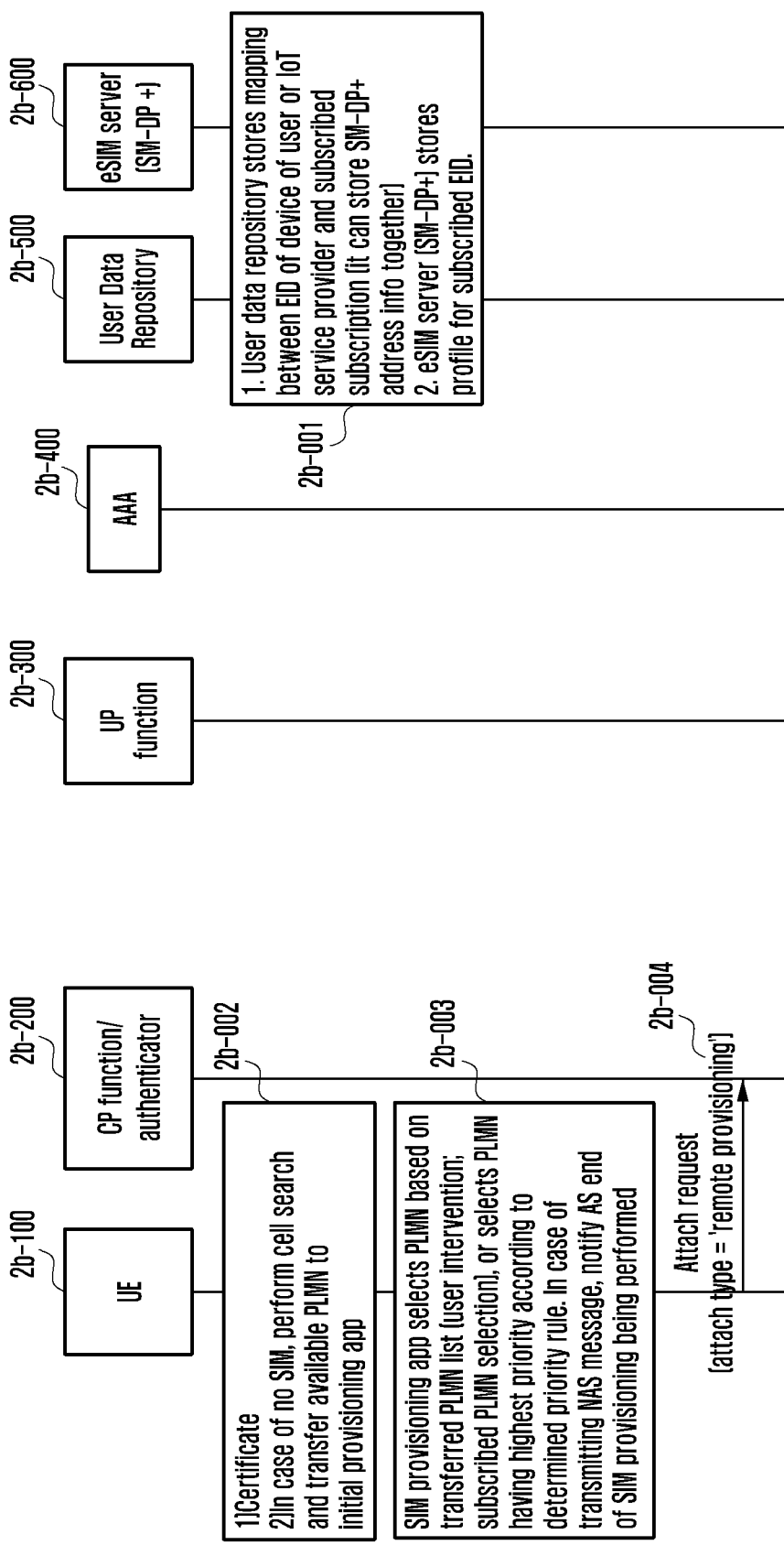

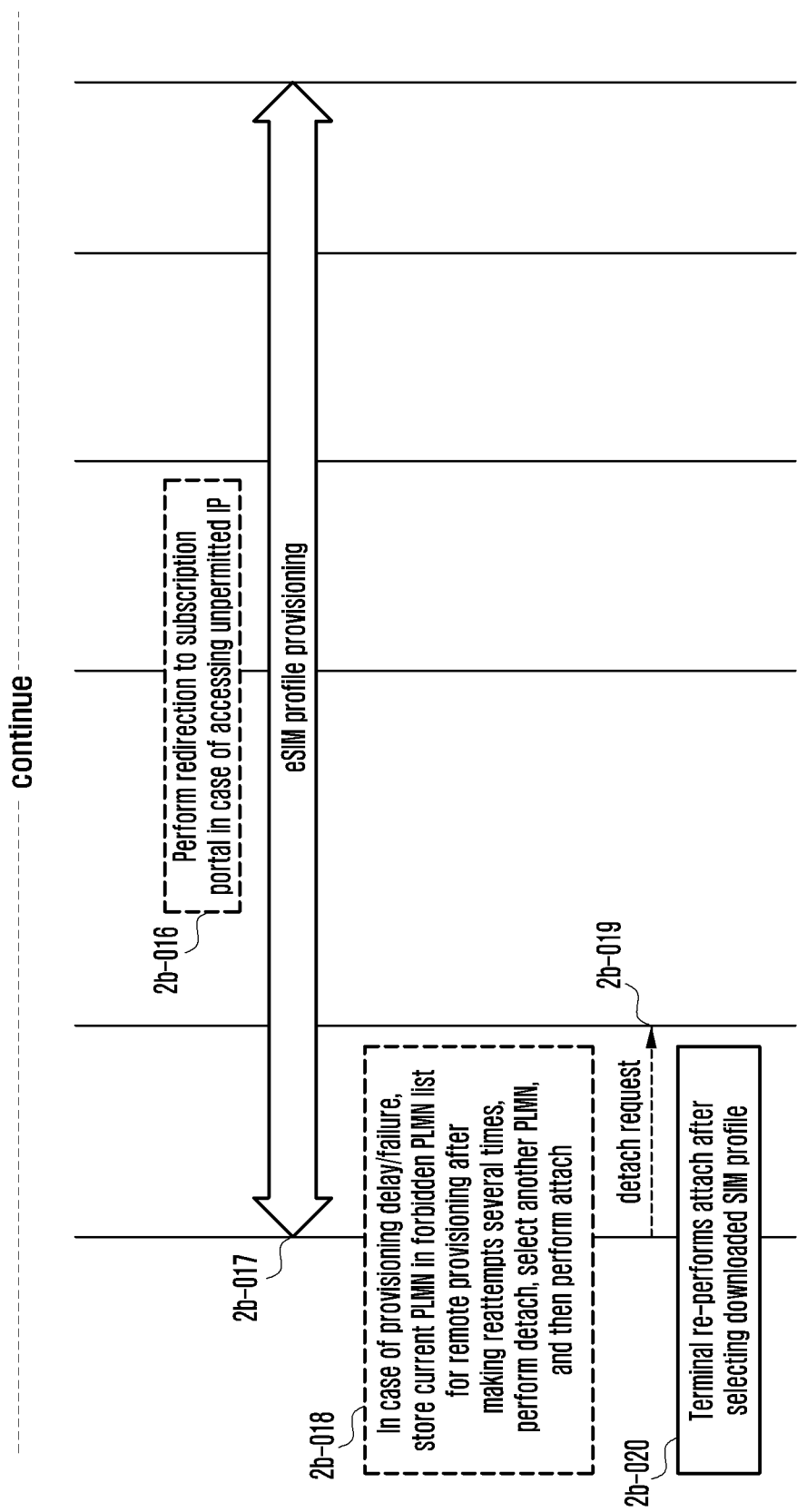

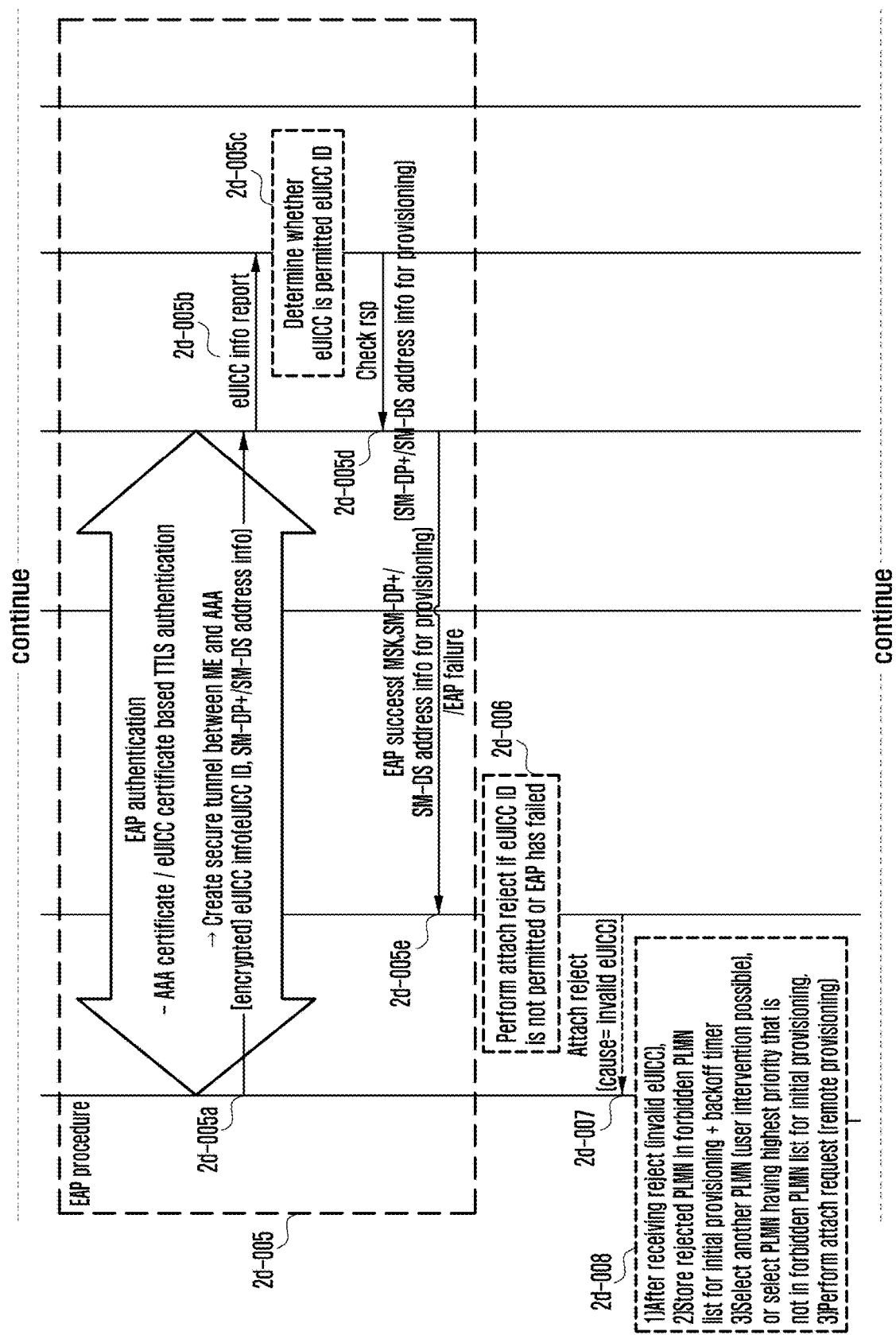

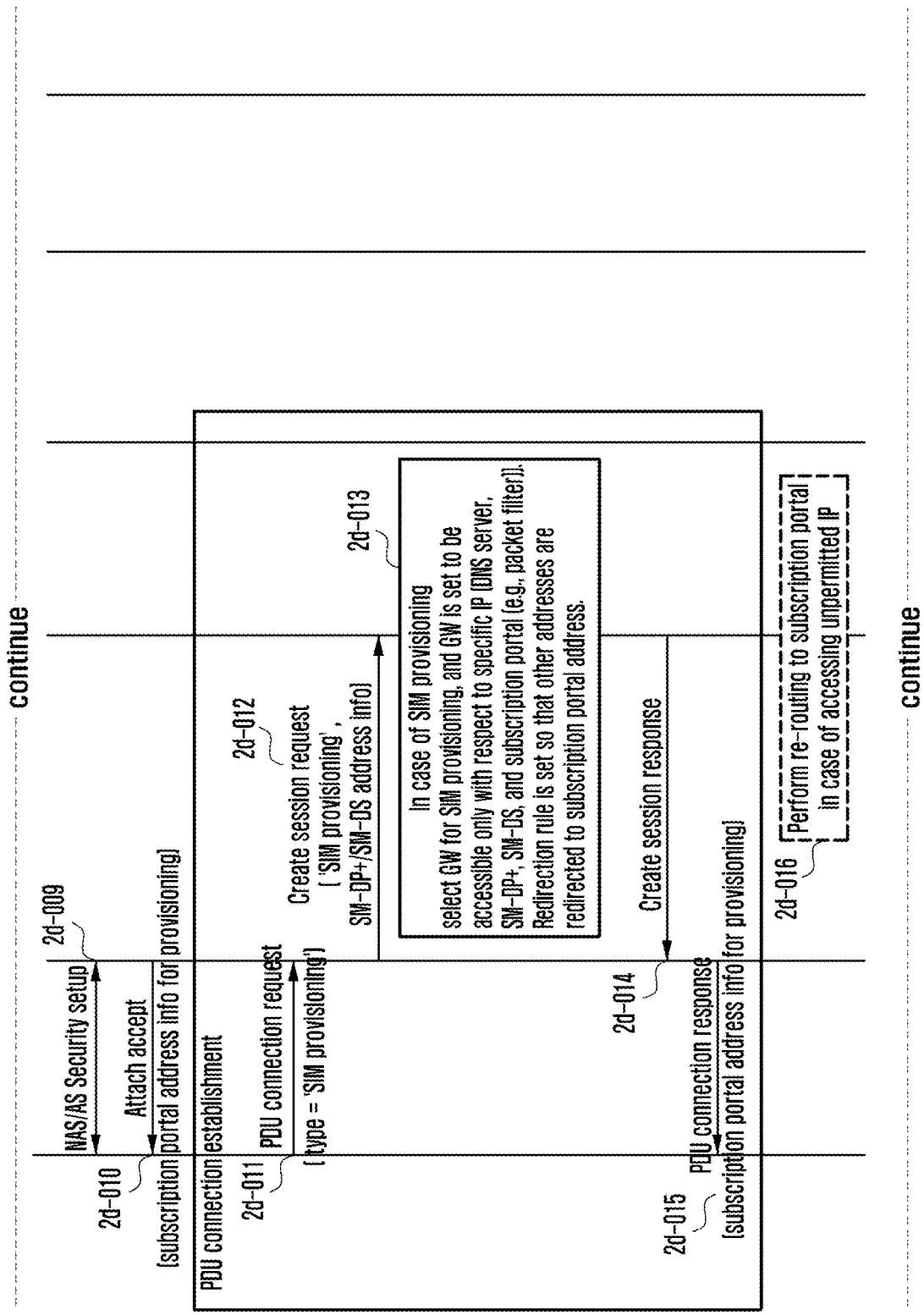

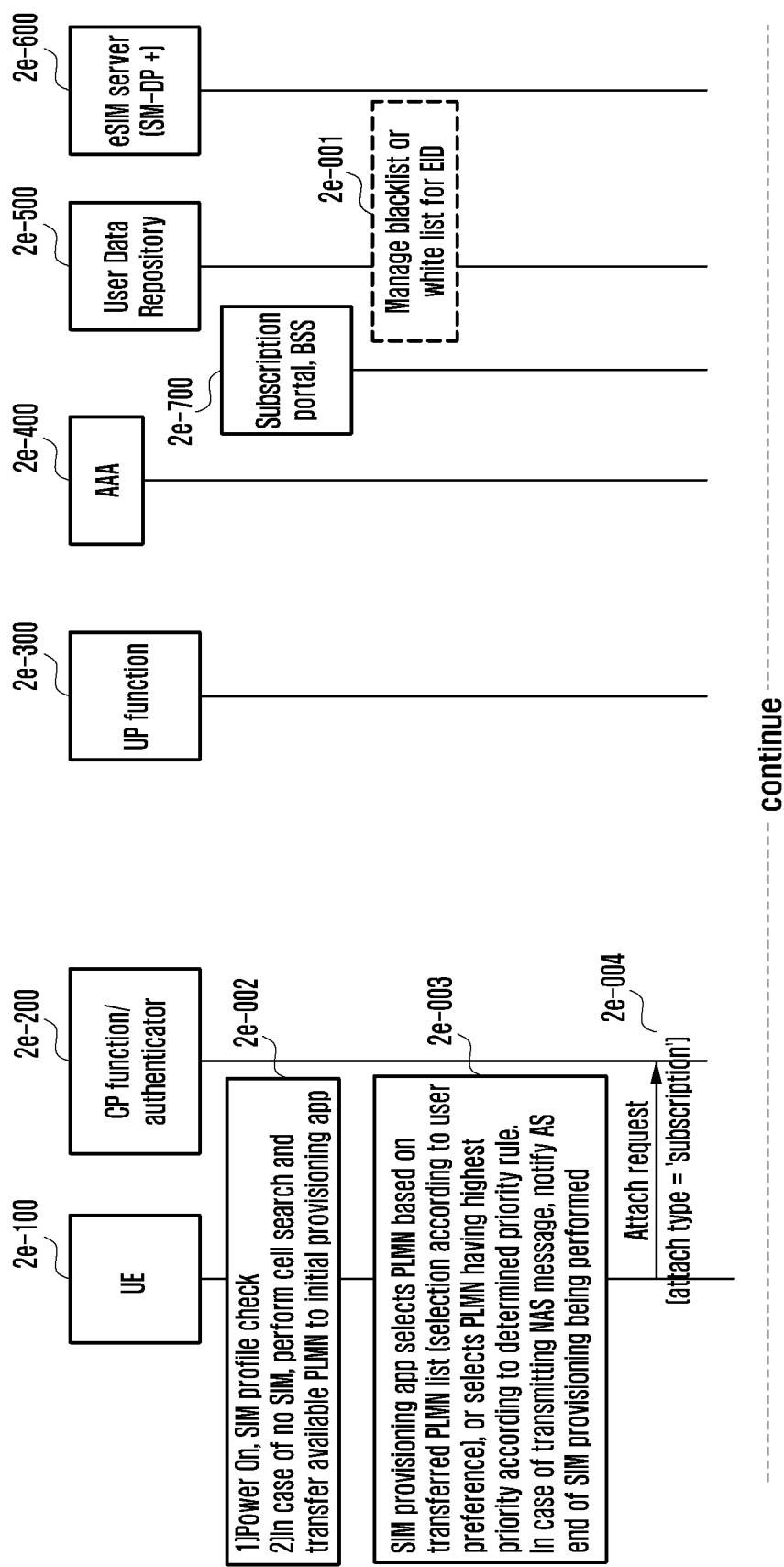

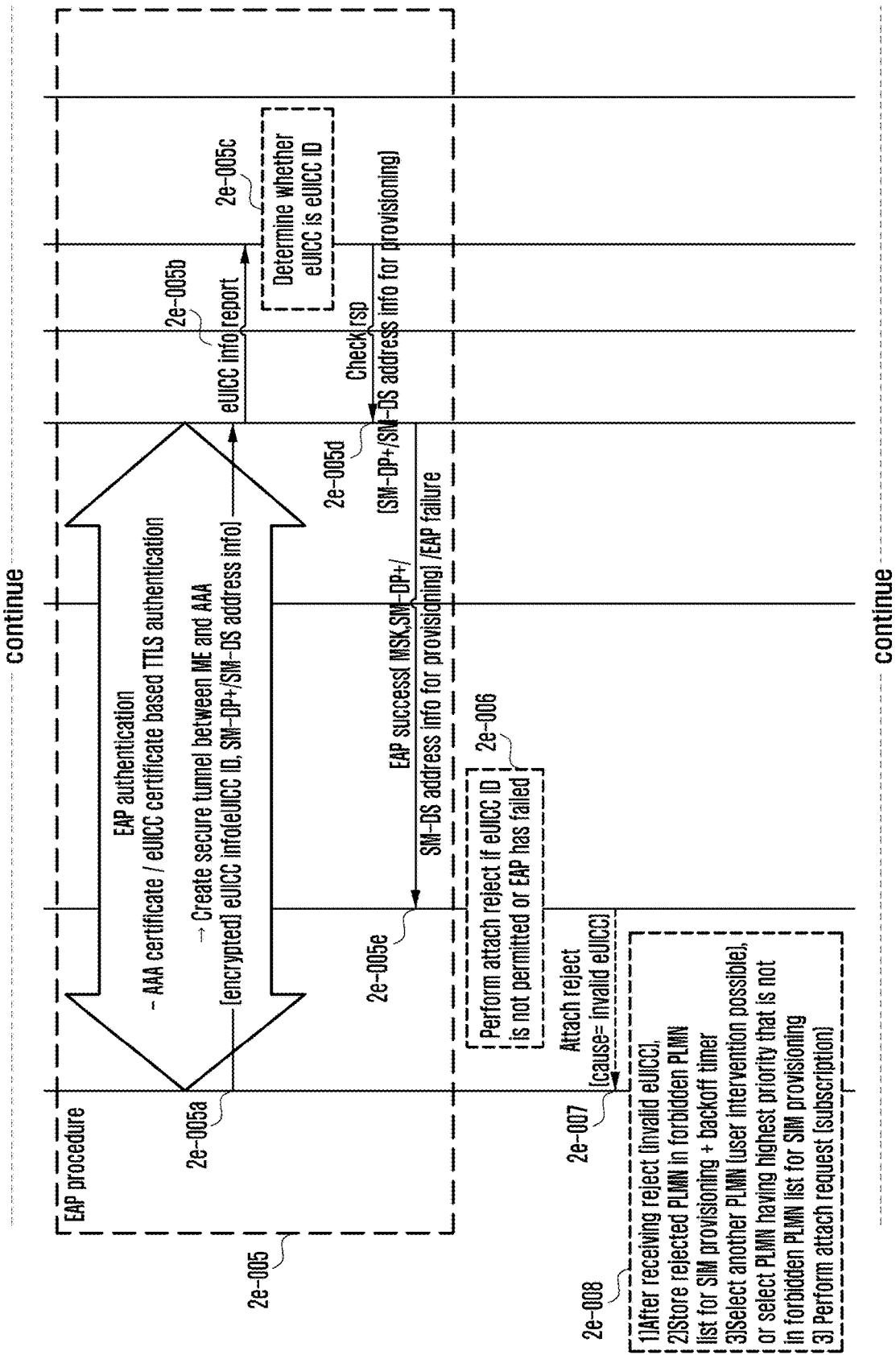

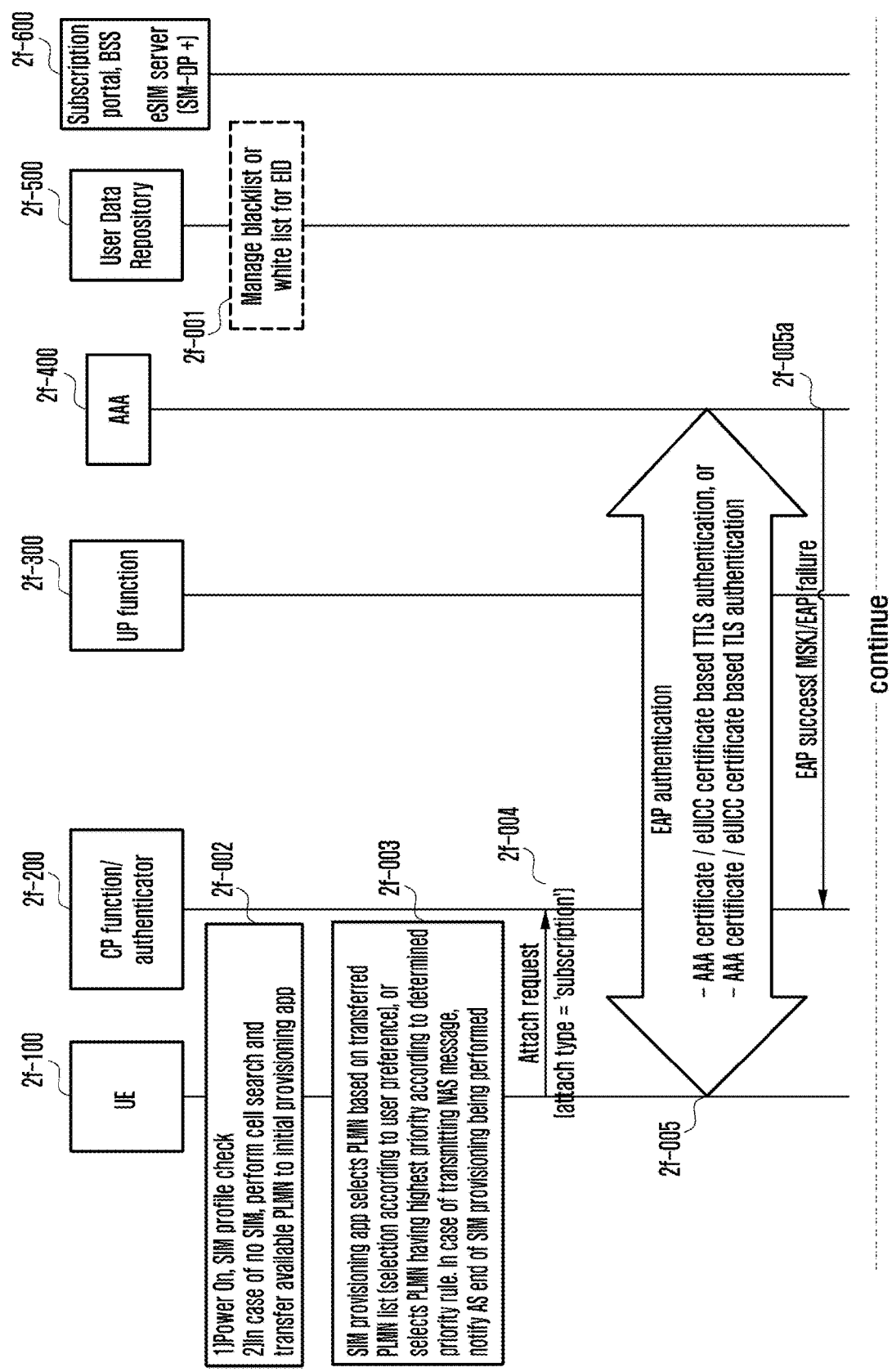

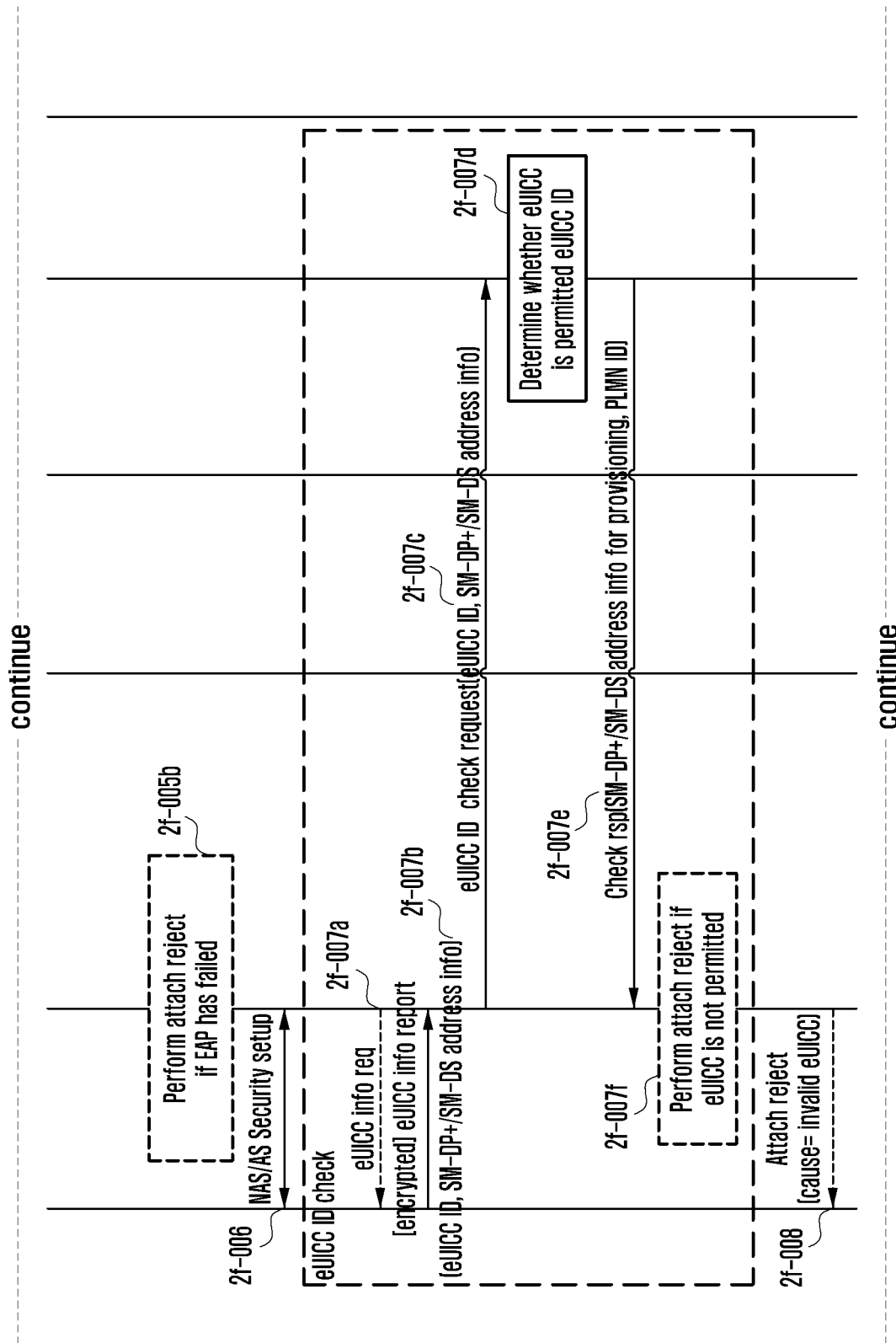

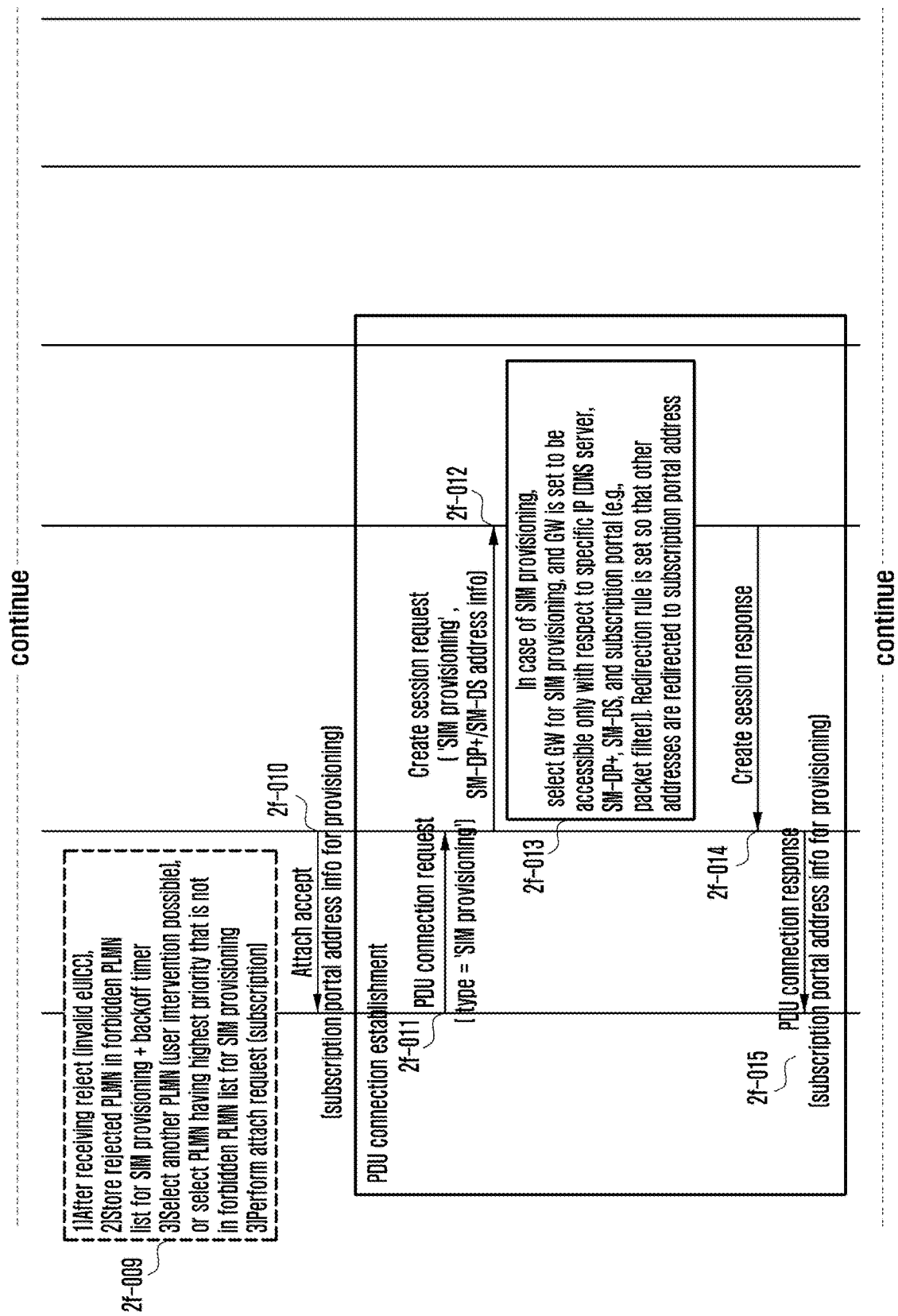

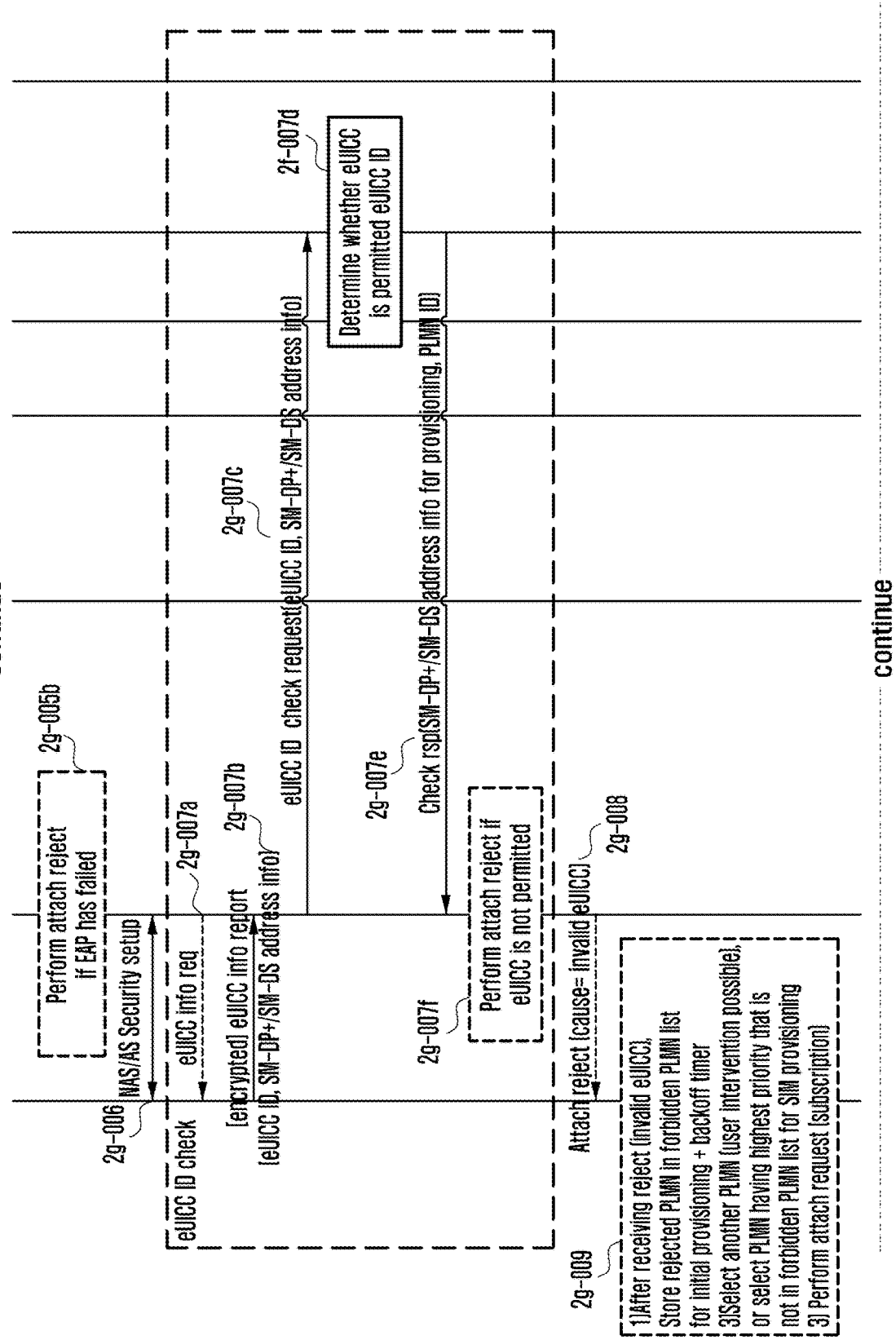

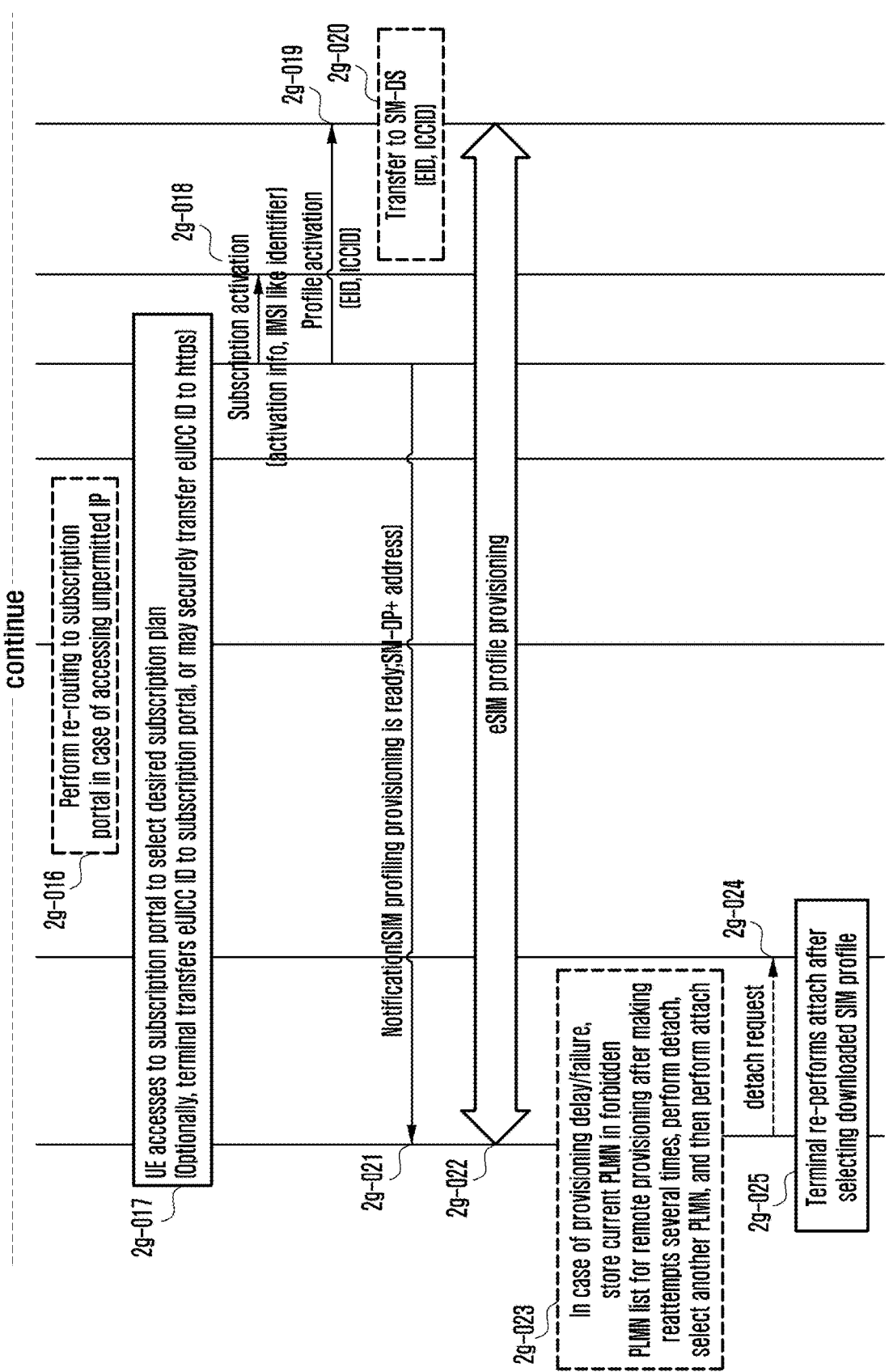

METHOD AND APPARATUS FOR ACCESSING CELLULAR NETWORK FOR SIM PROFILE

CROSS-REFERENCE TO RELATED APPLICATION(S)

The present application is related to and claims benefit under 35 U.S.C. 119(a) of Korean Patent Application No. 10-2016-0085051, filed Jul. 5, 2016 and Korean Patent Application No. 10-2016-0098649, filed Aug. 2, 2016, the contents of which are incorporated herein by reference in their entireties.

TECHNICAL FIELD

If a terminal does not have a Subscriber Identification Module (SIM) profile like an open market oriented terminal having an embedded Subscriber Identification Module (eSIM) mounted thereon, it is necessary for the terminal to download the SIM profile through attaching to an eSIM server, for example, a Subscription Manager Data Preparation plus (SM-DP+) or a Subscription Manager Discovery Service (SM-DS), in order to receive a normal cellular network service that is provided by a Mobile Network Operator (MNO). However, there is a need for schemes to provide to a terminal Packet Data Network (PDN) connectivity or Packet Data Unit (PDU) connectivity for attaching to the eSIM server through a cellular network.

Further, if a terminal does not have a Subscriber Identification Module (SIM) profile like an open market oriented terminal having an embedded Subscriber Identification Module (eSIM) mounted thereon or a terminal for IoT, it is necessary for the terminal to download the SIM profile through attaching to an eSIM server, for example, a Subscription Manager Data Preparation plus (SM-DP+) or a Subscription Manager Discovery Service (SM-DS), in order to receive a normal cellular network service that is provided by a Mobile Network Operator (MNO). For example, a terminal may attach to a SM-DP+ that is a provisioning server having a SIM profile stored therein to download the SIM profile. Further, a terminal may attach to a SM-DS that is a server for searching for address information of a SM-DP+ that is a provisioning server having a SIM profile of a specific terminal stored therein to find out what SM-DP+ stores therein the SIM profile of the terminal, and then may attach to the found SM-DP+ to download the SIM profile. However, there is a need for schemes to provide to a terminal Packet Data Network (PDN) connectivity or Packet Data Unit (PDU) connectivity for attaching to the eSIM server through a cellular network.

In particular, in the case of the terminal that does not have the SIM profile, a user who has already subscribed to a plan of a specific communication company may receive provisioning of the SIM profile that has already been allocated, or in some cases, a user who has not subscribed to any communication company may select and subscribe to a plan of a specific communication company through turn-on of the terminal to receive provisioning of the SIM profile. There is a need for a technology that enables a cellular network to recognize this situation and to smoothly provide provisioning of the SIM profile to the terminal.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In an aspect of the present disclosure, if a terminal does not have a SIM profile like an open market oriented terminal having an eSIM mounted thereon, it is necessary for the terminal to download the SIM profile through attaching to an eSIM server, for example, a SM-DP+ or a SM-DS, in order to receive a normal cellular network service. However, there is a need for schemes to provide to the terminal PDN connectivity or PDU connectivity for attaching to the eSIM server through a cellular network. In the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in a cellular network through the provisioning profile, downloading the SIM profile from the eSIM server through the acquired connectivity, and receiving a cellular network service through the downloaded SIM profile. However, this method may cause the problem that the terminal price is increased.

An aspect of the present disclosure provides schemes for a terminal that is mounted with an eSIM having no SIM profile to acquire PDN connectivity or PDU connectivity through a cellular network.

Further, in an aspect of the present disclosure, if a terminal does not have a SIM profile like an open market oriented terminal having an eSIM mounted thereon or an IoT oriented terminal, it is necessary for the terminal to download the SIM profile through attaching to an eSIM server, for example, a SM-DP+ or SM-DS, in order to receive a normal cellular network service. For example, a terminal may attach to a SM-DP+ that is a provisioning server having a SIM profile stored therein to download the SIM profile. Further, a terminal may attach to a SM-DS that is a server for searching for address information of a SM-DP+ that is a provisioning server having a SIM profile of a specific terminal stored therein to find out what SM-DP+ stores therein the SIM profile of the terminal, and then may attach to the found SM-DP+ to download the SIM profile. However, there is a need for schemes to provide to PDN connectivity or PDU connectivity for attaching to the eSIM server through a cellular network. In the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in a cellular network through the provisioning profile, downloading the SIM profile from the eSIM server through the acquired connectivity, and receiving a cellular network service through the downloaded SIM profile. However, this method may cause the problem that the terminal price is increased.

In particular, an aspect of the present disclosure provides schemes for enabling a cellular network to recognize situations and to smoothly provide provisioning of a SIM profile to a terminal that does not have the SIM profile with respect to a case where a user who has already subscribed to a plan of a specific communication company receives provisioning of the SIM profile that has already been allocated and a case where a user who has not subscribed to any communication company selects and subscribes to a plan of a specific communication company through turn-on of the terminal to receive provisioning of the SIM profile.

In accordance with an aspect of the present disclosure, a method for causing a terminal to download a profile includes checking whether there is a profile for a Universal Integrated Circulated Card (UICC) of the terminal; transmitting an attach request message that includes identification information of the UICC to a Public Land Mobile Network (PLMN) that is selected by the terminal if there is no profile; and receiving an attach response message.

In accordance with another aspect of the present disclosure, a method for causing a Mobility Management Entity (MME) to support a profile download includes receiving from a terminal an attach request message that includes identification information of a Universal Integrated Circulated Card (UICC) of the terminal; transmitting to an Equipment Identity Register (EIR) a message for requesting to check whether to permit an attach of the UICC with respect to a Public Land Mobile Network (PLMN) that is selected by the terminal; receiving from the EIR a message that includes information on whether to permit the attach of the UICC; and transmitting an attach response message to the terminal on the basis of the information on whether to permit the attach of the UICC.

According to the aspects of the present disclosure, in the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in a cellular network through the provisioning profile, downloading the SIM profile from the eSIM server through the acquired connectivity, and receiving a cellular network service through the downloaded SIM profile. However, this method may cause the problem that the terminal price is increased. According to the aspects of the present disclosure, since a terminal that is mounted with an eSIM having no SIM profile can acquire PDN connectivity or PDU connectivity for SIM profile provisioning through a cellular network, the SIM profile provisioning can be received through the cellular network itself without using other connectivity, and thus a normal cellular network service can be used.

Further, according to the aspects of the present disclosure, in the related art, a terminal having no SIM profile may acquire the connectivity through a Wi-Fi network or a tethering method. However, the terminal is unable to have the connectivity in a situation where there is no pre-connected connectivity. Further, in the case where a terminal manufacturer sells a terminal after a provisioning profile that is provided by the manufacturer is pre-stored in an eSIM, there may be a method for acquiring a limited connectivity in a cellular network through the provisioning profile, downloading the SIM profile from the eSIM server through the acquired connectivity, and receiving a cellular network service through the downloaded SIM profile. However, this method may cause the problem that the terminal price is increased. In contrast, according to the aspects of the present disclosure, since a terminal that is mounted with an eSIM having no SIM profile can acquire PDN connectivity or PDU connectivity for SIM profile provisioning through a cellular network, the SIM profile provisioning can be received through the cellular network itself without using other connectivity, and thus a normal cellular network service can be used.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
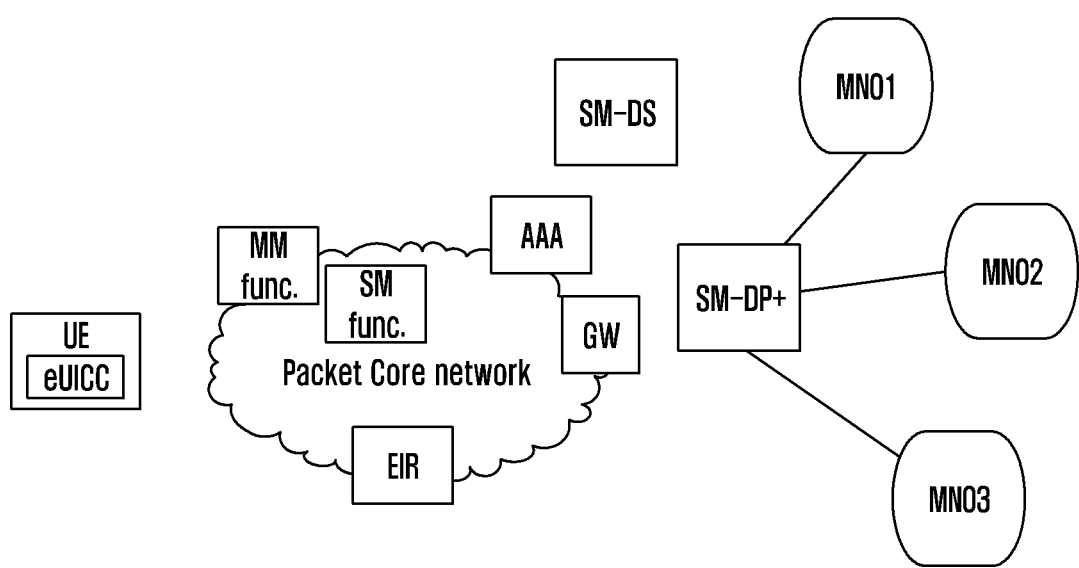
FIG. 1A is a diagram illustrating the structure of a network in which a terminal that is mounted with an eSIM performs SIM profile provisioning.

FIGS. 1 through 3D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. In describing the present disclosure below, related well-known functions or configurations incorporated herein are not described in detail in the case where it is determined that they obscure the subject matter of the present disclosure in unnecessary detail. Further, terms to be described later are terms defined in consideration of their functions in the present disclosure, but may differ depending on intentions of a user and an operator or customs. Accordingly, they should be defined on the basis of the contents of the whole description of the present disclosure.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

First Embodiment

FIG. 1A is a diagram illustrating the structure of a network in which a terminal that is mounted with an eSIM performs SIM profile provisioning.

Referring to FIG. 1A, a terminal (or User Equipment (UE)) is mounted with an embedded Universal Integrated Circulated Card (eUICC) in order to use an eSIM. After the terminal secures connectivity through connection to a packet core network, the eUICC receives provisioning of a SIM profile that corresponds to a Mobile Network Operator (MNO) that will use a data service from an eSIM server (e.g., SM-DP+ server). If the terminal or the eUICC does not have an address of an SM-DP+ server, the terminal receives provisioning of the SIM profile through connection to the SM-DP+ server after acquiring the address of a suitable SM-DP+ server through connection to an SM-DS server that is one other eSIM server.

The packet core network to which the terminal connects to secure the connectivity may be, for example, a cellular network that provides data communication, and may be, for example, an Evolved Packet System (EPS) that provides an LTE network service or a 5G network. There may be an MM functional entity that takes charge of mobility management of the terminal and an SM functional entity that takes charge of session management, and through the functional entities, signaling messages may be processed. In the case of an EPS, an MME serves as the MM functional entity and the SM functional entity. Further, an Equipment Identity Register (EIR) is an entity that determines whether the terminal is a permitted terminal through an IMEI of the terminal in a network, and in the present disclosure, the EIR is defined as an entity that can determine whether the eUICC is a permitted eUICC with respect to an eUICC ID. As an authentication server for encrypted communication with the terminal or the eUICC, for example, there is an AAA server, and if encryption is not performed in the process of connecting to the packet core network, the AAA server is not used. Although not illustrated in FIG. 1A, the system may include a base station, and through the base station, the terminal and the MM or the terminal and the MME may transmit and receive signals, information, data, and messages.

Figure 1B:
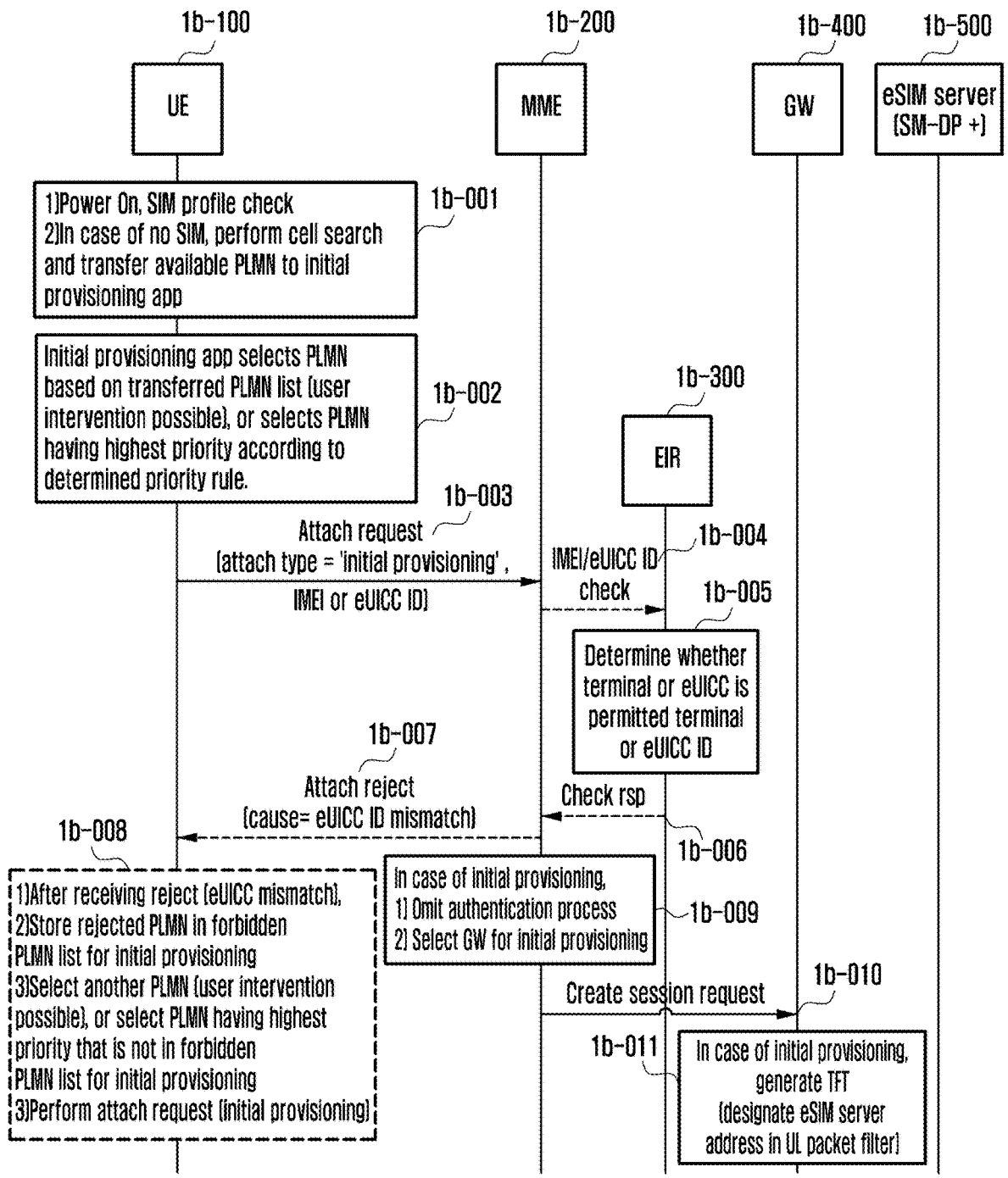
FIGS. 1BA and 1BB are diagrams illustrating network connection schemes for a terminal that is mounted with an eSIM to perform initial provisioning.
Figure 1B:
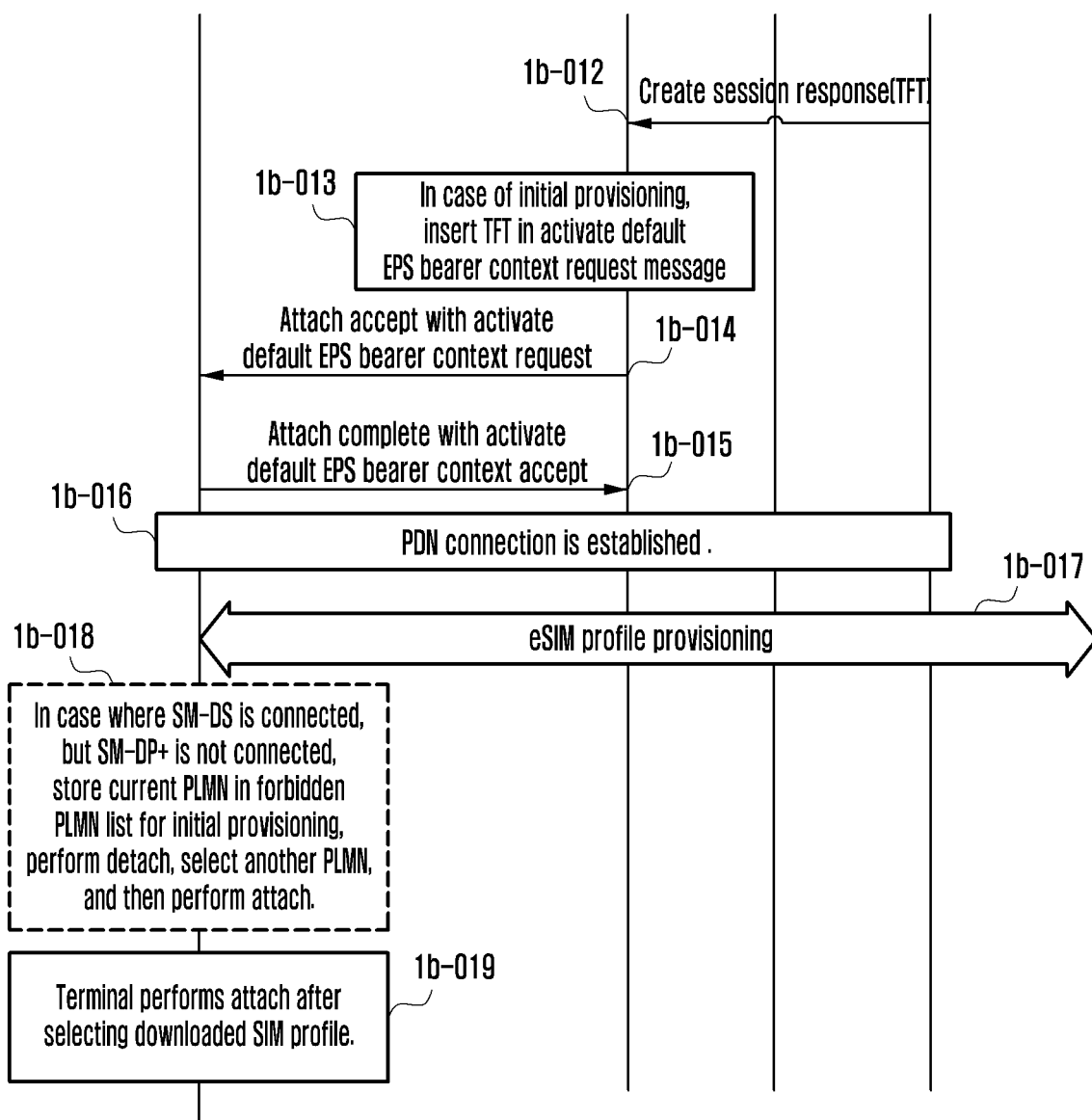

FIGS. 1B-1 and 1B-2 are diagrams illustrating network connection schemes for a terminal that is mounted with an eSIM to perform initial provisioning according to an embodiment of the present disclosure. Hereinafter, FIGS. 1B-1 and 1B-2 are commonly called FIG. 1B.

Referring to FIG. 1B, in an embodiment of the present disclosure, a process is illustrated, in which connectivity is acquired through connection to a cellular network, provisioning of a SIM profile is received through an eSIM server, and connection to the network is performed using the downloaded SIM profile.

In a turn-on state, a terminal 1b-100 checks a SIM profile, and if there is not the SIM profile, the terminal recognizes the necessity of initial provisioning and transfers a list of available Public Land Mobile Networks (PLMNs) to an application of the terminal or an entity that takes charge of the initial provisioning on the basis of a list of PLMNs that are sensed through a cell search (1b-001).

The terminal 1b-100 may select a PLMN to be connected to for the initial provisioning on the basis of the transferred PLMN list (1b-002). The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an IoT service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 1b-100 requests a network connection through the PLMN that is selected in the above-described process while transmitting an attach request to an MME 1b-200. In this case, through an attach request message, it can be known that an attach type is for the initial provisioning (1b-003). For example, "attach type=initial provisioning" may be used. In this case, the attach request message may include an identity of the terminal 1b-100, for example, both or one of an International Mobile Station Equipment Identity (IMEI) or an eUICC identity (e.g., eUICC ID or eID). Further, the attach request message may include both or one of an address of an SM-DS server and an address of an SM-DP+ server to be connected to the terminal.

The MME 1b-200 transmits a request message to an EIR 1b-300 in order to determine whether the terminal that has sent the attach request is a terminal that is permitted in the corresponding PLMN, or whether the eUICC that is used by the terminal is a permitted eUICC. The request message may include at least one of an IMEI and an eUICC ID, and may request checking of whether the ID is permitted with respect to each identifier or both identifiers (1b-004).

The EIR 1b-300 checks whether the terminal or the eUICC is a connection-permitted terminal or a connection-permitted eUICC on the basis of information that is received from the MME 1b-200 (1b-005). The EIR 1b-300 may determine whether to permit the IMEI or eUICC ID in a manner that network connection is rejected if a transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or EUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 1b-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 1b-300 may transmit to the MME 1b-200 information that indicates whether connection of the terminal 1b-100 or eUICC is permitted (1b-006).

If the information that is received from the EIR 1b-300 indicates that the connection is not permitted, the MME 1b-200 may send an attach reject message to the terminal 1b-100 to reject the network connection (1b-007). In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 1b-100 may store the ID of the corresponding PLMN in a forbidden PLMN list for initial provisioning, and may re-select the PLMN among available PLMNs (1b-008). In this case, the PLMN that is included in the forbidden PLMN list for initial provisioning is excluded from the available PLMN list. The selection of the PLMN is performed in the same method as 1b-002, and the terminal 1b-100 performs again an attach request process for the initial provisioning.

On the other hand, if the EIR 1b-300 notifies the MME 1b-200 that the connection of the terminal 1b-100 has been permitted (1b-006), the MME 1b-200 omits an authentication/authorization process for security, and selects a GW for the initial provisioning. That is, in an embodiment of the present disclosure, since the attach process is an attach process for provisioning, it is newly proposed for the MME 1b-200 to omit the authentication/authorization process. At operation 1b-003, the terminal 1b-100 may piggyback a PDN connectivity request on an attach request message, and even if the PDN connectivity request is not transferred together in the case where the access type of the attach request message is for the initial provisioning, the MME 1b-200 selects the GW 1b-400 for performing the initial provisioning, and transfers a create session request to the GW 1b-400 to request the GW to make the PDN connection (1b-010). In this case, if the GW for the initial provisioning is not designated to be used as a separate entity in the network, the create session request includes an indication capable of notifying of the initial provisioning. Further, the create session request may include an address of an SM-DS server that is received from the terminal 1b-100 or an address of an SM-DP+ server.

On the other hand, if it is recognized that the create session request is for the initial provisioning, the GW 1b-400 that has received the create session request may allocate an IP address, and may operate to generate a default EPS bearer context. In this case, the GW generates a Traffic Flow Template (TFT) in the default EPS bearer so that the terminal 1b-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address (1b-011). In the process of configuring the uplink/downlink packet filter, an IP address to be used for specific filtering may be determined on the basis of the address of the SM-DS server or the address of the SM-DP+ server that is received from the terminal 1b-100, or the address that is serviced by the terminal 1b-100 may be used for authorization.

The GW 1b-400 may transmit a create session response message to the MME 1b-200. The create session response message may include the TFT that includes the uplink/downlink packet filter for the default EPS bearer (1b-012).

The MME 1b-200 may include the received TFT in an activate default EPS bearer context request message (1b-013). The MME 1b-200 may transfer the activate default EPS bearer context request message to the terminal 1b-100 together with an attach accept message (1b-014).

The terminal 1b-100 may transfer an attach complete message to the MME 1b-200, and at this time, it may transfer an active default EPS bearer context accept message together (1b-015). Thereafter, the terminal 1b-100 may establish a PDN connection to the GW 1b-400 (1b-016).

Thereafter, the terminal 1b-100 may attach to an eSIM server 1b-500 using the acquired connectivity to receive provisioning of a SIM profile (1b-017). If an SM-DS address exists in a packet filter that is configured in the TFT, but an SM-DP+ address is omitted to cause the SIM profile provisioning to be unsuccessfully performed in the process of attaching to the eSIM server, the terminal adds an ID of the currently attached PLMN to a forbidden PLMN list for initial provisioning, and then performs detach and attach request processes in order (1b-018). If the provisioning of the SIM profile is successfully performed, the terminal 1b-100 performs a normal attach process using the downloaded SIM profile to use a data service (1b-019).

Figure 1C:
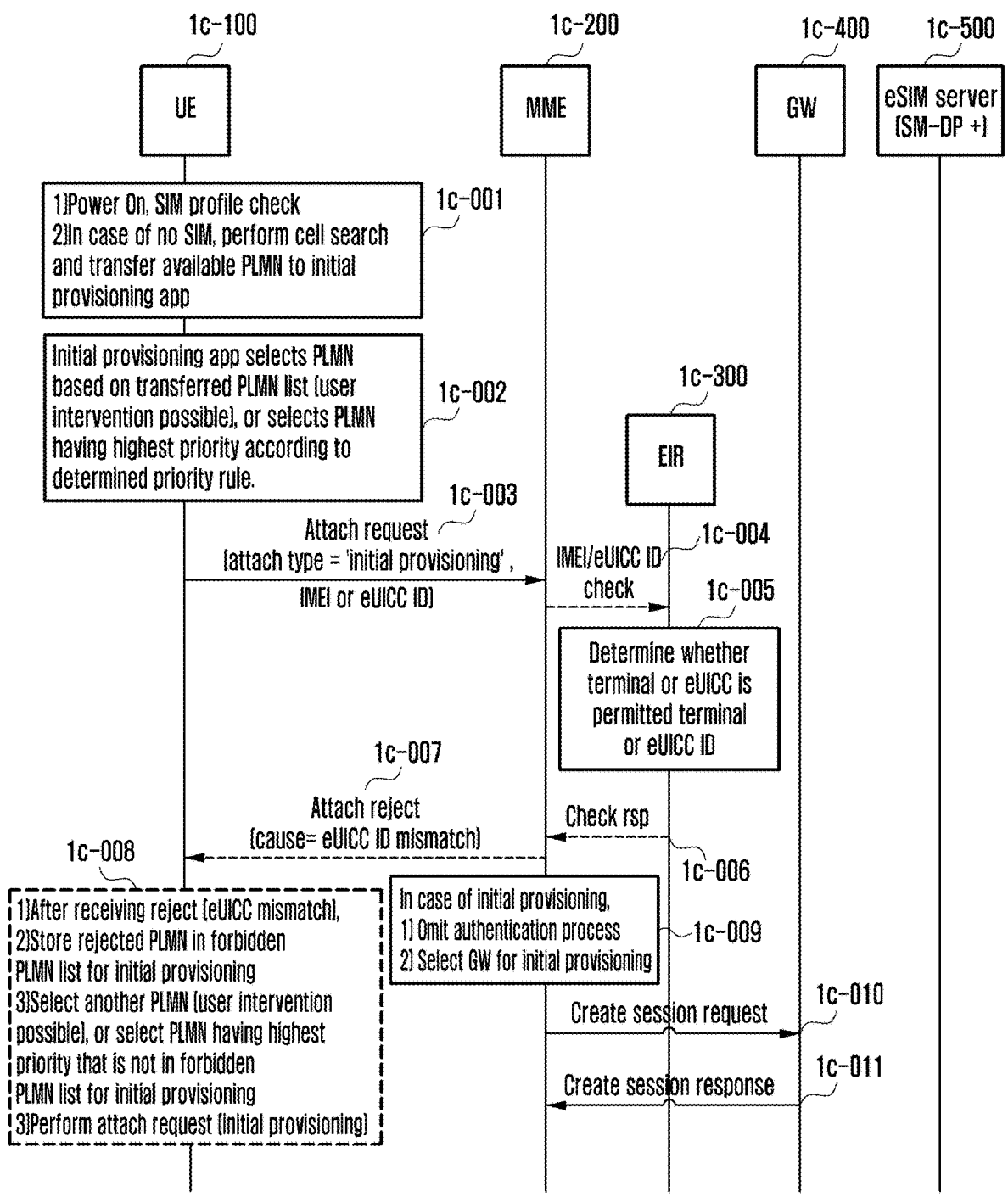
FIGS. 1CA and 1CB are diagrams illustrating network connection schemes for a terminal that is mounted with an eSIM to perform initial provisioning.
Figure 1C:
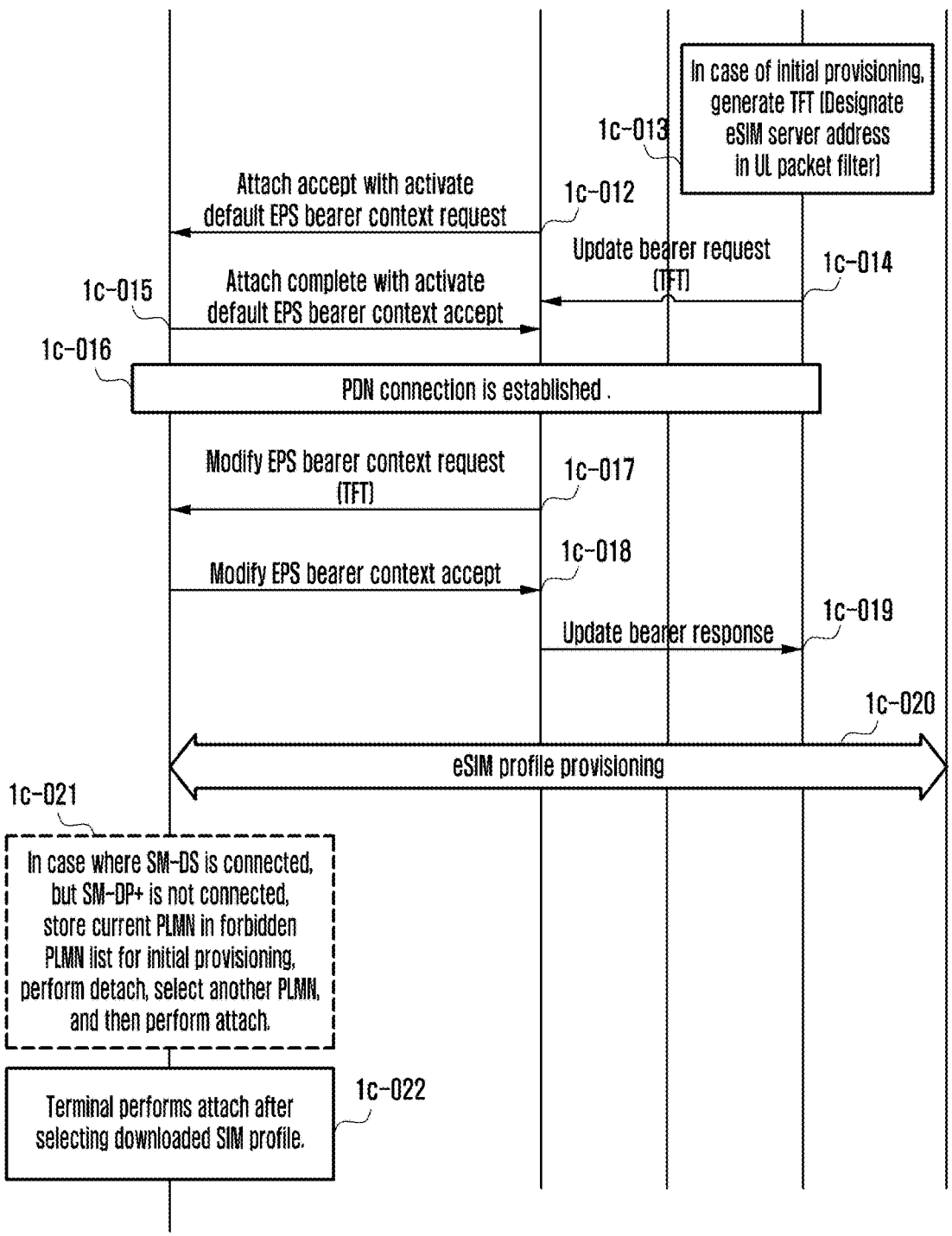

FIGS. 1C-1 and 1C-2 are diagrams illustrating network connection schemes for a terminal that is mounted with an eSIM to perform initial provisioning according to an embodiment of the present disclosure. Hereinafter, FIGS. 1C-1 and 1C-2 are commonly called FIG. 1C.

Referring to FIG. 1C, in an embodiment of the present disclosure, a process is illustrated, in which connectivity is acquired through connection to a cellular network, provisioning of a SIM profile is received through an eSIM server, and connection to the network is performed using the downloaded SIM profile. The technology illustrated in FIG. 1C is similar to the technology illustrated in FIG. 2B except for the procedure in which a GW installs a packet filter in a default EPS bearer.

In a turn-on state, a terminal 1c-100 checks a SIM profile, and if there is not the SIM profile, the terminal recognizes the necessity of initial provisioning and transfers a list of available PLMNs to an application of the terminal or an entity that takes charge of the initial provisioning on the basis of a list of PLMNs that are sensed through a cell search (1c-001).

The terminal 1c-100 may select a PLMN to be connected to for the initial provisioning on the basis of the transferred PLMN list (1c-002). The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an IoT service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 1c-100 requests a network connection through the PLMN that is selected in the above-described process while transmitting an attach request to an MME 1c-200. In this case, through an attach request message, it can be known that an attach type is for the initial provisioning (1c-003). For example, "attach type=initial provisioning" may be used. In this case, the attach request message may include an identity of the terminal, for example, both or one of an International Mobile Station Equipment Identity (IMEI) or an eUICC identity (e.g., eUICC IDs). Further, the attach request message may include both or one of an address of an SM-DS server and an address of an SM-DP+ server to be connected to the terminal.

The MME 1c-200 transmits a request message to an EIR 1c-300 in order to determine whether the terminal 1c-100 that has sent the attach request is a terminal that is permitted in the corresponding PLMN, or whether the eUICC that is used by the terminal 1c-100 is a permitted eUICC. The request message may include at least one of an IMEI and an eUICC ID, and may request checking of whether the ID is permitted with respect to each identifier or both identifiers (1c-004).

The EIR 1c-300 checks whether the terminal or the eUICC is a connection-permitted terminal or a connection-permitted eUICC on the basis of information that is received from the MME 1c-200 (1c-005).

The EIR 1c-300 may determine whether to permit the IMEI or eUICC ID in a manner that network connection is rejected if a transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or eUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 1c-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 1c-300 may transmit to the MME 1c-200 information that indicates whether connection of the terminal 1c-100 or eUICC is permitted (1c-006).

If the information that is received from the EIR 1c-300 indicates that the connection is not permitted, the MME 1c-200 may send an attach reject message to the terminal 1c-100 to reject the network connection (1c-007). In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 1c-100 may store the ID of the corresponding PLMN in a forbidden PLMN list for initial provisioning, and may re-select the PLMN among available PLMNs (1c-008). In this case, the PLMN that is included in the forbidden PLMN list for initial provisioning is excluded from the available PLMN list. The selection of the PLMN is performed in the same method as 1c-002, and the terminal 1c-100 performs again an attach request process for the initial provisioning.

On the other hand, if the EIR 1c-300 notifies the MME 1c-200 that the connection of the terminal 1c-100 has been permitted (1c-006), the MME 1c-200 omits an authentication/authorization process for security, and selects a GW for the initial provisioning. That is, in an embodiment of the present disclosure, since the attach process is an attach process for provisioning, it is newly proposed for the MME 1c-200 to omit the authentication/authorization process. At operation 1c-003, the terminal 1c-100 may piggyback a PDN connectivity request on an attach request message, and even if the PDN connectivity request is not transferred together in the case where the access type of the attach request message is for the initial provisioning, the MME 1c-200 selects the GW 1c-400 for performing the initial provisioning, and transfers a create session request to the GW 1c-400 to request the GW to make the PDN connection (1c-010). In this case, if the GW for the initial provisioning is not designated to be used as a separate entity in the network, the create session request includes an indication capable of notifying of the initial provisioning. Further, the create session request may include an address of an SM-DS server that is received from the terminal 1c-100 or an address of an SM-DP+ server.

On the other hand, if it is recognized that the create session request is for the initial provisioning, the GW 1c-400 that has received the create session request may allocate an IP address, operate to generate a default EPS bearer context, and send a create session response to the MME 1c-200 (1c-011). If the create session response is received, the MME 1c-200 may send an attach accept message to the terminal 1c-100, and at this time, the MME 1c-200 may also transmit an activate default EPS bearer context request together. Detailed contents thereof have been described with reference to FIG. 2B.

The GW 1c-400, after or just after the create session response is transmitted, generates a TFT in the default EPS bearer so that the terminal 1c-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address (1c-013).

In the process of configuring the uplink/downlink packet filter, an IP address to be used for specific filtering may be determined on the basis of the address of the SM-DS server or the address of the SM-DP+ server that is received from the terminal 1c-100, or the address that is serviced by the terminal 1c-100 may be used for authorization.

The GW 1c-400 may include the TFT in an update bearer request to be sent to the MME so as to apply the TFT that includes the uplink/downlink packet filter for the default EPS bearer as described above (1c-014).

On the other hand, the MME 1c-200 that has received the create session response message may transmit an activate default EPS bearer context request to the terminal 1c-100 together with the attach accept message. The terminal 1c-100 may transfer an attach complete message to the MME 1c-200, and at this time, it may transfer an active default EPS bearer context accept message together (1c-015). Thereafter, the terminal 1c-100 may establish a PDN connection to the GW 1c-400 (1c-016).

Further, at operation 1c-014, the MME 1c-200 that has received the update bearer request applies to the default EPS bearer the TFT that includes the packet filter that limits the use of traffic only for the initial provisioning through EPS bearer modification, and notifies the GW 1c-400 of the result through the update bearer response message. That is, the MME 1c-200 transmits a modify EPS bearer context request message to the terminal 1c-100 (1c-017). The terminal 1c-100 transmits a modify EPS bearer context accept message to the MME 1c-200. Thereafter, the MME 1c-200 transmits an update bearer response message to the GW 1c-400.

Thereafter, the terminal may attach to an eSIM server 1c-500 using the acquired connectivity to receive provisioning of a SIM profile (1c-020). If an SM-DS address exists in a packet filter that is configured in the TFT, but an SM-DP+ address is omitted to cause the SIM profile provisioning to be unsuccessfully performed in the process of attaching to the eSIM server 1c-500, the terminal 1c-100 adds an ID of the currently attached PLMN to a forbidden PLMN list for initial provisioning, and then performs detach and attach request processes in order (1c-021). If the provisioning of the SIM profile is successfully performed, the terminal 1c-100 may perform a normal attach process using the downloaded SIM profile to use a data service (1c-022).

Figure 1D:
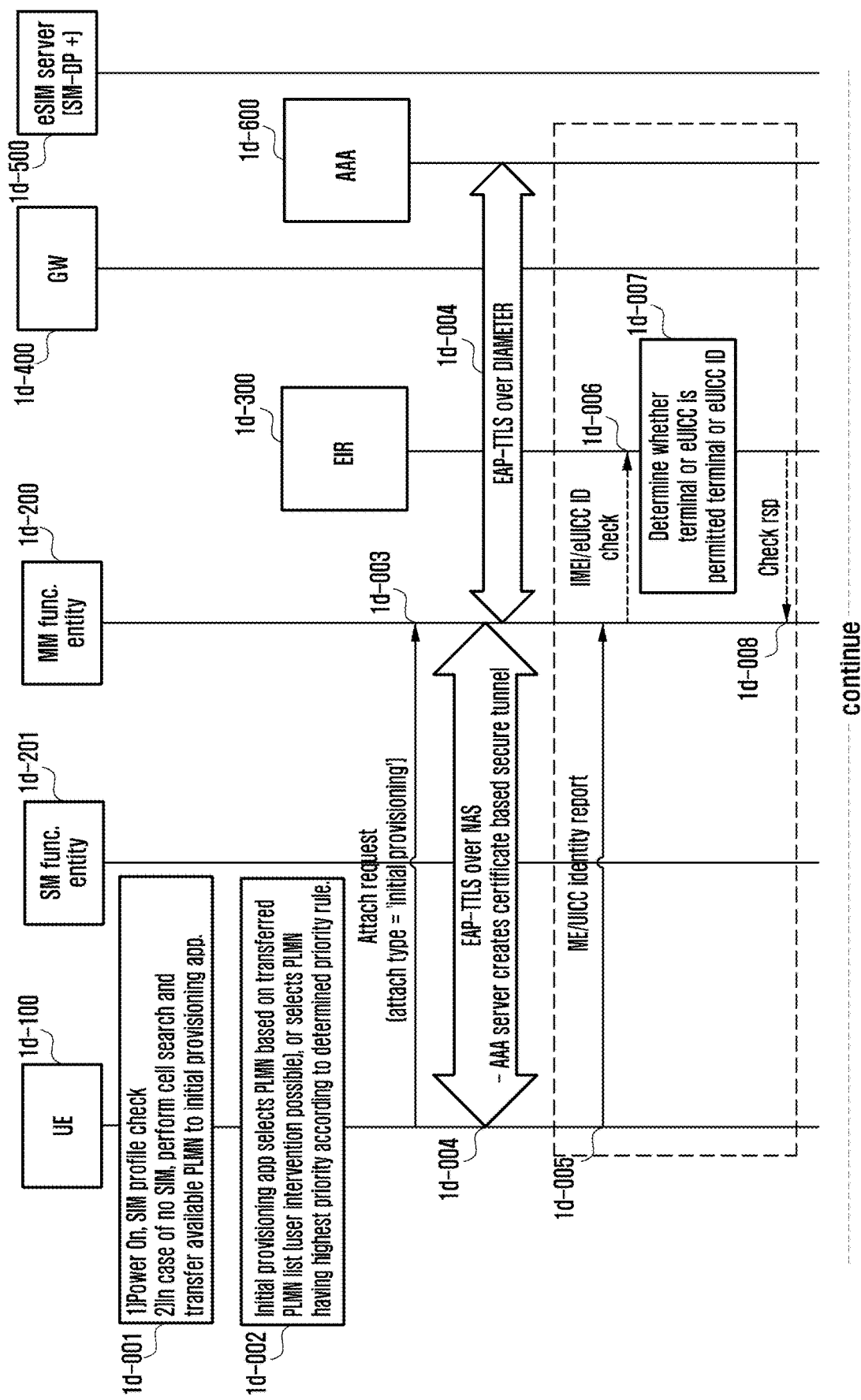
FIGS. 1DA to 1DC are diagrams illustrating network connection schemes for a terminal that is mounted with an eSIM to perform initial provisioning in consideration of an ID security.
Figure 1D:
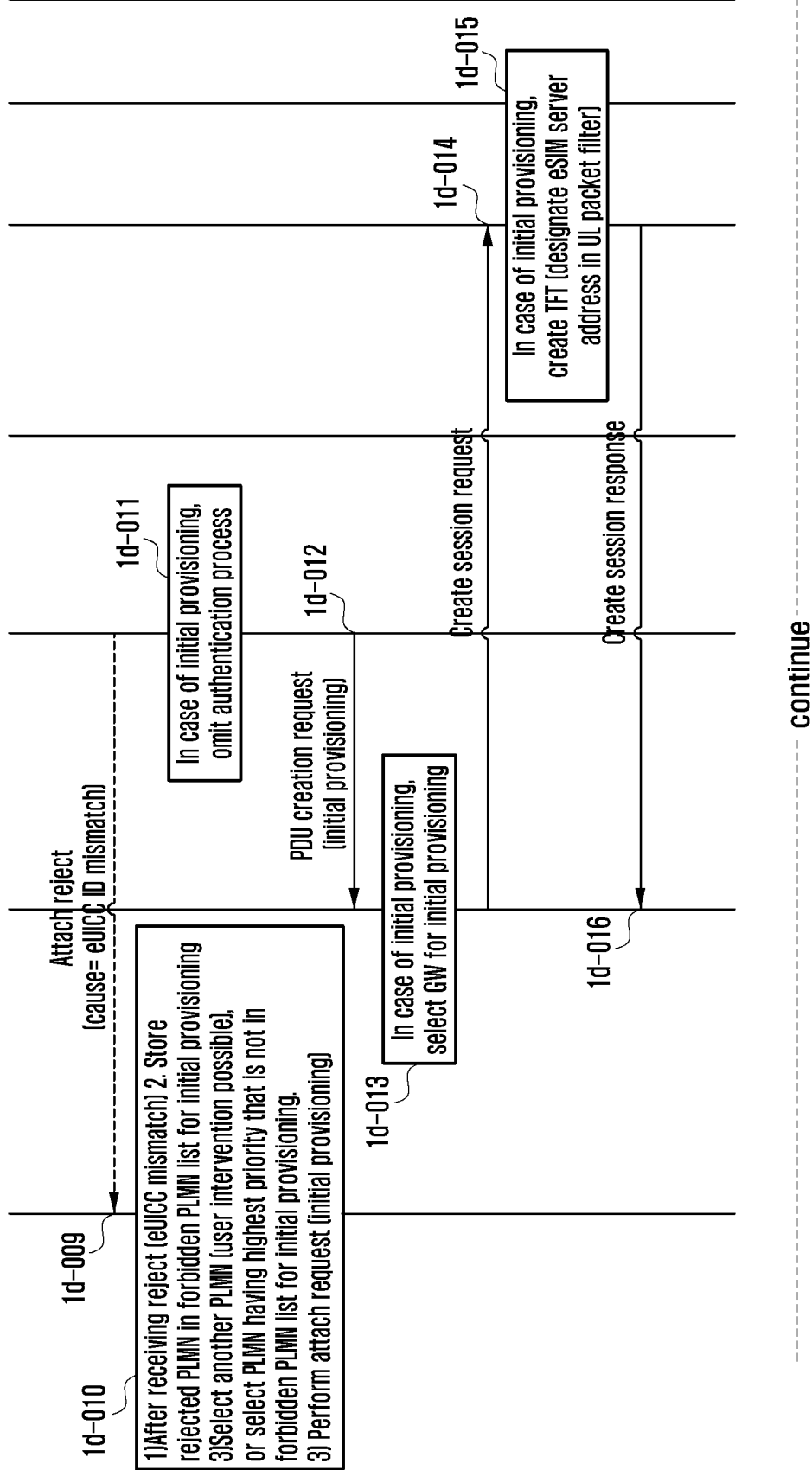
Figure 1D:
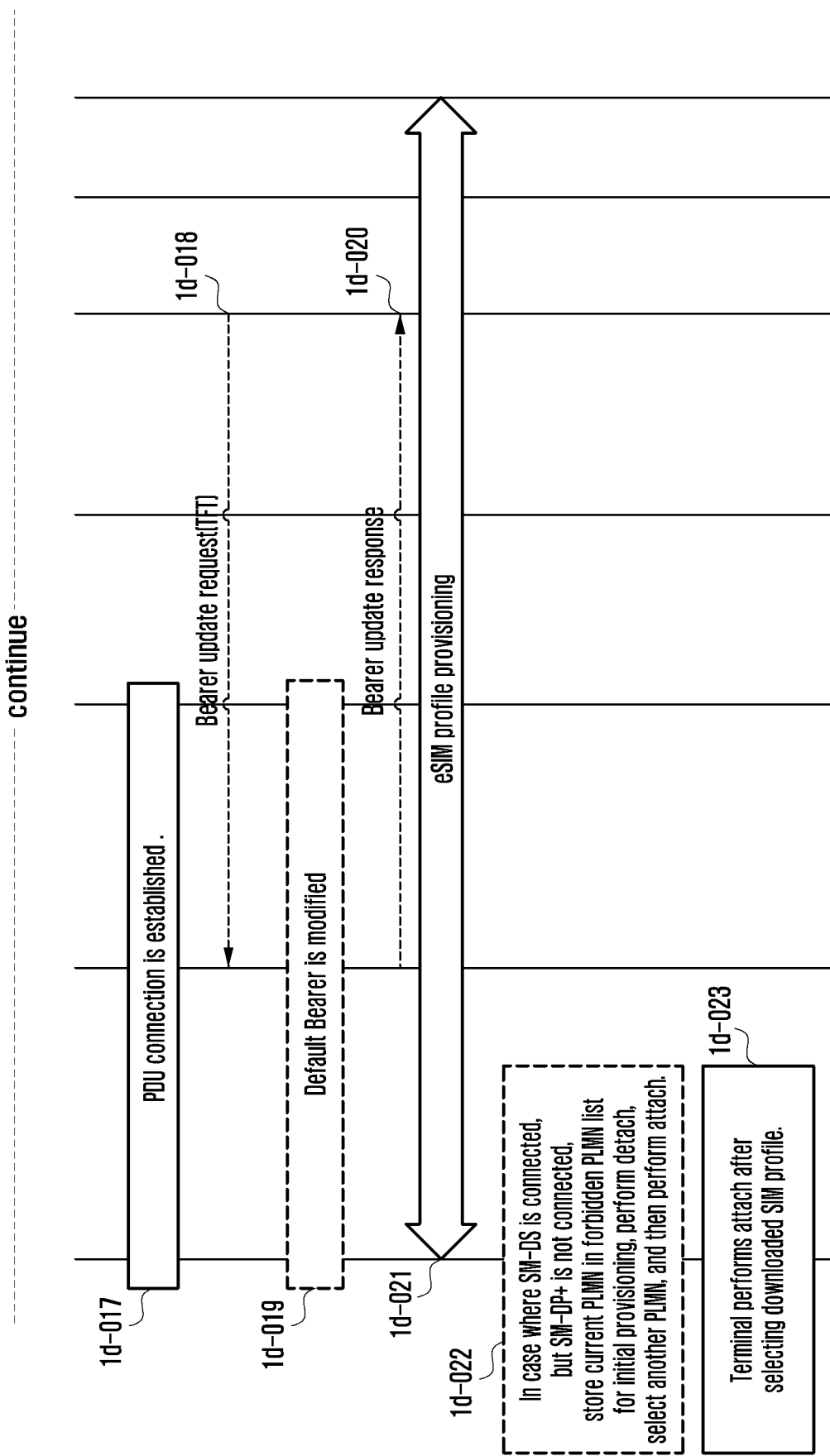

FIGS. 1D-1 and 1D-2 are diagrams illustrating network connection schemes for a terminal that is mounted with an eSIM to perform initial provisioning in consideration of an ID security according to an embodiment of the present disclosure. Hereinafter, FIGS. 1D-1 and 1D-2 are commonly called FIG. 1D.

Referring to FIG. 1D, in an embodiment of the present disclosure, a process is illustrated, in which connectivity is acquired through connection to a cellular network, provisioning of a SIM profile is received through an eSIM server, and connection to the network is performed using the downloaded SIM profile. In particular, this embodiment includes a method for encrypting information, such as IMEI or eUICC ID.

In a turn-on state, a terminal 1d-100 checks a SIM profile, and if there is not the SIM profile, the terminal recognizes the necessity of initial provisioning and transfers a list of available PLMNs to an application of the terminal or an entity that takes charge of the initial provisioning on the basis of a list of PLMNs that are sensed through a cell search (1d-001).

The terminal 1d-100 may select a PLMN to be connected to for the initial provisioning on the basis of the transferred PLMN list (1d-002). The selection of the PLMNs may be performed through a user's selection input or in accordance with the priority order according to a specific priority rule in the terminal. For example, in the case of a smart phone that facilitates the user's input, an initial provisioning app presents a list of PLMNs that can be selected through a UI, and a user may select a PLMN through which the user desires to receive the provisioning. As another method, if it is difficult to make the user's input, for example, if a communication network service provider to be used is determined later after an IoT service provider purchases an IoT-oriented terminal, and thus there is no information on the communication network service provider in the terminal, a PLMN that corresponds to the highest priority may be selected in accordance with the priority rule of the terminal itself, such as selection of a PLMN having the highest signal strength among available PLMNs.

The terminal 1d-100 requests a network connection through the PLMN that is selected in the above-described process while transmitting an attach request to an MM functional entity 1d-200. In this case, through an attach request message, it can be known that an attach type is for the initial provisioning (1d-003). For example, "attach type=initial provisioning" may be used.

The MM functional entity 1d-200 that has received the attach request triggers an Extensible Authentication Protocol (EAP) process, and the terminal 1d-100 authenticates an AAA server 1d-600 on the basis of an AAA server certificate through EAP-TLS or EAP-TTLS between the terminal 1d-100 and the AAA server 1d-600 of a network, and generates a secure tunnel on the basis of an encryption key that is created in the authentication process (1d-004).

If the secure tunnel is generated, the terminal 1d-100 transmits an IMEI, an eUICC ID, or both of them to the MM functional entity 1d-200 (1d-005). Again, the MM functional entity 1d-200 determines whether the transmitted ID is a permitted ID through sending the IMEI, eUICC ID, or both of them to an EIR 1d-300.

Further, the terminal 1d-100 may send to the MM functional entity 1d-200 including both or one of an address of an SM-DS server and an address of an SM-DP+ server to be connected to the terminal 1d-100.

As another embodiment, processes of the above-described operations 1d-005, 1d-006, 1d-007, and 1d-008 may be replaced by a method in which the terminal transfers the IMEI, eUICC ID, or both IDs to the AAA server through an EAP message at operation 1d-004, and the AAA server determines whether the transferred ID is a permitted ID through sending of the IMEI, eUICC ID, or both IDs to the EIR.

The EIR 1d-300 checks whether the terminal or the eUICC is a connection-permitted terminal or a connection-permitted eUICC on the basis of information that is received from the MM functional entity 1d-200 (1d-007).

The EIR may determine whether to permit the IMEI or eUICC ID in a manner that network connection is rejected if the transmitted ID is in a blacklist of IMEIs or eUICC IDs that are managed to prevent inferiority or robbery that is managed in the corresponding service provider network or to prevent online opening. As another method, network connection is permitted only in the case where a transmitted ID is included in a white list of IMEIs or eUICC IDs of terminals, of which the online opening can be specially permitted by the corresponding service provider. In the case where a terminal manufacturer that has manufactured IoT terminals provides information on IMEI or eUICC ID to an IoT service provider without providing network opening to the IoT service provider, and IoT service providers make a contract to use a network of a communication network service provider later, information on the IMEI or eUICC ID that is received from the terminal manufacturer is transferred to the communication network service provider. The communication network service provider may store the white list in the EIR 1d-300 on the basis of the transferred information, and may permit an attach only with respect to the terminal of the IMEI or eUICC ID to be subscribed through checking whether the IMEI, eUICC ID, or both of them are permitted IDs through the EIR with respect to all the terminals that have sent an attach request for the initial provisioning.

The EIR 1d-300 may transmit to the MM functional entity 1d-200 information that indicates whether connection of the terminal 1d-100 or eUICC is permitted (1d-008).

If the information that is received from the EIR 1d-300 indicates that the connection is not permitted, the MM functional entity 1d-200 may send an attach reject message to the terminal 1d-100 to reject the network connection (1d-009). In this case, the rejection cause that is included in the reject message may include eUICC ID mismatch in the PLMN, IMEI mismatch in the PLMN, eUICC ID is not available in the PLMN, and IMEI is not available in the PLMN.

In the case of receiving the attach reject message, the terminal 1d-100 may store the ID of the corresponding PLMN in a forbidden PLMN list for initial provisioning, and may select the PLMN among available PLMNs (1d-010). In this case, the PLMN that is included in the forbidden PLMN list for initial provisioning is excluded from the available PLMN list. The selection of the PLMN is performed in the same method as 1d-002, and the terminal 1d-100 performs again an attach request process for the initial provisioning.

On the other hand, if the EIR 1d-300 notifies the MM functional entity 1d-200 of the connection permission (1d-008), the MM functional entity 1d-200 omits an authentication/authorization process for security (1d-011), and requests an SM functional entity 1d-201 to generate a PDU session for initial provisioning (1d-012). That is, in an embodiment of the present disclosure, since the attach process is an attach process for provisioning, it is newly proposed for the MM functional entity 1d-200 to omit the authentication/authorization process. At operation 1d-003, the terminal 1d-100 may piggyback a PDN connectivity request on an attach request message, and even if the PDN connectivity request is not transferred together in the case where the access type of the attach request message is for the initial provisioning, the MM functional entity 1d-200 may request the SM functional entity 1d-201 to generate the PDU session for performing the initial provisioning. In this case, a PDU generation request message may include an address of an SM-DS server that is received from the terminal 1d-100 or an address of an SM-DP+ server.

The SM functional entity 1d-201 that has received the PDU generation request selects the GW 1d-400 for the initial provisioning, and transfers a create session request to the GW 1d-400 to request the GW to make the PDU connection (1d-014). In this case, if the GW for the initial provisioning is not designated to be used as a separate entity in the network, the create session request includes an indication capable of notifying of the initial provisioning.

Further, the create session request may include an address of an SM-DS server that is received from the terminal 1d-100 or an address of an SM-DP+ server.

On the other hand, if it is recognized that the create session request is for the initial provisioning, the GW 1d-400 that has received the create session request may allocate an IP address, and may operate to generate a default bearer context. In this case, the GW generates a TFT in the default bearer so that the terminal 1d-100 can use the same only for the purpose of traffic for the initial provisioning, and it configures an uplink/downlink packet filter so that the communication becomes possible only in the case where the address of the eSIM server (e.g., SM-DP+ server or SM-DS server) is included as a destination/source IP address (1d-015).

In the process of configuring the uplink/downlink packet filter, an IP address to be used for specific filtering may be determined on the basis of the address of the SM-DS server or the address of the SM-DP+ server that is received from the terminal 1d-100, or the address that is serviced by the terminal 1d-100 may be used for authorization.

If the GW 1d-400 has sent the TFT that includes the uplink/downlink packet filter for the default bearer to the SM functional entity 1d-201 as described above (1d-016), the SM functional entity 1d-201 may configure the PDU connection through messaging for bearer setup between the MM functional entity 1d-200 and the terminal 1d-100, and in the process, the TFT information is transferred to the terminal (1d-017).

Further, as another embodiment, the GW 1d-400 does not transfer the TFT that is generated at operation 1d-015 to the terminal 1d-100 through operations 1d-016 and 1d-017, but may transfer to the terminal 1d-100 the TFT that limits the use of traffic only for the initial provisioning through a process of updating the default bearer through the bearer update request (1d-018, 1d-019, and 1d-020).

Thereafter, the terminal may attach to an eSIM server 1d-500 using the acquired connectivity to receive provisioning of a SIM profile (1d-021). If an SM-DS address exists in a packet filter that is configured in the TFT, but an SM-DP+ address is omitted to cause the SIM profile provisioning to be unsuccessfully performed in the process of attaching to the eSIM server 1d-500, the terminal 1d-100 adds an ID of the currently attached PLMN to a forbidden PLMN list for initial provisioning, and then performs detach and attach request processes in order (1d-022). If the provisioning of the SIM profile is successfully performed, the terminal 1d-100 may perform a normal attach process using the downloaded SIM profile to use a data service (1d-023).

Second Embodiment

Figure 2A:
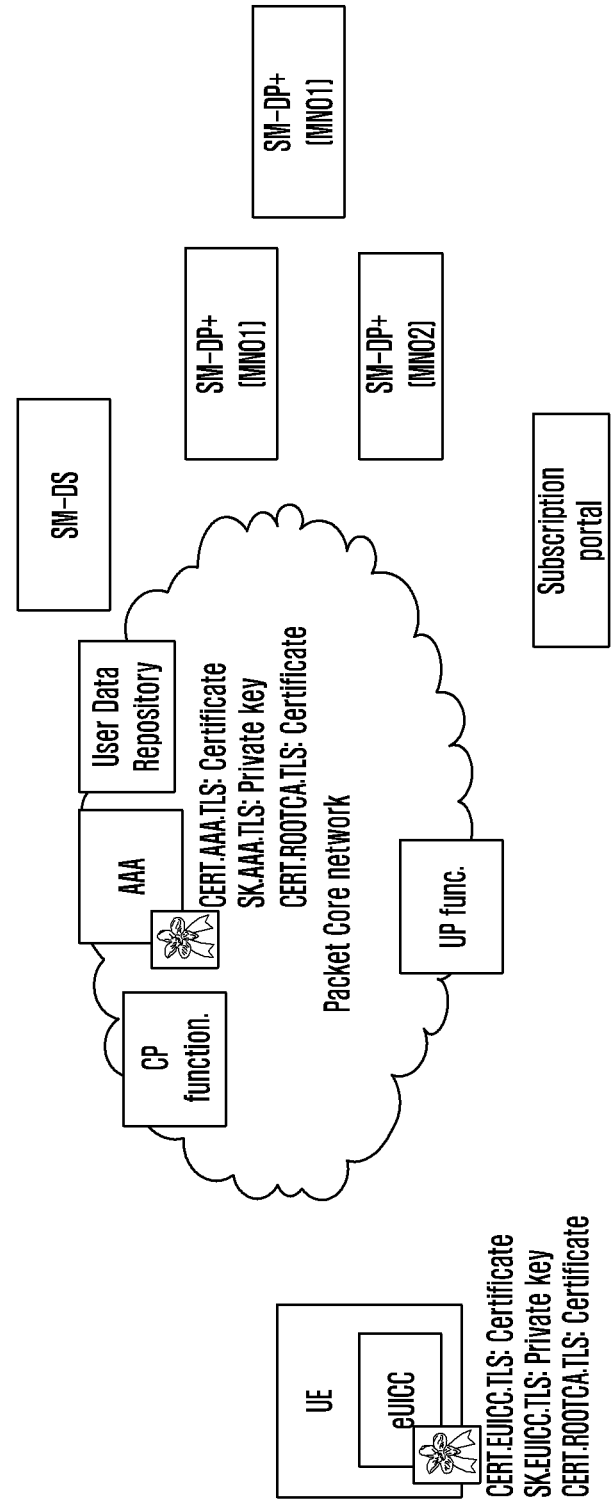
FIG. 2A is a diagram illustrating the structure of a network in which a terminal that is mounted with an eSIM performs SIM profile provisioning.

FIG. 2A is a diagram illustrating the structure of a network in which a terminal that is mounted with an eSIM performs SIM profile provisioning. A terminal (or User Equipment (UE)) is mounted with an embedded Universal Integrated Circulated Card (eUICC) in order to use an eSIM. After the terminal secures connectivity through connection to a packet core network, the eUICC receives provisioning of a SIM profile that corresponds to a Mobile Network Operator (MNO) that will use a data service from an eSIM server (e.g., SM-DP+ server) that stores the SIM profile therein. If the terminal or the eUICC does not have an address of the SM-DP+ server, the terminal receives provisioning of the SIM profile through attaching to the SM-DP+ server after acquiring the address of a suitable SM-DP+ server through attaching to an SM-DS server that is an eSIM server for searching for the address of the SM-DP+ server that stores therein a SIM profile of a specific terminal.

The packet core network to which the terminal is attaching to secure the connectivity may be, for example, a cellular network that provides data communication, and may be, for example, an Evolved Packet System (EPS) that provides an LTE network service or a 5G network. There may be a Control Plane (CP) function that takes charge of a control related function, such as mobility management or session management and a User Plane (UP) function that takes charge of a UP related function, such as a packet data gateway, for forwarding of user data. The CP function may perform an authenticator for triggering an Extensible Authentication Protocol (EAP) process in an EAP authentication process, and after such authentication, it may also perform management of a security context for encrypting a signaling message.

Further, a user data repository may store therein user's subscription information, for example, an ID (i.e., EID) of an eUICC of a subscribed user terminal and address information of a SM-DP+ that stores a SIM profile for the corresponding EID. Further, the user data repository may store therein an EID white list that is a list of information of permitted eUICC, or may store therein an EID black list that is a list of information of unpermitted eUICC. Further, the user data repository is an entity which provides the address information of the SM-DP+ that stores therein a SIM profile related to whether the eUICC is an eUICC of a subscribed terminal on the basis of the stored information, or determines whether the eUICC is a permitted eUICC. A subscription portal is a subscription portal server to which a user can attach to select a desired subscription plan. Further, there is an AAA server for authenticating the eUICC. The AAA server has a certificate of a root Certificate Authority (CA), and the eUICC also has its own certificate, a private key, and a certificate of a root Certificate Authority (CA), and if encryption is not performed in the process of connecting to the packet core network, the AAA server is not used. Although not illustrated in FIG. 1B, the system may include a base station, and through the base station, the terminal and the MM or the terminal and the MME may transmit and receive signals, information, data, and messages.

Figure 2B:
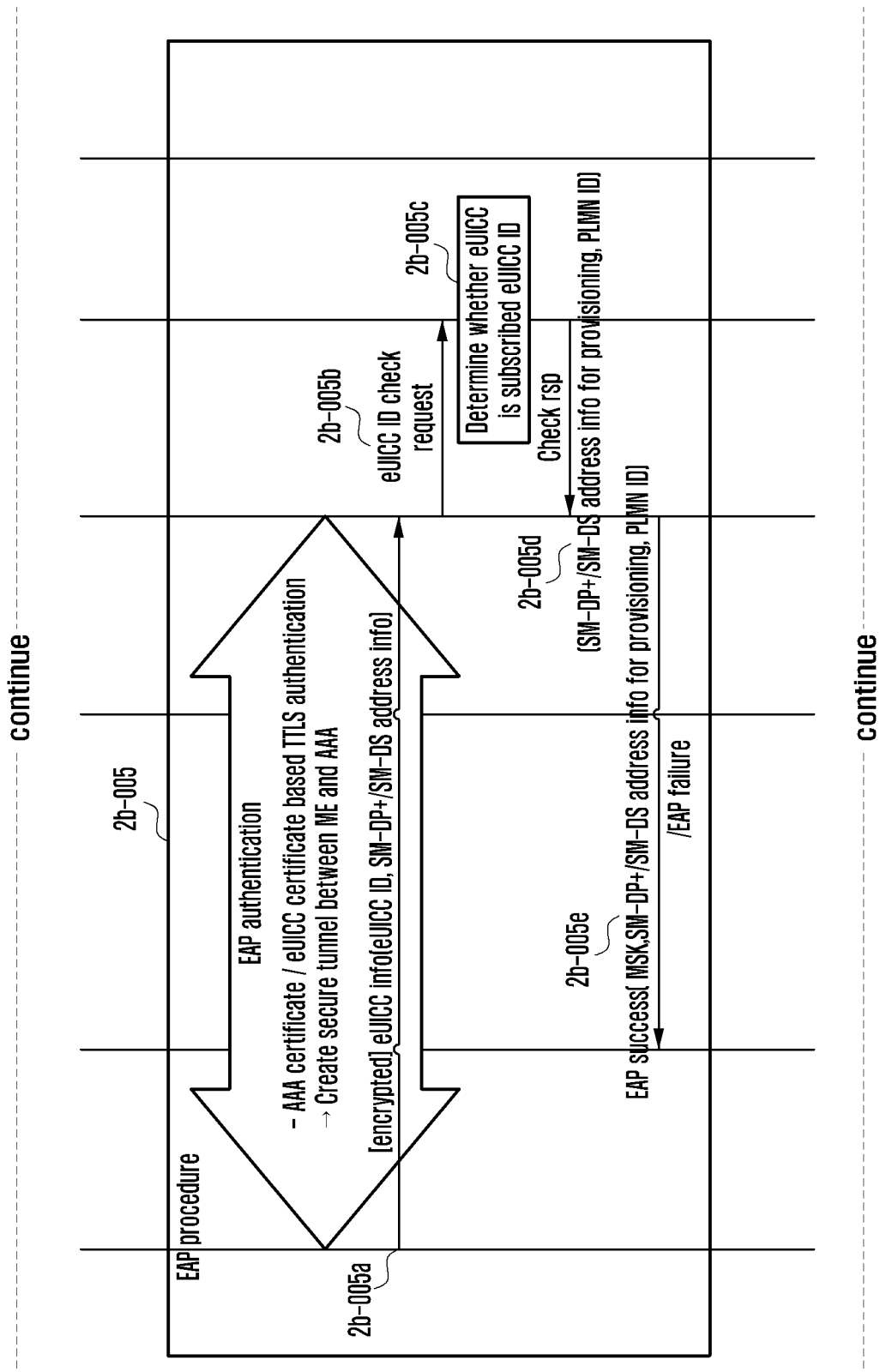
FIGS. 2BA to 2BE are diagrams illustrating network connection schemes for a terminal that is mounted with an eSIM to perform remote provisioning through determination of subscription/non-subscription in an EAP process.
Figure 2B:
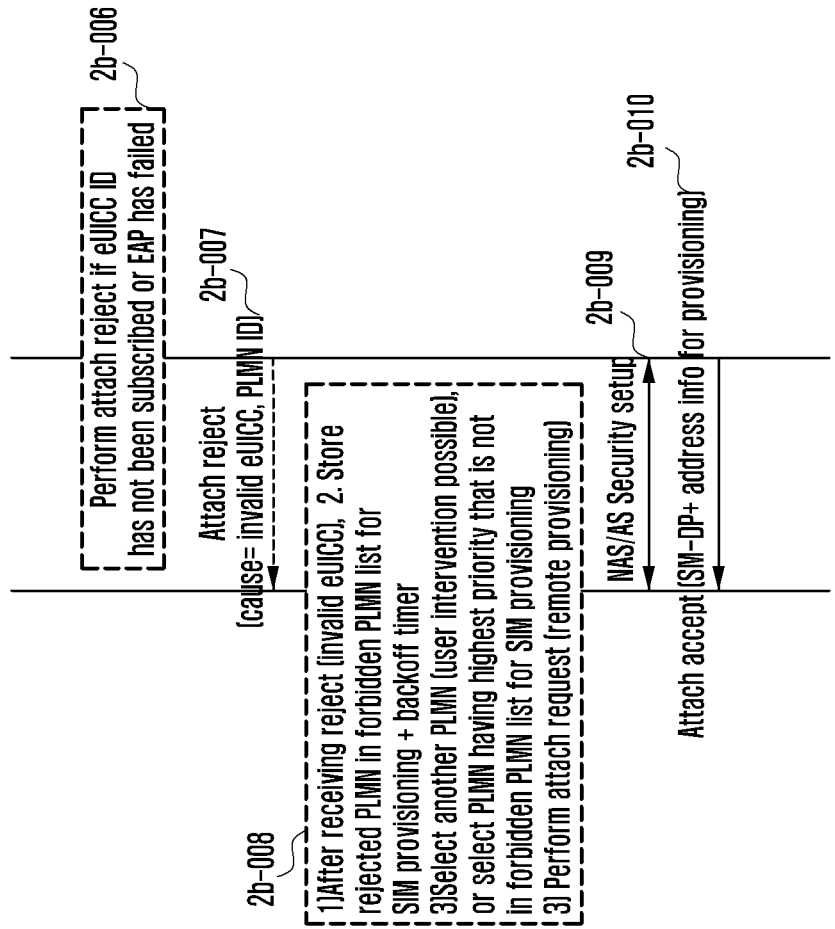
Figure 2B:
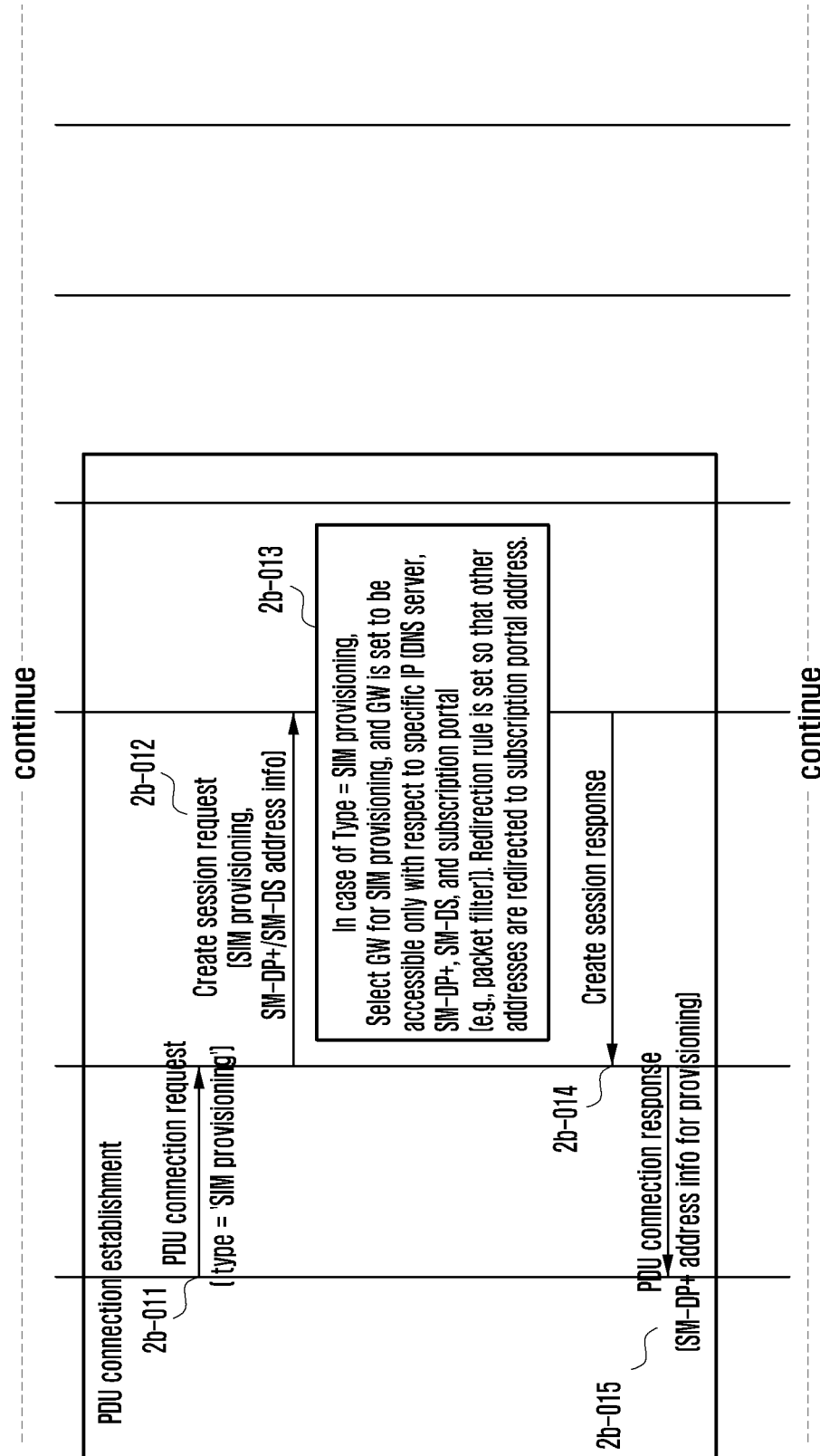

FIGS. 2BA to 2BE are diagrams illustrating network connection schemes for a terminal that is mounted with an eSIM to perform remote provisioning through determination of subscription/non-subscription in an EAP process. Hereinafter, FIGS. 2BA to 2BE are commonly called FIG. 2B.

Referring to FIG. 2B, in an embodiment of the present disclosure, a process is illustrated, in which a user or a terminal has already subscribed to a specific communication company, and the terminal having no SIM profile acquires connectivity through attaching to a cellular network and receives provisioning of the SIM profile through an eSIM server.

Accordingly, at operation 2b-001, a user data repository 2b-500 stores therein ID (i.e., EID) information of an eUICC that is provided in a terminal 2b-100 subscribed by the user or a terminal 2b-100 subscribed by an IoT service provider, and also stores therein address information of an eSIM server 2b-600 that provides provisioning of subscription data that corresponds to the EID and the SIM profile that corresponds to the EID. For example, the eSIM server 2b-600 that provides SIM profile provisioning may be, for example, a SM-DP+. In the description of the present disclosure, for convenience, the SM-DP+ is used to commonly call a SM-DP+ that is authenticated by GSMA and an eSIM server that provides SIM profile provisioning.

On the other hand, the specific SM-DP+ 2b-600 is a provisioning server that stores therein a SIM profile that corresponds to the EID of the subscribed terminal 2b-100, and the address information of the SM-DP+ is mapped on the EID information to be stored in the user data repository.

In a turn-on state, the terminal 2b-100 checks a SIM profile, and if there is not the SIM profile, the terminal recognizes that it is necessary to receive provisioning of the SIM profile, and acquires PDU connection in order to receive the provisioning. If it is determined or set for the terminal 2b-100 to receive the PDU connection through a cellular network, the terminal 2b-100 transfers a list of available PLMNs to an application of the terminal or an entity that takes charge of the provisioning on the basis of a list of PLMNs that are sensed through a cell search (2b-002).

The terminal 2b-100 may select a PLMN to be connected to for the provisioning on the basis of the transferred list of available PLMNs (2b-003). The selection of the PLMNs by the terminal 2b-100 may be performed through a user's selection input or in accordance with the priority order according to a specific priority rule in the terminal 2b-100. For example, if a user has already known the subscribed PLMN information, a provisioning app presents a list of PLMNs that can be selected through a UI, and the user may select a subscribed PLMN through which the user desires to receive the provisioning. As another method, if the subscribed PLMN information has already been set in the terminal 2b-100, it becomes possible to select the subscribed PLMN through which the user desires to receive the provisioning. As still another method, if a communication network service provider to be used is determined later after an IoT service provider purchases an IoT-oriented terminal, and thus there is no information on the communication network service provider in the terminal 2b-100, a PLMN that corresponds to the highest priority may be selected in accordance with the priority rule of the terminal 2b-100 itself, such as selection of a PLMN having the highest signal strength among available PLMNs or random selection of a PLMN among the available PLMNs.

The terminal 2b-100 requests a network connection through the PLMN that is selected in the above-described process while transmitting an attach request to a CP function 2b-200 (2b-004). In this case, since the terminal that has already subscribed to a communication company should receive provisioning of the SIM profile, it may separately indicate an attach type in an attach request message in order to indicate the attach process. For example, the terminal sets "attach type=remote provisioning". In this case, the attach request message may include an identity of the terminal 2b-100, for example, an International Mobile Station Equipment Identity (IMEI). Further, a Non-Access Stratum (NAS) of the terminal may indicate that the access request message is for SIM provisioning when the attach request message is transferred to an Access Stratum (AS). Information that indicates the SIM provisioning may be transferred to a base station, and may be used for the base station to select a suitable CP function.

The CP function 2b-200 or authenticator 2b-200 that has received the attach request triggers an authentication process between the eUICC and a network. For example, the CP function 2b-200 or authenticator 2b-200 triggers an EAP process 2b-005, and the eUICC of the terminal authenticates an AAA 2b-400 on the basis of an AAA certificate through an EAP-TTLS between the eUICC and the network, or performs mutual authentication between the eUICC of the terminal 2b-100 and the AAA on the basis of an eUICC certificate, and creates a secure tunnel between the terminal 2b-100 and the AAA 2b-400 on the basis of an encryption key that is created during the authentication process. The terminal 2b-100 sends the eUICC information to the AAA 2b-400 through the created secure tunnel (2b-005a). The eUICC information may include an eUICC ID (i.e., EID), and may further include an address of a server (e.g., SM-DP+) for provisioning of the SIM profile that is preset in the terminal 2b-100 or the eUICC or a server (e.g., SM-DS) for searching for an address of the provisioning server.

The AAA that has received the eUICC information transmits an eUICC ID check request message that includes the eUICC information to the user data repository 2b-500 in order to determine whether the eUICC is an eUICC of a subscribed user (2b-005b).

The user data repository 2b-500 determines whether the received eUICC ID has been subscribed (2b-005c). If there is no information on the corresponding eUICC ID in the user data repository, it is checked whether the received eUICC ID that has not been subscribed to the corresponding PLMN corresponds to a terminal that has been subscribed to another PLMN. That is, the user data repository may attach to a server (e.g., SM-DS) that can search for the address of the provisioning server, and may find out what PLMN the terminal has been subscribed to with respect to the corresponding eUICC ID, or of what SIM profile a server (e.g., SM-DP+), in which the SIM profile of the eUICC ID has been stored, provides provisioning.

The user data repository 2b-500 transfers information of a related server to the AAA 2b-400 together with subscription/non-subscription of the eUICC ID (2b-005d).

For example, in the case of the eUICC that has been subscribed to the PLMN to which the terminal is attaching, the address information of the provisioning server (e.g., SM-DP+) in which the SIM profile of the eUICC ID is stored may be included therein. Of course, address information of the server (e.g., SM-DS) that can search for the provisioning server may also be included therein. Further, ID information of the PLMN for notifying of the information of the subscribed PLMN may also be included therein. However, if the eUICC is determined as an eUICC that is not subscribed to the PLMN to which the terminal is attaching, it may be notified that the eUICC is an unsubscribed eUICC, while if the eUICC is determined as an eUICC that has been subscribed to another PLMN at operation 2b-005c, ID information of the PLMN for notifying of the information of the subscribed PLMN may also be included therein. Further, address information of the provisioning server (e.g., SM- DP+) in which the SIM profile of the eUICC ID is stored may also be included therein. Of course, address information of the server (e.g., SM-DS) that can search for the provisioning server may also be included therein.

On the other hand, the AAA 2*b*-400 that has received information on whether the eUICC has been subscribed may transfer the information to the CP function 2*b*-200 or the authenticator 2*b*-200 together with the authentication result in the process of completing the authentication process (2*b*-005*e*). For example, if the EAP authentication has been successfully completed, the AAA may transfer the address information of the provisioning server (e.g., SM-DP+) in which the SIM profile of the eUICC ID is stored together with a Master Session Key (MSK) that is created during the authentication process. Of course, the address information of the server (e.g., SM-DS) that can search for the provisioning server may also be included therein. Further, what PLMN the eUICC has been subscribed to may be included in the ID of the PLMN. IF the ID of the PLMN is omitted, it can be known that the eUICC has been subscribed to the PLMN being attached. However, if the EAP authentication has failed or if the eUICC is an unsubscribed eUICC, the EAP failure may be sent to the CP function 2*b*-200 or the authenticator 2*b*-200. Even in this case, if the PLMN to which the corresponding terminal 2*b*-100 has been subscribed is grasped, the ID of the subscribed PLMN may also be included in the EAP failure message.

After completion of the authentication process, if the eUICC has not been subscribed to the corresponding PLMN and thus an attach to the network is not permitted, or if the EAP has failed and thus an attach is not permitted (2*b*-007), the CP function 2*b*-200 or the authenticator 2*b*-200 performs an attach reject. In this case, when an attach reject message is sent to the terminal 2*b*-100, the terminal is notified that the eUICC has not been subscribed to the corresponding PLMN as a reject cause. For example, "cause=invalid eUICC" or "eUICC has not been subscribed to this PLMN" may be set. Further, if the CP function or the authenticator 2*b*-200 knows that the eUICC has been subscribed to another PLMN, ID information of the subscribed PLMN may be included therein (2*b*-007).

In the case of receiving the attach reject message, the terminal 2*b*-100 may store the ID of the corresponding PLMN in a forbidden PLMN list for SIM provisioning, and may apply a backoff timer for a predetermined time. If the attach reject message includes the ID of the PLMN to which the eUICC has been subscribed, the received PLMN may be selected to perform the next attach (2*b*-008). When the terminal 2*b*-100 selects a PLMN among available PLMNs to perform the next attach, the PLMN that is included in the forbidden PLMN list for SIM provisioning is excluded from the available PLMN list. In this case, the selection of the PLMN is performed in the same method as 2*b*-003, and the terminal 2*b*-100 performs again an attach request process for the remote provisioning.

On the other hand, the terminal 2*b*-100 and the CP function 2*b*-200, or the authenticator 2*b*-200 share a security context on the basis of the MSK that is acquired at operation 2*b*-005*e*, and perform sync-up of security keys to be used in a Non-Access Stratum (NAS) and an Access Stratum (AS) (2*b*-009). Operation 2*b*-009 may be performed before the attach reject is sent.

If the setup of the security key is completed, the CP function or the authenticator 2*b*-200 may send an attach accept message to the terminal 2*b*-100 to notify of successful attach to the network (2*b*-010). The attach accept message may include the address information of the provisioning server (e.g., SM-DP+) in which the SIM profile for the eUICC ID is stored.

The terminal 2*b*-100 requests the CP function 2*b*-200 to create a PDU connection for SIM provisioning (2*b*-011). A PDU connection request message may configure a separate type to notify that the PDU connection is to perform the SIM provisioning. For example, "type=SIM provisioning" may be set. On the other hand, at operation 2*b*-004, the terminal 2*b*-100 may piggyback a PDU connection request message on an attach request message, and even if the PDU connection request message is not transferred together in the case where the access type of the attach request message is for the remote provisioning, the terminal may proceed with a session creation process for making the PDU connection for the SIM provisioning.

The CP function 2*b*-200 that has received a PDU connection creation request selects a suitable UP function in order to send a create session request message. In this case, the CP function may select the UP function in consideration of the SIM provisioning, or may select a suitable network slice and select a suitable UP function of the selected network slice.

The CP function 2*b*-200 transmits a create session request message to a suitable UP function 2*b*-300 (2*b*-012). The create session request message may include an address of a SM-DS server or an address of a SM-DP+ server that is received at operation 2*b*-005*e*. Further, the create session request message may include an address of a SM-DS server or an address of a SM-DP+ server that is received from the terminal 2*b*-100. The create session request message may include an indication capable of notifying of the request for SIM provisioning.

Then, the UP function 2*b*-300 selects a GW for SIM provisioning, and allocates an IP address thereto. In this case, the PDU connection may be configured so that the terminal 2*b*-100 can attach only to an address of a SM-DP+ server for provisioning, an address of a SM-DS server for searching for the SM-DP+, an address of a DNS server, and an address of a subscription portal so that the terminal 2*b*-100 can use the same only for the purpose of traffic for the SIM provisioning (2*b*-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2*b*-100 or the address of the SM-DS server or the address of the SM-DP+ server that is transferred through operations 2*b*-005*e* and 2*b*-012, or the address that is serviced by the terminal 2*b*-100 may be used for authorization. Further, in the case of attempting an attach to another address other than the above-described address, a redirection rule may be set in the UP function 2*b*-300 so as to redirect the attach to the subscription portal.

The UP function 2*b*-300 may transfer a response to the CP function 2*b*-200 (2*b*-014), and the CP function 2*b*-200 may transfer a PDU connection response message up to the terminal 2*b*-100 (2*b*-015). In this case, the address of the SM-DP+ server for provisioning may be transferred up to the terminal 2b-100 together with the PDU connection response message.

Thereafter, the terminal 2b-100 attaches to the SM-DP+ 2b-600 using the acquired PDU connectivity to receive a SIM profile (2b-017). However, if the terminal 2b-100 attempts an attach to an address other than the address that is permitted so that the terminal 2b-100 can use the address only for the purpose of traffic for the SIM provisioning, the attach is redirected to the subscription portal (2b-016).

On the other hand, if the SIM provisioning is delayed for a predetermined time or the SIM provisioning has failed, the terminal adds an ID of the currently attached PLMN to a forbidden PLMN list for initial provisioning, and then performs detach and attach request processes in order (2b-018).

If the provisioning of the SIM profile is successfully performed, the terminal 2b-100 may perform a detach process for the attach using the downloaded SIM profile (2b-019). After selecting the downloaded SIM profile, the terminal 2b-100 may perform an attach process to use a data service (2b-020).

Instead of performing operations 2b-019 and 2b-020, the terminal 2b-100 may not perform the detach process, but may select the downloaded SIM profile, and then may update the existing attach information to use a normal data service.

Figure 2C:
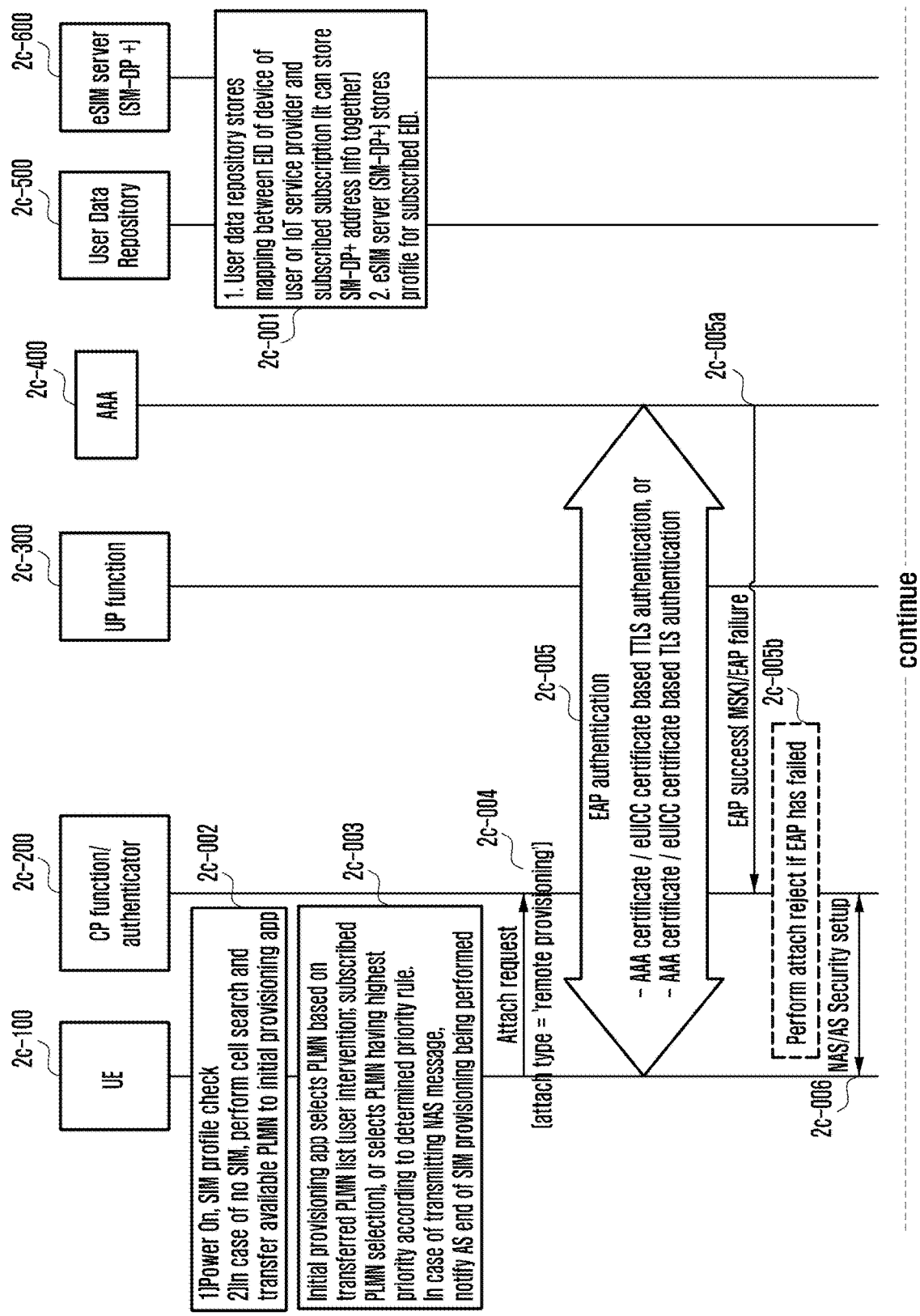
FIGS. 2CA to 2CD are diagrams illustrating network connection schemes for a terminal that is mounted with an eSIM to perform initial provisioning through an EAP process and a separate subscription/non-subscription determination procedure.
Figure 2C:
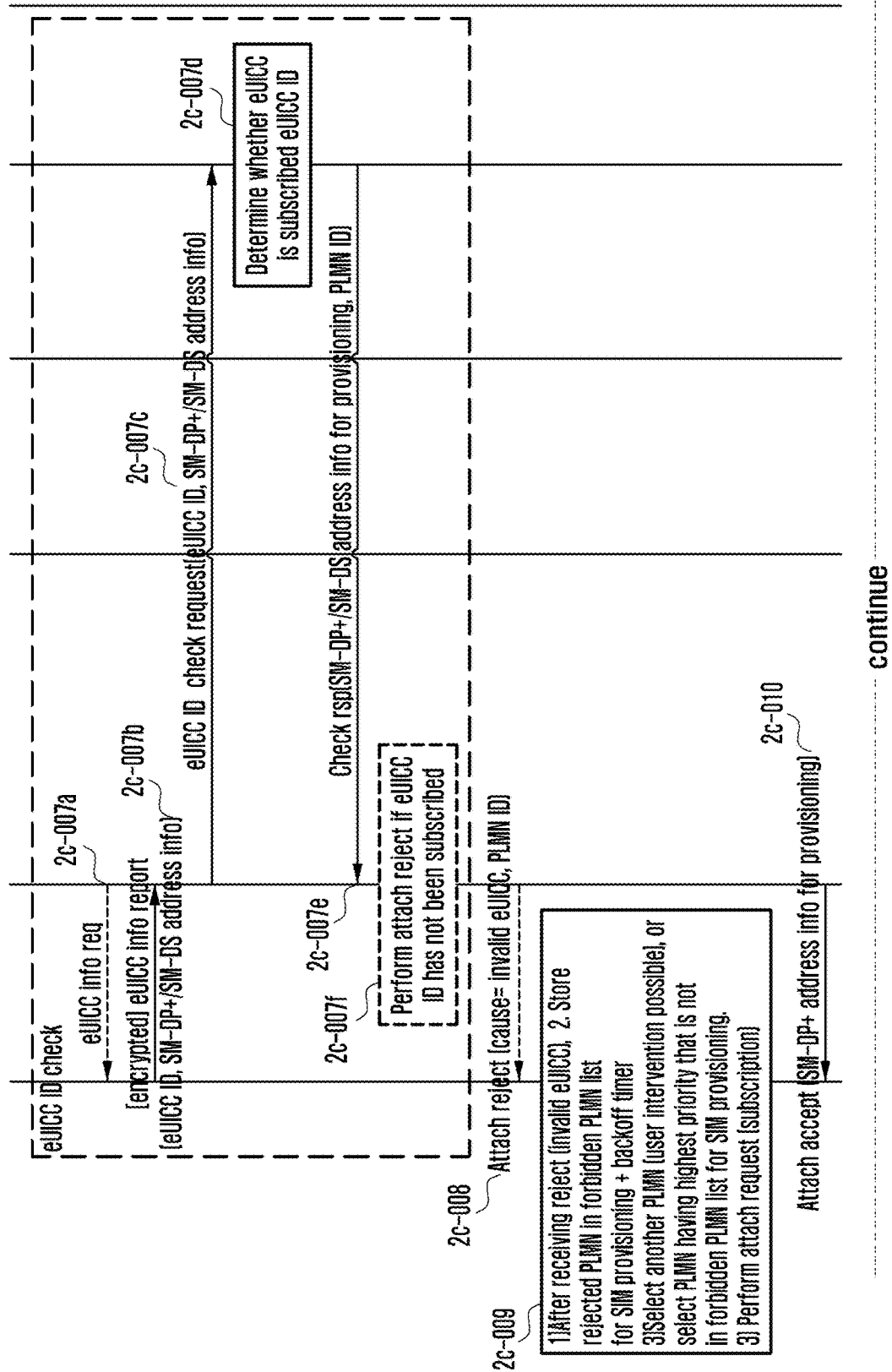
Figure 2C:
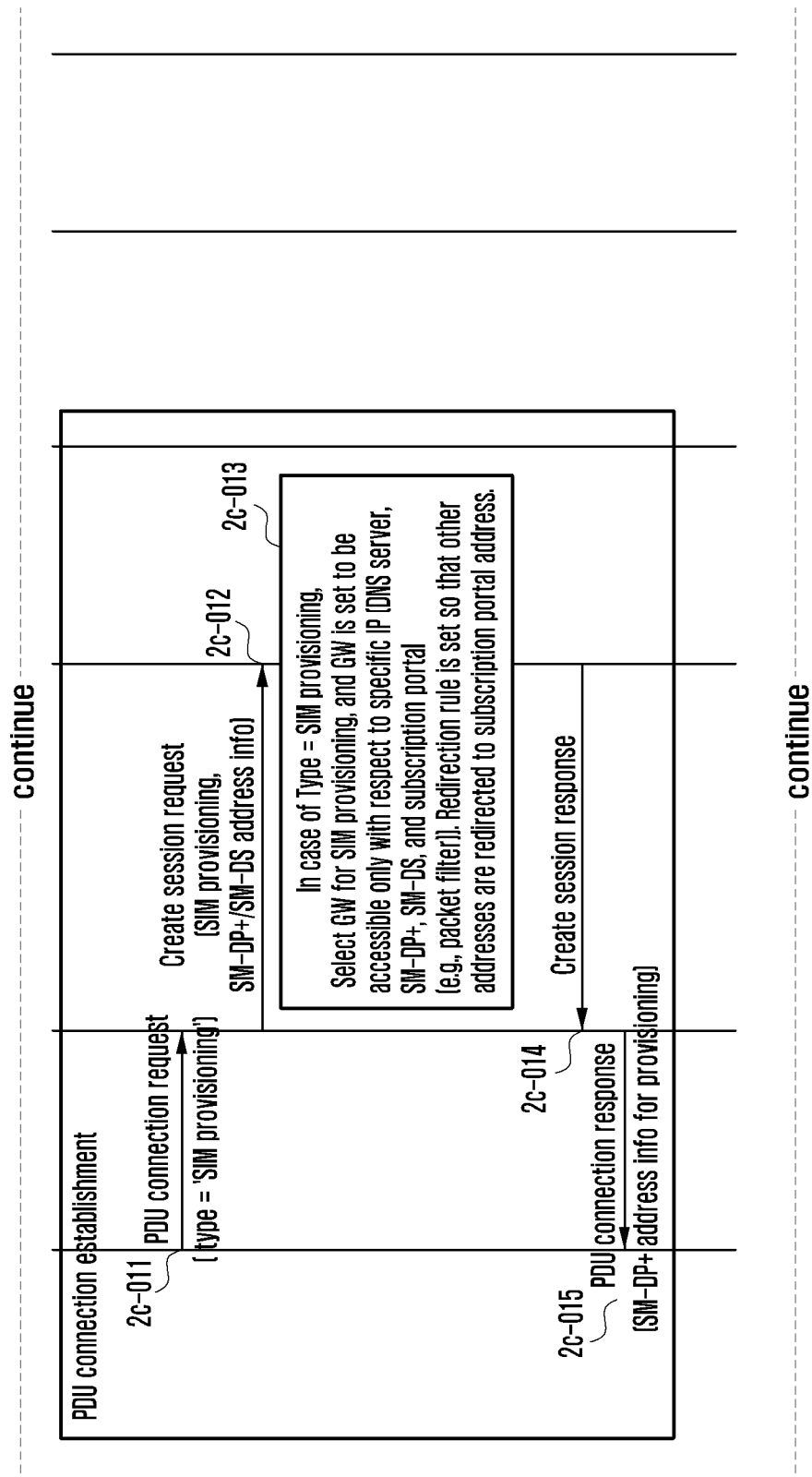
Figure 2C:
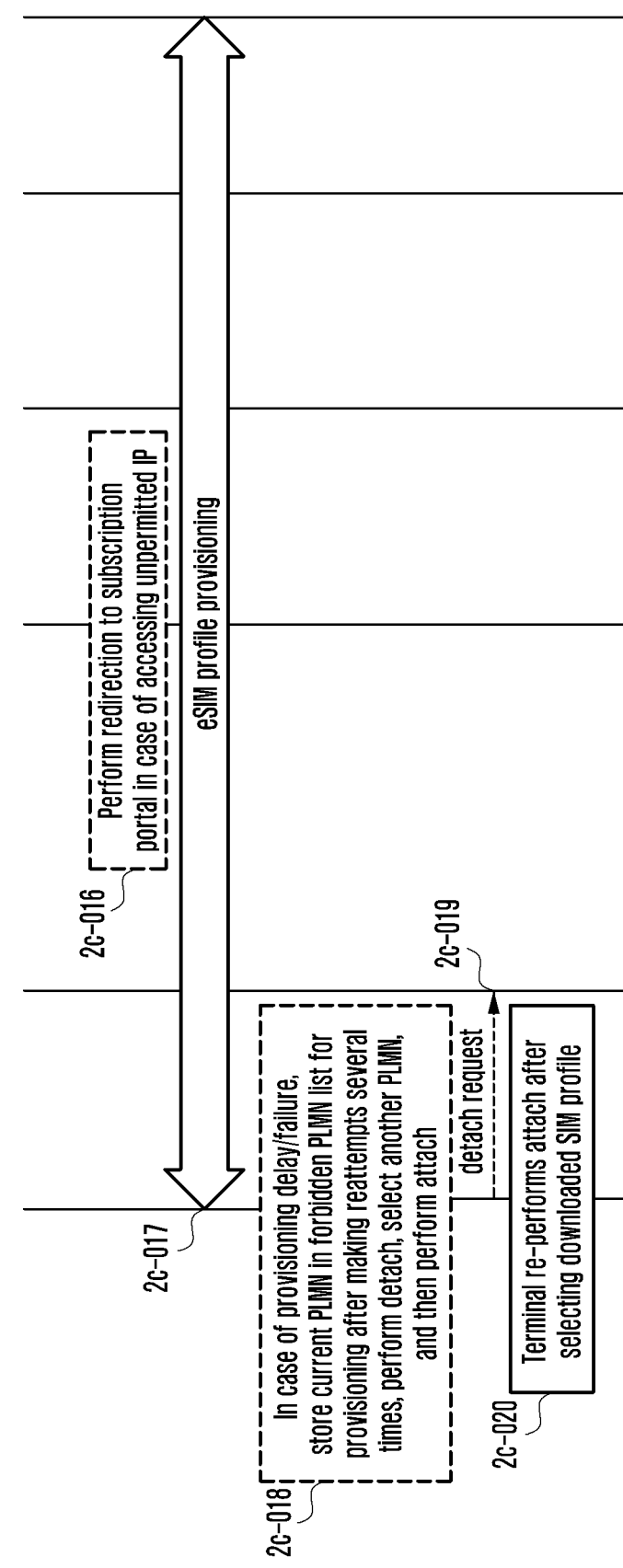

FIGS. 2CA to 2CD are diagrams illustrating network connection schemes for a terminal that is mounted with an eSIM to perform initial provisioning through an EAP process and a separate subscription/non-subscription determination procedure. Hereinafter, FIGS. 2CA to 2CD are commonly called FIG. 2C.

Referring to FIG. 2C, in an embodiment of the present disclosure, a process is illustrated, in which a user or a terminal has already subscribed to a specific communication company, and the terminal having no SIM profile acquires connectivity through attaching to a cellular network and receives provisioning of the SIM profile through an eSIM server.

Accordingly, at operation 2c-001, a user data repository 2c-500 stores therein ID (i.e., EID) information of an eUICC that is provided in a terminal 2c-100 subscribed by the user or a terminal 2c-100 subscribed by an IoT service provider, and also stores therein address information of an eSIM server 2c-600 that provides provisioning of subscription data that corresponds to the EID and the SIM profile that corresponds to the EID. For example, the eSIM server 2c-600 that provides SIM profile provisioning may be, for example, a SM-DP+. In the description of the present disclosure, for convenience, the SM-DP+ is used to commonly call a SM-DP+ that is authenticated by GSMA and an eSIM server that provides SIM profile provisioning.

On the other hand, the specific SM-DP+ 2c-600 is a provisioning server that stores therein a SIM profile that corresponds to the EID of the subscribed terminal 2c-100, and the address information of the SM-DP+ is mapped on the EID information to be stored in the user data repository.

In a turn-on state, the terminal 2c-100 checks a SIM profile, and if there is not the SIM profile, the terminal recognizes that it is necessary to receive provisioning of the SIM profile, and acquires PDU connection in order to receive the provisioning. If it is determined or set for the terminal 2c-100 to receive the PDU connection through a cellular network, the terminal 2c-100 transfers a list of available PLMNs to an application of the terminal or an entity that takes charge of the provisioning on the basis of a list of PLMNs that are sensed through a cell search (2c-002).

The terminal 2c-100 may select a PLMN to be connected to for the provisioning on the basis of the transferred list of available PLMNs (2c-003). The selection of the PLMNs by the terminal 2c-100 may be performed through a user's selection input or in accordance with the priority order according to a specific priority rule in the terminal 2c-100. For example, if a user has already known the subscribed PLMN information, a provisioning app presents a list of PLMNs that can be selected through a UI, and the user may select a subscribed PLMN through which the user desires to receive the provisioning. As another method, if the subscribed PLMN information has already been set in the terminal 2c-100, it becomes possible to select the subscribed PLMN through which the user desires to receive the provisioning. As still another method, if a communication network service provider to be used is determined later after an IoT service provider purchases an IoT-oriented terminal, and thus there is no information on the communication network service provider in the terminal 2c-100, a PLMN that corresponds to the highest priority may be selected in accordance with the priority rule of the terminal itself, such as selection of a PLMN having the highest signal strength among available PLMNs or random selection of a PLMN among the available PLMNs.

The terminal 2c-100 requests a network connection through the PLMN that is selected in the above-described process while transmitting an attach request to a CP function 2c-200 (2b-004). In this case, since the terminal that has already subscribed to a communication company should receive provisioning of the SIM profile, it may separately indicate an attach type in an attach request message in order to indicate the attach process. For example, the terminal sets "attach type=remote provisioning". In this case, the attach request message may include an identity of the terminal 2c-100, for example, an International Mobile Station Equipment Identity (IMEI). Further, a Non-Access Stratum (NAS) of the terminal 2c-100 may indicate that the access request message is for SIM provisioning when the attach request message is transferred to an Access Stratum (AS). Information that indicates the SIM provisioning may be transferred to a base station, and may be used for the base station to select a suitable CP function.

The CP function 2c-200 or authenticator 2c-200 that has received the attach request triggers an authentication process between the eUICC and a network. For example, the CP function 2c-200 or authenticator 2c-200 triggers an EAP process 2c-005, and mutual authentication is performed between the eUICC of the terminal 2c-100 and an AAA 2c-400 on the basis of an AAA certificate and an eUICC certificate through an EAP-TLS or EAP-TTLS. In the process of completing the authentication process, the AAA 2c-400 may transfer the result of the authentication to the CP function 2c-200 or the authenticator 2c-200 (2c-005a). For example, if the EAP authentication has been successfully completed, a Master Session Key (MSK) that is created in the authentication process may be transferred while an EAP success is transmitted to the CP function 2c-200 or the authenticator 2c-200. However, if the EAP authentication has failed, an EAP failure may be transmitted to the CP function 2c-200 or the authenticator 2c-200. In this case, the CP function 2c-200 or the authenticator 2c-200 may perform an attach reject (2c-005b). On the other hand, the terminal 2c-100 and the CP function 2c-200 or the authenticator 2c-200 may share a security context on the basis of the MSK that is acquired at operation 2c-005a, and may perform sync-up of security keys to be used in a Non-Access Stratum (NAS) and an Access Stratum (AS) (2c-006).

If the security is set up as described above, a process of checking whether an eUICC has been subscribed may be performed. For this, the CP function 2c-200 may request eUICC information from the terminal 2c-100 (2c-007a). If the eUICC information request message is received (2c-007a) or the setup of the security keys is completed (2c-006), the terminal 2c-100 may encrypt and transmit an eUICC ID of the terminal 2c-100 to the CP function 2c-200 (2c-007a).

The eUICC information may include an eUICC ID (i.e., EID), and may include an address of a server (e.g., SM-DP+) for provisioning of the SIM profile that is preset in the terminal 2c-100 or the eUICC or an address of a server (e.g., SM-DS) for searching for an address of the provisioning server.

The CP function 2c-200 that has received the eUICC information transmits an eUICC ID check request message that includes the eUICC information to the user data repository 2c-500 in order to determine whether the eUICC is an eUICC of the subscribed user (2c-007c).

The user data repository 2c-500 determines whether the received eUICC ID has been subscribed (2c-007d). If there is no information on the corresponding eUICC ID in the user data repository 2c-500, it is checked whether the received eUICC ID that has not been subscribed to the corresponding PLMN corresponds to a terminal that has been subscribed to another PLMN. That is, the user data repository may attach to a server (e.g., SM-DS) that can search for the address of the provisioning server, and may find out what PLMN the terminal has been subscribed to with respect to the corresponding eUICC ID, or of what SIM profile a server (e.g., SM-DP+), in which the SIM profile of the eUICC ID has been stored, provides provisioning.

The user data repository 2c-500 transfers information of a related server to the CP function 2c-200 together with subscription/non-subscription of the eUICC ID (2c-007e).

For example, in the case of the eUICC that has been subscribed to the PLMN to which the terminal is attaching, the address information of the provisioning server (e.g., SM-DP+) in which the SIM profile of the eUICC ID is stored may be included therein. Of course, address information of the server (e.g., SM-DS) that can search for the provisioning server may also be included therein. Further, ID information of the PLMN for notifying of the information of the subscribed PLMN may also be included therein. However, if the eUICC is determined as an eUICC that is not subscribed to the PLMN to which the terminal is attaching, it may be notified that the eUICC is an unsubscribed eUICC, while if the eUICC is determined as an eUICC that has been subscribed to another PLMN at operation 2c-007d, ID information of the PLMN for notifying of the information of the subscribed PLMN may also be included therein. Further, address information of the provisioning server (e.g., SM-DP+) in which the SIM profile of the eUICC ID is stored may also be included therein. Of course, address information of the server (e.g., SM-DS) that can search for the provisioning server may also be included therein. Further, the ID of the PLMN for notifying what PLMN the eUICC has been subscribed to may be included therein. If the ID of the PLMN is omitted, it can be known that the eUICC has been subscribed to the PLMN to which the terminal 2c-100 is attaching. However, if the eUICC has not been subscribed to the corresponding PLMN and thus an attach to the network is not permitted (2c-007f), an attach reject is performed. In this case, the CP function 2c-200 sends an attach reject message to the terminal 2c-100, and notifies the terminal 2c-100 that the eUICC has not been subscribed to the corresponding PLMN as a reject cause. For example, "cause=invalid eUICC" or "eUICC has not been subscribed to this PLMN" may be set. Further, if the CP function 2c-200 knows that the eUICC has been subscribed to another PLMN, ID information of the subscribed PLMN may be included therein (2c-008).

In the case of receiving the attach reject message, the terminal 2c-100 may store the ID of the corresponding PLMN in a forbidden PLMN list for SIM provisioning, and may apply a backoff timer for a predetermined time. If the attach reject message includes the ID of the PLMN to which the eUICC has been subscribed, the received PLMN may be selected to perform the next attach (2c-008). When the terminal 2c-100 selects a PLMN among available PLMNs to perform the next attach, the PLMN that is included in the forbidden PLMN list for SIM provisioning is excluded from the available PLMN list. In this case, the selection of the PLMN is performed in the same method as 2c-003, and the terminal 2c-100 performs again an attach request process for the remote provisioning.

If the setup of the security keys is completed, the CP function 2c-200 or the authenticator 2c-200 may send an attach accept message to the terminal 2c-100 to notify of successful attach to the network (2c-010). The attach accept message may include the address information of the provisioning server (e.g., SM-DP+) in which the SIM profile for the eUICC ID is stored.

The terminal 2c-100 requests the CP function 2c-200 to create a PDU connection for SIM provisioning (2c-011). A PDU connection request message may configure a separate type to notify that the PDU connection is to perform the SIM provisioning. For example, "type=SIM provisioning" may be set. On the other hand, at operation 2c-004, the terminal 2c-100 may piggyback a PDU connection request message on an attach request message, and even if the PDU connection request message is not transferred together in the case where the access type of the attach request message is for the remote provisioning, the terminal may proceed with a session creation process for making the PDU connection for the SIM provisioning.

The CP function 2c-200 that has received a PDU connection creation request selects a suitable UP function in order to send a create session request message. In this case, the CP function may select the UP function in consideration of the SIM provisioning, or may select a suitable network slice and select a suitable UP function of the selected network slice.

The CP function 2c-200 transmits a create session request message to a suitable UP function 2c-300 (2c-012). The create session request message may include an address of a SM-DS server or an address of a SM-DP+ server that is received at operation 2c-005e. Further, the create session request message may include an address of a SM-DS server or an address of a SM-DP+ server that is received from the terminal 2c-100. The create session request message may also include an indication capable of notifying of the request for SIM provisioning. Then, the UP function 2c-300 selects a GW for SIM provisioning, and allocates an IP address thereto. In this case, the PDU connection may be configured so that the terminal 2c-100 can attach only to an address of a SM-DP+ server for provisioning, an address of a SM-DS server for searching for the SM-DP+, an address of a DNS server, and an address of a subscription portal so that the terminal 2c-100 can use the same only for the purpose of traffic for the SIM provisioning (2c-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2c-100, or the address of the SM-DS server or the address of the SM-DP+ server that is transferred through operations 2c-005e and 2c-012, or an address that is serviced by the terminal may be used for authorization. Further, in the case of attempting an attach to another address other than the above-described address, a redirection rule may be set in the UP function 2c-300 so as to redirect the attach to the subscription portal.

The UP function 2c-300 may transfer a response to the CP function 2c-200 (2c-014), and the CP function 2c-200 may transfer a PDU connection response message up to the terminal 2c-100 (2c-015). In this case, the address of the SM-DP+ server for provisioning may be transferred up to the terminal 2c-100 together with the PDU connection response message.

Thereafter, the terminal 2c-100 attaches to the SM-DP+ 2c-600 using the acquired PDU connectivity to receive a SIM profile (2c-017). However, if the terminal 2c-100 attempts an attach to an address other than the address that is permitted so that the terminal 2c-100 can use the address only for the purpose of traffic for the SIM provisioning, the attach is redirected to the subscription portal (2c-016).

On the other hand, if the SIM provisioning is delayed for a predetermined time or the SIM provisioning has failed, the terminal 2c-100 adds an ID of the currently attached PLMN to a forbidden PLMN list for initial provisioning, and then performs detach and attach request processes in order (2c-018). If the provisioning of the SIM profile is successfully performed, the terminal 2c-100 may perform a detach process for the attach using the downloaded SIM profile (2c-019). After selecting the downloaded SIM profile, the terminal may perform an attach process to use a data service (2c-020).

Instead of performing operations 2c-019 and 2c-020, the terminal 2c-100 may not perform the detach process, but may select the downloaded SIM profile, and then may update the existing attach information to use a normal data service.

Figure 2D:
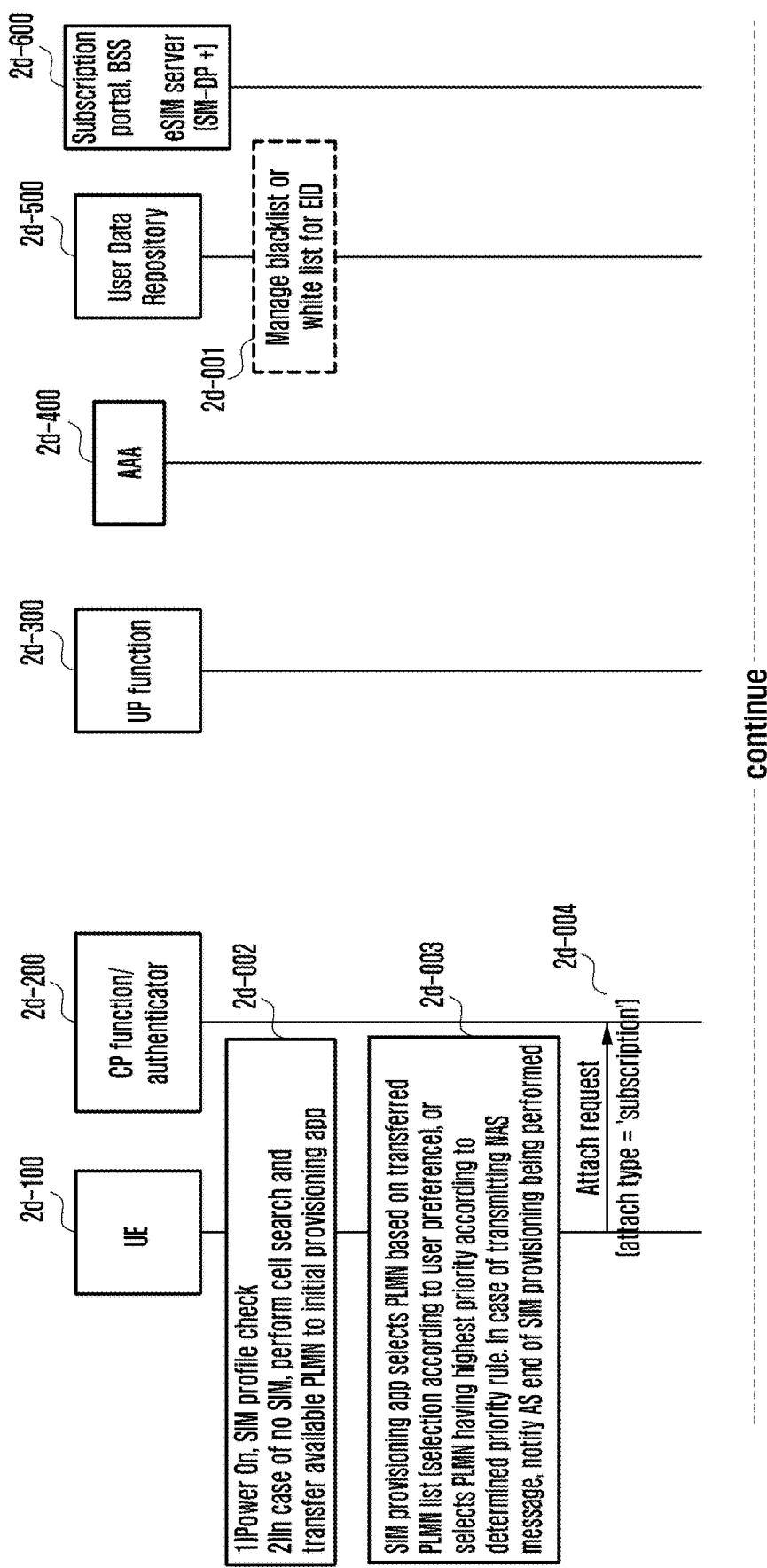
FIGS. 2DA to 2DD are diagrams illustrating network connection schemes for a terminal that is mounted with an eSIM to make a subscription and to perform provisioning through determination of whether to permit eUICC in an EAP process.
Figure 2D:
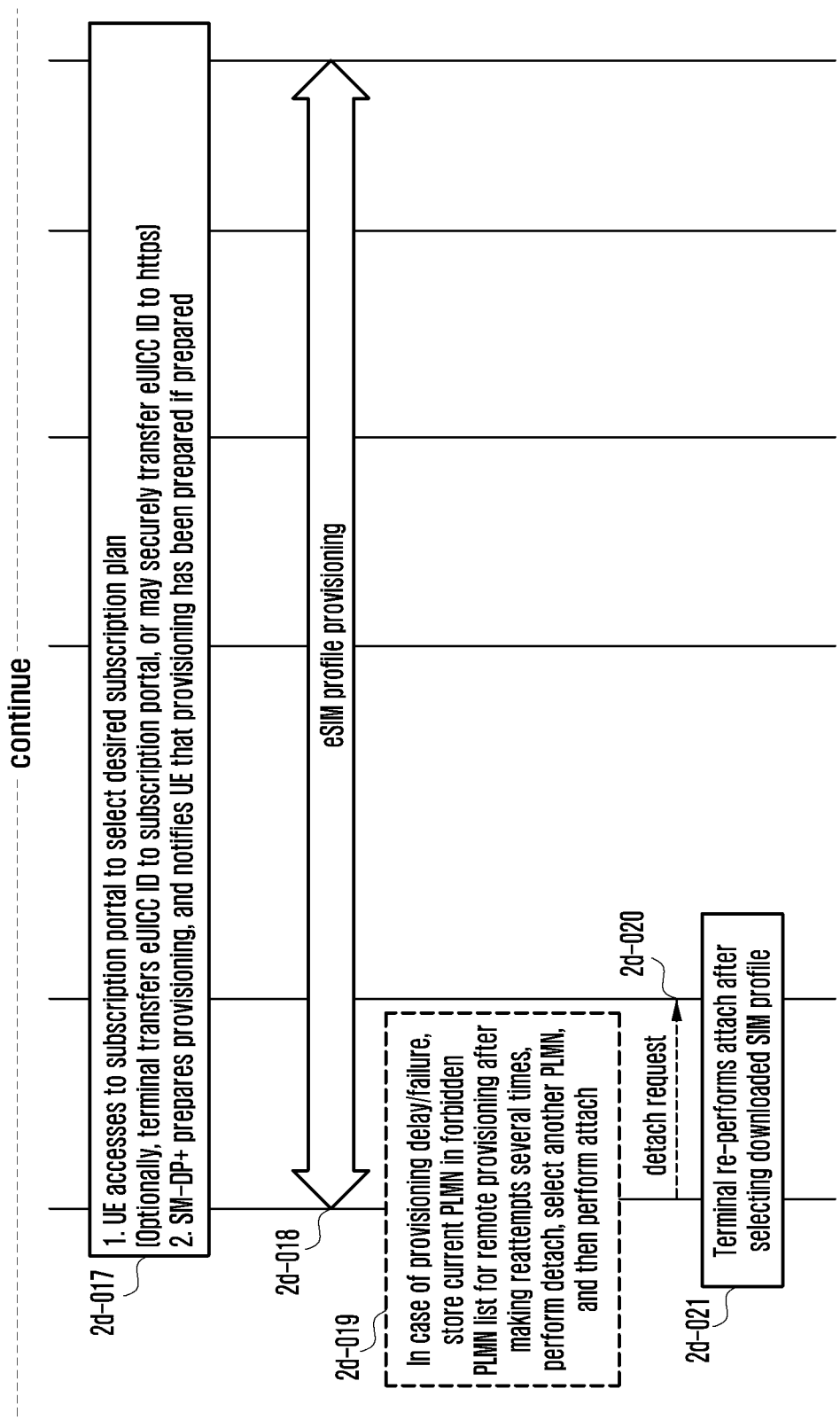

FIGS. 2DA to 2DD are diagrams illustrating network connection schemes for a terminal that is mounted with an eSIM to make a subscription and to perform provisioning through determination of whether to permit eUICC in an EAP process. Hereinafter, FIGS. 2DA to 2DD are commonly called FIG. 2D.

Referring to FIG. 2D, in an embodiment of the present disclosure, a process is illustrated, in which a terminal that has not yet subscribed to any communication company acquires connectivity through attaching to a cellular network, subscribes online to the network, and receives provisioning of a SIM profile through an eSIM server.

Accordingly, at operation 2d-001, a user data repository 2d-500 stores therein white list information for an ID (i.e., EID) of a valid or permitted eUICC that is possessed by each service provider or blacklist information for an ID of an invalid eUICC that is reported to have a problem. For example, if an accident, such as an illegal use or theft, occurs for the corresponding EID in a specific communication company, the corresponding EID may be classified into a blacklist as unpermitted EID, and blacklist information may be shared with other communication companies in accordance with relationship between the communication companies. Further, in the case of terminals that are made for a specific communication company, EID information of the respective terminals are managed in the white list, and may be used to determine whether to permit their attaching for provisioning.

On the other hand, a terminal that has not yet been subscribed may select a subscription plan that is provided by a corresponding service provider through attaching to a subscription portal 2d-600. In this case, selected information interlocks with a Business Sales System (BSS), and an eSIM server that provides provisioning of a SIM profile that corresponds to an EID of the terminal prepares a SIM profile for the corresponding selected subscription plan.

For example, the eSIM server that provides provisioning of the SIM profile may be, for example, a SM-DP+. In the description of the present disclosure, for convenience, the SM-DP+ is used to commonly call a SM-DP+ that is authenticated by GSMA and an eSIM server that provides SIM profile provisioning. In the description of the present disclosure, detailed interlocking schemes between a subscription portal, a BSS, and the SM-DP+ are not described.

In a turn-on state, the terminal 2d-100 checks a SIM profile, and if there is not the SIM profile, the terminal recognizes that it is necessary to receive provisioning of the SIM profile, and acquires PDU connection in order to receive the provisioning. If it is determined or set for the terminal 2d-100 to receive the PDU connection through a cellular network, the terminal 2d-100 transfers a list of available PLMNs to an application of the terminal or an entity that takes charge of the provisioning on the basis of a list of PLMNs that are sensed through a cell search (2d-002). The terminal may select a PLMN to be connected to for the provisioning on the basis of the transferred list of available PLMNs (2d-003).

The selection of the PLMNs by the terminal 2d-100 may be performed through a user's selection input or in accordance with the priority order according to a specific priority rule in the terminal 2d-100. For example, if a user desires to subscribe to a PLMN, a provisioning app presents a list of PLMNs that can be selected through a UI, and the user may select a subscribed PLMN through which the user desires to receive the provisioning. As another method, if the subscribed PLMN information has already been set in the terminal 2d-100, it becomes possible to select the subscribed PLMN through which the user desires to receive the provisioning. As still another method, if the user does not have a separate preference to the PLMN to which the user desires to subscribe, a PLMN that corresponds to the highest priority may be selected in accordance with the priority rule of the terminal 2d-100 itself, such as selection of a PLMN having the highest signal strength among available PLMNs or random selection of a PLMN among the available PLMNs.

The terminal 2d-100 requests a network connection through the PLMN that is selected in the above-described process while transmitting an attach request to a CP function 2d-200 (2d-004). In this case, in order to indicate that the terminal 2d-100 subscribes to a communication company and attaches thereto to receive provisioning of a SIM profile, the terminal separately indicates an attach type. For example, "attach type=subscription" is set. In this case, the attach request message may include an identity of the terminal 2d-100, for example, an International Mobile Station Equipment Identity (IMEI). Further, a Non-Access Stratum (NAS) of the terminal 2d-100 may indicate that the access request message is for SIM provisioning when the attach request message is transferred to an Access Stratum (AS). Information that indicates the SIM provisioning may be transferred to a base station, and may be used for the base station to select a suitable CP function.

The CP function 2d-200 or authenticator 2d-200 that has received the attach request triggers an authentication process between the eUICC and a network. For example, the CP function 2d-200 or authenticator 2d-200 triggers an EAP process 2d-005, and the eUICC of the terminal authenticates an AAA 2d-400 on the basis of an AAA certificate through an EAP-TTLS between the eUICC and the AAA 2d-400 of the network, or performs mutual authentication between the eUICC of the terminal 2d-100 and the AAA 2d-400 on the basis of an AAA certificate and an eUICC certificate, and creates a secure tunnel between the terminal 2d-100 and the AAA 2d-400 on the basis of an encryption key that is created during the authentication process. The terminal 2d-100 sends the eUICC information to the AAA 2d-400 through the created secure tunnel (2d-005a). The eUICC information may include an eUICC ID (i.e., EID), and may further include an address of a server (e.g., SM-DP+) for provisioning of the SIM profile that is preset in the terminal 2d-100 or the eUICC or a server (e.g., SM-DS) for searching for an address of the provisioning server.

The AAA 2d-400 that has received the eUICC information may send an eUICC ID report message that includes the eUICC information to the user data repository 2d-500 in order to determine whether the eUICC is a permitted eUICC (2d-005b). The user data repository 2d-500 determines whether the received eUICC ID is a permitted eUICC (2d-005c). The user data repository 2d-500 transfers information of a server for related provisioning to the AAA 2d-400 together with permission/non-permission of the eUICC ID (2d-005d).

For example, in the case of the permitted eUICC, the address information of the provisioning server (e.g., SM-DP+) in which the SIM profile of the eUICC ID is stored in a PLMN to which the terminal 2d-100 is attaching may be included therein. Of course, the address information of the server (e.g., SM-DS) that can search for the provisioning server may also be included therein.

On the other hand, the AAA 2d-400 that has received information on whether to permit the eUICC may transfer the information to the CP function 2d-200 or the authenticator 2d-200 together with the authentication result in the process of completing the authentication process (2d-005e). For example, if the EAP authentication has been successfully completed, the AAA may transfer the address information of the provisioning server (e.g., SM-DP+) in which the SIM profile of the eUICC ID is stored together with a Master Session Key (MSK) that is created during the authentication process. Of course, the address information of the server (e.g., SM-DS) that can search for the provisioning server may also be included therein. However, if the EAP authentication has failed or if the eUICC is an unpermitted eUICC, the EAP failure may be sent to the CP function or the authenticator 2d-200.

After completion of the authentication process, if the eUICC is not permitted and thus an attach to the network is not permitted, or if the EAP has failed and thus an attach is not permitted (2d-007), the CP function 2d-200 or the authenticator 2d-200 performs an attach reject. In this case, when an attach reject message is sent to the terminal 2d-100, the terminal is notified that the eUICC is not permitted as a reject cause. For example, "cause=invalid eUICC" or "eUICC is not available in this PLMN" may be set (2d-007).

In the case of receiving the attach reject message, the terminal 2d-100 may store the ID of the corresponding PLMN in a forbidden PLMN list for SIM provisioning, and may apply a backoff timer for a predetermined time. When the terminal 2d-100 selects a PLMN among available PLMNs to perform the next attach, the PLMN that is included in the forbidden PLMN list for SIM provisioning is excluded from the available PLMN list. In this case, the selection of the PLMN is performed in the same method as 2d-003, and the terminal 2d-100 performs again an attach request process for the subscription.

On the other hand, the terminal 2d-100 and the CP function 2d-200, or the authenticator 2d-200 share a security context on the basis of the MSK that is acquired at operation 2d-005e, and perform sync-up of security keys to be used in a Non-Access Stratum (NAS) and an Access Stratum (AS) (2d-009). Operation 2d-009 may be performed before the attach reject is sent.

If the setup of the security keys is completed, the CP function 2d-200 or the authenticator 2d-200 may send an attach accept message to the terminal 2d-100 to notify of successful attach to the network (2d-010). The attach accept message may include address information of the subscription portal to which the terminal 2d-100 should attach in order to subscribe to the subscription.

The terminal 2d-100 requests the CP function 2d-200 to create a PDU connection for SIM provisioning (2d-011). A PDU connection request message may configure a separate type to notify that the PDU connection is to perform the SIM provisioning. For example, "type=SIM provisioning" may be set. On the other hand, at operation 2d-004, the terminal 2d-100 may piggyback a PDU connection request message on an attach request message, and even if the PDU connection request message is not transferred together in the case where the access type of the attach request message is for the subscription, the terminal may proceed with a session creation process for making the PDU connection for the SIM provisioning.

The CP function 2d-200 that has received a PDU connection creation request selects a suitable UP function in order to send a create session request message. In this case, the CP function may select the UP function in consideration of the SIM provisioning, or may select a suitable UP function of a suitable network slice that is selected.

The CP function 2d-200 transmits a create session request message to a suitable UP function 2d-300 (2d-012). The create session request message may include an address of a SM-DS server or an address of a SM-DP+ server that is received at operation 2d-005e. Further, the create session request message may include an address of a SM-DS server or an address of a SM-DP+ server that is received from the terminal 2d-100. The create session request message may include an indication capable of notifying of the request for SIM provisioning. Then, the UP function selects a GW for SIM provisioning, and allocates an IP address thereto. In this case, the PDU connection may be configured so that the terminal 2d-100 can attach only to an address of a SM-DP+ server for provisioning, an address of a SM-DS server for searching for the SM-DP+, an address of a DNS server, and an address of a subscription portal so that the terminal 2d-100 can use the same only for the purpose of traffic for the SIM provisioning (2d-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2d-100 or the address of the SM-DS server or the address of the SM-DP+ server that is transferred through operations 2d-005e and 2d-012, or the address that is serviced by the terminal 2d-100 may be used for authorization. Further, in the case of attempting an attach to another address other than the above-described address, a redirection rule may be set in the UP function so as to redirect the attach to the subscription portal.

The UP function 2d-300 may transfer a response to the CP function 2d-200, and may transfer a PDU connection response message up to the terminal 2d-100. In this case, the address information of the subscription portal to which the terminal 2d-100 should attach for the subscription may be transferred up to the terminal.

Thereafter, like operation 2d-017, the terminal 2d-100 attaches to the subscription portal using the acquired PDU connectivity, and selects and subscribes to a desired subscription plan. In this case, the terminal 2d-100 may transfer the EID information to the subscription portal, or may transfer the EID information through encrypted transmission for safe transfer.

Further, if the provisioning has been prepared, the SM-DP+ may notify the terminal 2d-100 that the provisioning has been prepared.

Further, the terminal may receive the provisioning of the SIM profile through attaching to the corresponding SM-DP+ (2d-018).

However, if the terminal 2d-100 attempts an attach to an address other than the address that is permitted so that the terminal can use the address only for the purpose of traffic for the SIM provisioning, the attach may be redirected to the subscription portal (2d-016).

On the other hand, if the SIM provisioning is delayed for a predetermined time or the SIM provisioning has failed, the terminal 2d-100 adds an ID of the currently attached PLMN to a forbidden PLMN list for initial provisioning, and then performs detach and attach request processes in order (2d-019). If the provisioning of the SIM profile is successfully performed, the terminal 2d-100 may select the downloaded SIM profile, and then may perform an attach process to use a data service (2d-021). Instead of performing operations 2d-020 and 2d-021, the terminal 2d-100 may not perform a detach process, but may select the downloaded SIM profile, and then may update the existing attach information to use a normal data service.

Figure 2E:
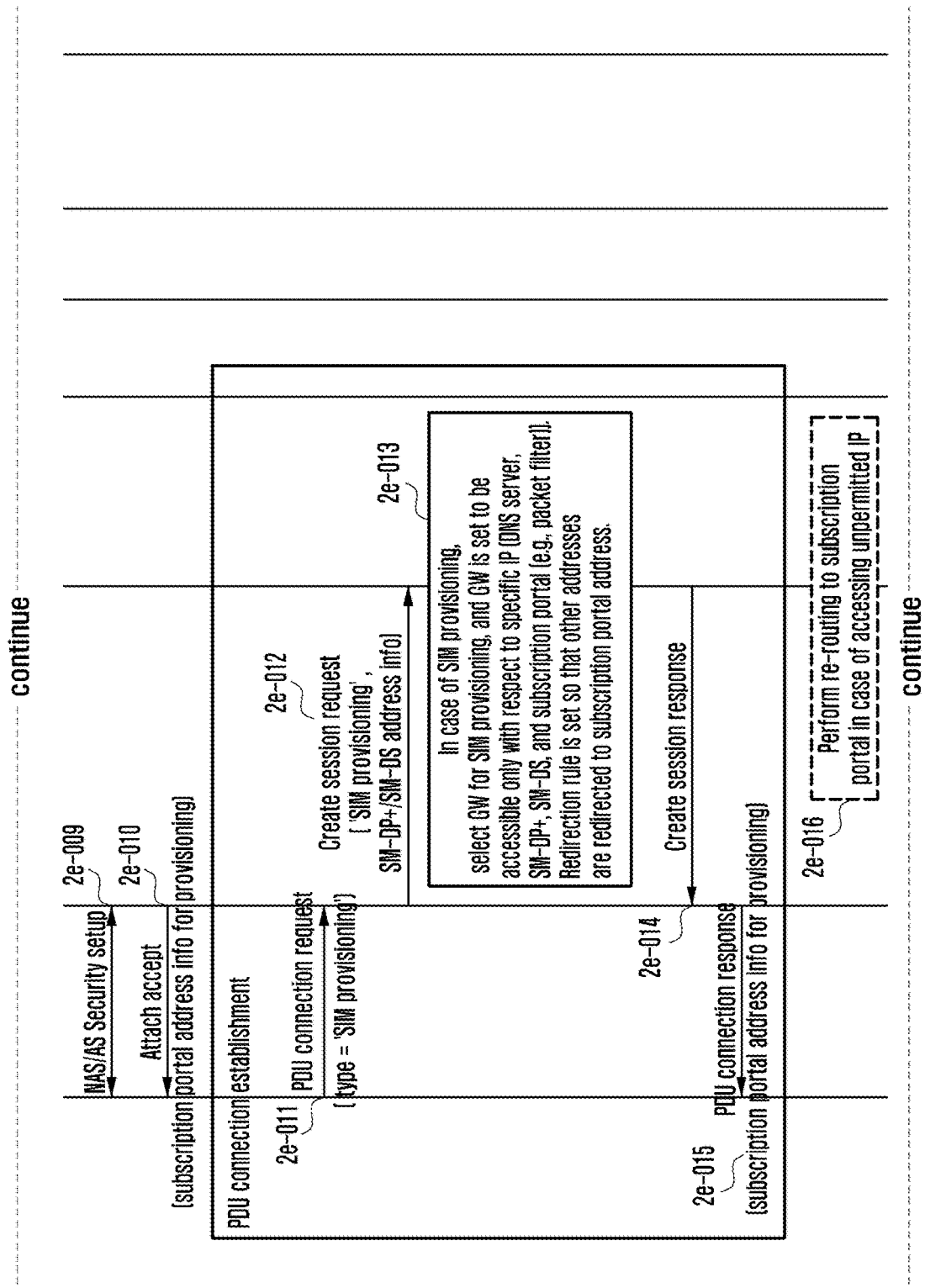
FIGS. 2EA to 2ED are diagrams illustrating detailed network connection schemes for a terminal that is mounted with an eSIM to make a subscription and to perform provisioning through determination of whether to permit eUICC in an EAP process.
Figure 2E:
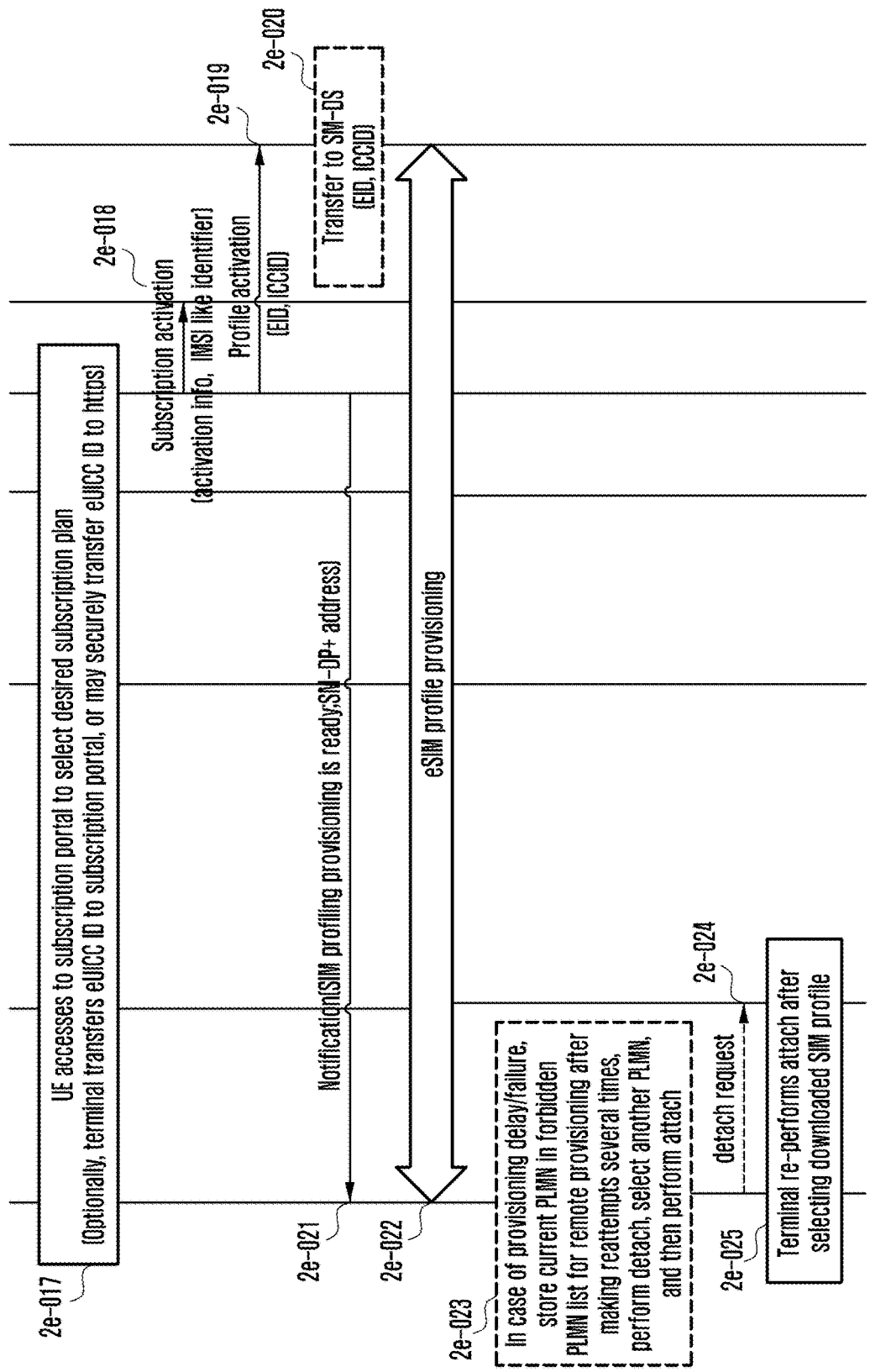

FIGS. 2EA to 2ED are diagrams illustrating detailed network connection schemes for a terminal that is mounted with an eSIM to make a subscription and to perform provisioning through determination of whether to permit eUICC in an EAP process. Hereinafter, FIGS. 2EA to 2ED are commonly called FIG. 2E.

Referring to FIG. 2E, in an embodiment of the present disclosure, a process is illustrated, in which a terminal that has not yet subscribed to any communication company acquires connectivity through attaching to a cellular network, subscribes online to the network, and receives provisioning of a SIM profile through an eSIM server.

Accordingly, at operation 2e-001, a user data repository 2e-500 stores therein white list information for an ID (i.e., EID) of a valid or permitted eUICC that is possessed by each service provider or blacklist information for an ID of an invalid eUICC that is reported to have a problem. For example, if an accident, such as an illegal use or theft, occurs for the corresponding EID in a specific communication company, the corresponding EID may be classified into a blacklist as unpermitted EID, and blacklist information may be shared with other communication companies in accordance with relationship between the communication companies. Further, in the case of terminals that are made for a specific communication company, EID information of the respective terminals are managed in the white list, and may be used to determine whether to permit their attaching for provisioning.

On the other hand, a terminal that has not yet been subscribed may select a subscription plan that is provided by a corresponding service provider through attaching to a subscription portal 2e-600. In this case, selected information interlocks with a Business Sales System (BSS), and accordingly, an eSIM server 2e-600 that provides provisioning of a SIM profile that corresponds to an EID of the terminal prepares a SIM profile for the corresponding selected subscription plan.

For example, the eSIM server that provides provisioning of the SIM profile may be, for example, a SM-DP+. In the description of the present disclosure, for convenience, the SM-DP+ is used to commonly call a SM-DP+ that is authenticated by GSMA and an eSIM server that provides SIM profile provisioning.

In a turn-on state, the terminal 2e-100 checks a SIM profile, and if there is not the SIM profile, the terminal recognizes that it is necessary to receive provisioning of the SIM profile, and acquires PDU connection in order to receive the provisioning. If it is determined or set for the terminal 2e-100 to receive the PDU connection through a cellular network, the terminal 2e-100 transfers a list of available PLMNs to an application of the terminal or an entity that takes charge of the provisioning on the basis of a list of PLMNs that are sensed through a cell search (2e-002). The terminal may select a PLMN to be connected to for the provisioning on the basis of the transferred list of available PLMNs (2e-003).

The selection of the PLMNs by the terminal 2e-100 may be performed through a user's selection input or in accordance with the priority order according to a specific priority rule in the terminal 2e-100. For example, if a user desires to subscribe to a PLMN, a provisioning app presents a list of PLMNs that can be selected through a UI, and the user may select a subscribed PLMN through which the user desires to receive the provisioning. As another method, if the subscribed PLMN information has already been set in the terminal 2e-100, it becomes possible to select the subscribed PLMN through which the user desires to receive the provisioning. As still another method, if the user does not have a separate preference to the PLMN to which the user desires to subscribe, a PLMN that corresponds to the highest priority may be selected in accordance with the priority rule of the terminal 2e-100 itself, such as selection of a PLMN having the highest signal strength among available PLMNs or random selection of a PLMN among the available PLMNs.

The terminal requests a network connection through the PLMN that is selected in the above-described process while transmitting an attach request to a CP function 2e-200 (2e-004). In this case, in order to indicate that the terminal 2e-100 subscribes to a communication company and attaches thereto to receive provisioning of a SIM profile, the terminal separately indicates an attach type. For example, "attach type=subscription" is set. In this case, the attach request message may include an identity of the terminal 2e-100, for example, an International Mobile Station Equipment Identity (IMEI). Further, a Non-Access Stratum (NAS) of the terminal 2e-100 may indicate that the access request message is for SIM provisioning when the attach request message is transferred to an Access Stratum (AS). Information that indicates the SIM provisioning may be transferred to a base station, and may be used for the base station to select a suitable CP function.

The CP function 2e-200 or authenticator 2e-200 that has received the attach request triggers an authentication process between the eUICC and a network. For example, the CP function 2e-200 or authenticator 2e-200 triggers an EAP process 2e-005, and the eUICC of the terminal authenticates an AAA 2e-400 on the basis of an AAA certificate through an EAP-TTLS between the eUICC and the AAA 2e-400 of the network, or performs mutual authentication between the eUICC of the terminal 2e-100 and the AAA 2e-400 on the basis of an AAA certificate and an eUICC certificate, and creates a secure tunnel between the terminal 2e-100 and the AAA 2e-400 on the basis of an encryption key that is created during the authentication process. The terminal 2e-100 sends the eUICC information to the AAA 2e-400 through the created secure tunnel (2e-005a). The eUICC information may include an eUICC ID (i.e., EID), and may further include an address of a server (e.g., SM-DP+) for provisioning of the SIM profile that is preset in the terminal 2e-100 or the eUICC or a server (e.g., SM-DS) for searching for an address of the provisioning server.

The AAA 2e-400 that has received the eUICC information may send an eUICC ID report message that includes the eUICC information to the user data repository 2e-500 in order to determine whether the eUICC is a permitted eUICC (2e-005b). The user data repository 2e-500 determines whether the received eUICC ID is a permitted eUICC (2e-005c). The user data repository 2e-500 transfers information of a server for related provisioning to the AAA 2e-400 together with permission/non-permission of the eUICC ID (2e-005d).

For example, in the case of the permitted eUICC, the address information of the provisioning server (e.g., SM-DP+) in which the SIM profile of the eUICC ID is stored in a PLMN to which the terminal 2e-100 is attaching may be included therein. Of course, the address information of the server (e.g., SM-DS) that can search for the provisioning server may also be included therein.

On the other hand, the AAA 2e-400 that has received information on whether to permit the eUICC may transfer the information to the CP function 2e-200 or the authenticator 2e-200 together with the authentication result in the process of completing the authentication process (2e-005e). For example, if the EAP authentication has been successfully completed, the AAA may transfer the address information of the provisioning server (e.g., SM-DP+) in which the SIM profile of the eUICC ID is stored together with a Master Session Key (MSK) that is created during the authentication process. Of course, the address information of the server (e.g., SM-DS) that can search for the provisioning server may also be included therein. However, if the EAP authentication has failed or if the eUICC is an unpermitted eUICC, the EAP failure may be sent to the CP function 2e-200 or the authenticator 2e-200.

After completion of the authentication process, if the eUICC is not permitted and thus an attach to the network is not permitted, or if the EAP has failed and thus an attach is not permitted (2e-007), the CP function 2e-200 or the authenticator 2e-200 performs an attach reject. In this case, when an attach reject message is sent to the terminal 2e-100, the terminal is notified that the eUICC is not permitted as a reject cause. For example, "cause=invalid eUICC" or "eUICC is not available in this PLMN" may be set (2e-007).

In the case of receiving the attach reject message, the terminal 2e-100 may store the ID of the corresponding PLMN in a forbidden PLMN list for SIM provisioning, and may apply a backoff timer for a predetermined time. When the terminal 2e-100 selects a PLMN among available PLMNs to perform the next attach, the PLMN that is included in the forbidden PLMN list for SIM provisioning is excluded from the available PLMN list. In this case, the selection of the PLMN is performed in the same method as 2e-003, and the terminal 2e-100 performs again an attach request process for the subscription.

On the other hand, the terminal 2e-100 and the CP function 2e-200, or the authenticator 2e-200 share a security context on the basis of the MSK that is acquired at operation 2e-005e, and perform sync-up of security keys to be used in a Non-Access Stratum (NAS) and an Access Stratum (AS) (2e-009). Operation 2e-009 may be performed before the attach reject is sent.

If the setup of the security keys is completed, the CP function 2e-200 or the authenticator 2e-200 may send an attach accept message to the terminal 2e-100 to notify of successful attach to the network (2e-010). The attach accept message may include address information of the subscription portal to which the terminal 2e-100 should attach in order to subscribe to the subscription.

The terminal 2e-100 requests the CP function 2e-200 to create a PDU connection for SIM provisioning (2e-011). A PDU connection request message may configure a separate type to notify that the PDU connection is to perform the SIM provisioning. For example, "type=SIM provisioning" may be set. On the other hand, at operation 2e-004, the terminal 2e-100 may piggyback a PDU connection request message on an attach request message, and even if the PDU connection request message is not transferred together in the case where the access type of the attach request message is for the subscription, the terminal may proceed with a session creation process for making the PDU connection for the SIM provisioning.

The CP function 2e-200 that has received a PDU connection creation request selects a suitable UP function in order to send a create session request message. In this case, the CP function may select the UP function in consideration of the SIM provisioning, or may select a suitable UP function of a suitable network slice that is selected.

The CP function 2e-200 transmits a create session request message to a suitable UP function 2e-300 (2e-012). The create session request message may include an address of a SM-DS server or an address of a SM-DP+ server that is received at operation 2e-005e. Further, the create session request message may include an address of a SM-DS server or an address of a SM-DP+ server that is received from the terminal 2e-100. The create session request message may include an indication capable of notifying of the request for SIM provisioning. Then, the UP function selects a GW for SIM provisioning, and allocates an IP address thereto. In this case, the PDU connection may be configured so that the terminal 2e-100 can attach only to an address of a SM-DP+ server for provisioning, an address of a SM-DS server for searching for the SM-DP+, an address of a DNS server, and an address of a subscription portal so that the terminal 2e-100 can use the same only for the purpose of traffic for the SIM provisioning (2e-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2e-100 or the address of the SM-DS server or the address of the SM-DP+ server that is transferred through operations 2e-005e and 2e-012, or the address that is serviced by the terminal 2e-100 may be used for authorization. Further, in the case of attempting an attach to another address other than the above-described address, a redirection rule may be set in the UP function so as to redirect the attach to the subscription portal.

The UP function 2e-300 may transfer a response to the CP function 2e-200, and may transfer a PDU connection response message up to the terminal 2e-100. In this case, the address information of the subscription portal to which the terminal 2e-100 should attach for the subscription may be transferred up to the terminal.

Thereafter, like operation 2e-017, the terminal 2e-100 attaches to the subscription portal using the acquired PDU connectivity, and selects and subscribes to a desired subscription plan. In this case, the terminal 2e-100 may transfer the EID information to the subscription portal, or may transfer the EID information through encrypted transmission for safe transfer.

On the other hand, a subscription portal 2e-700 transfers selected subscription plan information to the user data repository 2e-500. For example, activated plan information and an identifier (e.g., IMSI or the like) that is allocated to a SIM of the terminal 2e-100 may be included in the user data repository 2e-500. Further, the subscription portal transfers to the SM-DP+ 2e-600 a message for notifying the SM-DP+ 2e-600 having the SIM profile for the EID of the subscription of the corresponding EID that the corresponding EID has been subscribed (2e-019). For example, the message may include ID information of the eUICC of the terminal 2e-100, or may include an Integrated Circuit Card Identifier (ICCID) that is information on the corresponding profile.

Further, the SM-DP+ that has received the transferred message transfers to the SM-DS information that it has its own EID and the corresponding profile, so that the terminal 2e-100 can search for a provisioning server that corresponds to the ID value of the eUICC thereof (2e-020). For example, the SM-DP+ may transfer the EID value to the SM-DS. Further, the SM-DP+ may also transfer the ICCID that is profile information on the EID.

On the other hand, if the subscription portal completes the operations 2e-018 and 2e-019 with respect to the user data repository 2e-500 and the SM-DP+, it may notify the terminal 2e-100 that the SIM profile provisioning has been prepared (2e-021). A notification message that is sent at this time may include address information of the SM-DP+ to which the terminal 2e-100 can attach to receive the SIM profile provisioning. Further, the notification message may also include address information of the SM-DS that can notify of the address information of the SM-DP+ having the SIM profile for the eUICC of the terminal 2e-100. Further, the terminal 2e-100 may receive the SIM profile provisioning through attaching to the corresponding SM-DP+ (2e-022).

However, if the terminal 2e-100 attempts an attach to an address other than the address that is permitted so that the terminal can use the address only for the purpose of traffic for the SIM provisioning, the attach may be redirected to the subscription portal (2e-016).

On the other hand, if the SIM provisioning is delayed for a predetermined time or the SIM provisioning has failed, the terminal 2e-100 may add an ID of the currently attached PLMN to a forbidden PLMN list for initial provisioning, and then may perform detach and attach request processes in order (2e-023). If the provisioning of the SIM profile is successfully performed, the terminal 2e-100 may perform a detach process to perform attaching using the downloaded SIM profile (2e-024). The terminal 2e-100 may select the downloaded SIM profile, and then may perform an attach process to use a data service (2e-025). Instead of performing operations 2e-024 and 2e-025, the terminal 2e-100 may not perform a detach process, but may select the downloaded SIM profile, and then may update the existing attach information to use a normal data service.

Figure 2F:
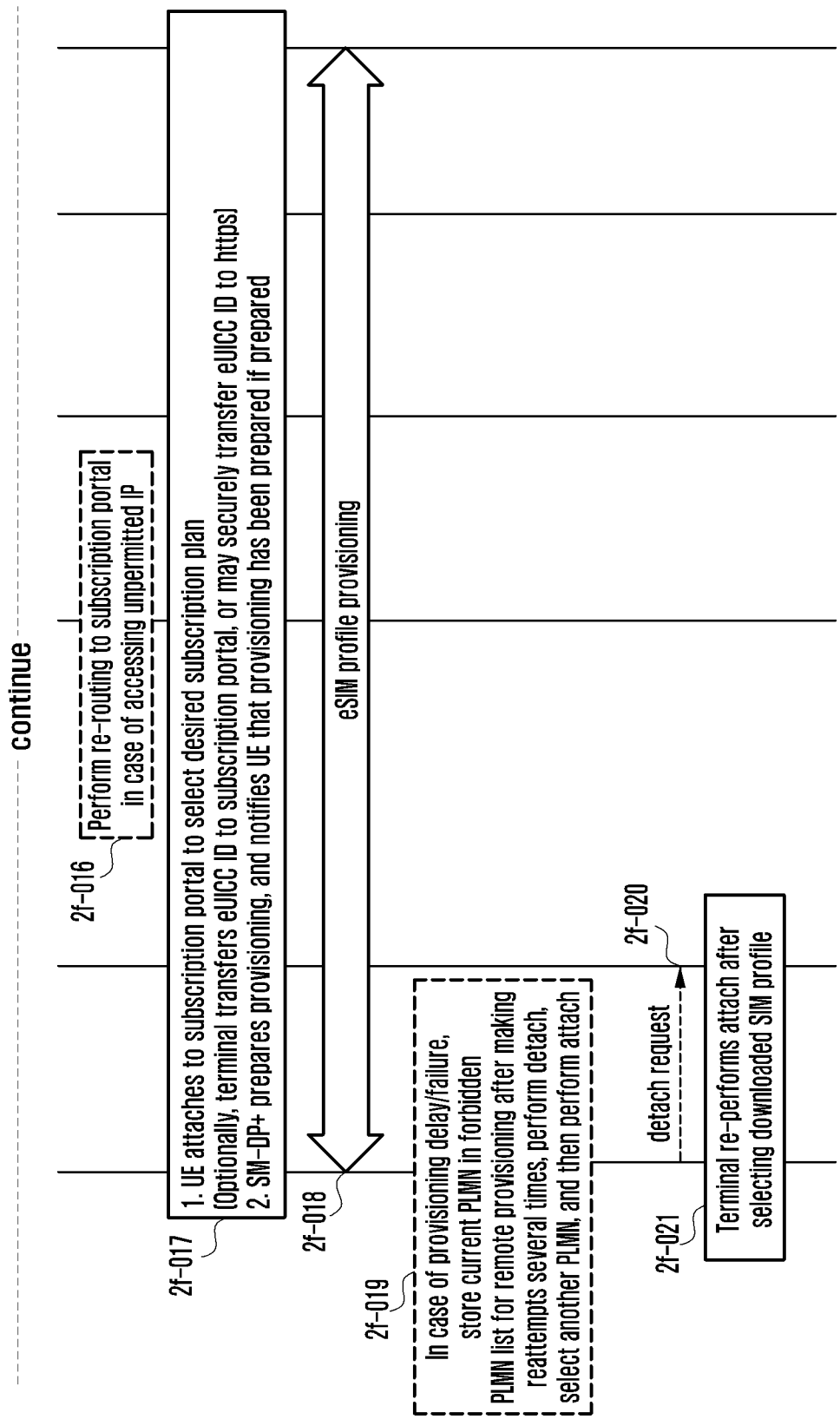
FIGS. 2FA to 2FD are diagrams illustrating network connection schemes for a terminal that is mounted with an eSIM to make a subscription and to perform provisioning through determination of whether to permit eUICC separately from an EAP process.

FIGS. 2FA to 2FD are diagrams illustrating network connection schemes for a terminal that is mounted with an eSIM to make a subscription and to perform provisioning through determination of whether to permit eUICC separately from an EAP process. Hereinafter, FIGS. 2FA to 2FD are commonly called FIG. 2F.

Referring to FIG. 2F, in an embodiment of the present disclosure, a process is illustrated, in which a terminal that has not yet subscribed to any communication company acquires connectivity through attaching to a cellular network, subscribes online to the network, and receives provisioning of a SIM profile through an eSIM server.

Accordingly, at operation 2f-001, a user data repository 2f-500 stores therein white list information for an ID (i.e., EID) of a valid or permitted eUICC that is possessed by each service provider or blacklist information for an ID of an invalid eUICC that is reported to have a problem. For example, if an accident, such as an illegal use or theft, occurs for the corresponding EID in a specific communication company, the corresponding EID may be classified into a blacklist as unpermitted EID, and blacklist information may be shared with other communication companies in accordance with the relationship between the communication companies. Further, in the case of terminals that are made for a specific communication company, EID information of the respective terminals are managed in the white list, and may be used to determine whether to permit their attaching for provisioning.

On the other hand, a terminal that has not yet been subscribed may select a subscription plan that is provided by a corresponding service provider through attaching to a subscription portal 2f-600. In this case, selected information interlocks with a Business Sales System (BSS), and an eSIM server that provides provisioning of a SIM profile that corresponds to an EID of the terminal prepares a SIM profile for the corresponding selected subscription plan.

For example, the eSIM server that provides provisioning of the SIM profile may be, for example, a SM-DP+. In the description of the present disclosure, for convenience, the SM-DP+ is used to commonly call a SM-DP+ that is authenticated by GSMA and an eSIM server that provides SIM profile provisioning. In the description of the present disclosure, detailed interlocking schemes between a subscription portal, a BSS, and the SM-DP+ are not described.

In a turn-on state, the terminal 2f-100 checks a SIM profile, and if there is not the SIM profile, the terminal recognizes that it is necessary to receive provisioning of the SIM profile, and acquires PDU connection in order to receive the provisioning. If it is determined or set for the terminal 2f-100 to receive the PDU connection through a cellular network, the terminal 2f-100 transfers a list of available PLMNs to an application of the terminal or an entity that takes charge of the provisioning on the basis of a list of PLMNs that are sensed through a cell search (2f-002). The terminal may select a PLMN to be connected to for the provisioning on the basis of the transferred list of available PLMNs (2f-003).

The selection of the PLMNs by the terminal 2f-100 may be performed through a user's selection input or in accordance with the priority order according to a specific priority rule in the terminal 2f-100. For example, if a user desires to subscribe to a PLMN, a provisioning app presents a list of PLMNs that can be selected through a UI, and the user may select a subscribed PLMN through which the user desires to receive the provisioning. As another method, if the subscribed PLMN information has already been set in the terminal 2f-100, it becomes possible to select the subscribed PLMN through which the user desires to receive the provisioning. As still another method, if the user does not have a separate preference to the PLMN to which the user desires to subscribe, a PLMN that corresponds to the highest priority may be selected in accordance with the priority rule of the terminal 2f-100 itself, such as selection of a PLMN having the highest signal strength among available PLMNs or random selection of a PLMN among the available PLMNs.

The terminal 2f-100 requests a network connection through the PLMN that is selected in the above-described process while transmitting an attach request to a CP function 2f-200 (2f-004). In this case, in order to indicate that the terminal 2f-100 subscribes to a communication company and attaches thereto to receive provisioning of a SIM profile, the terminal separately indicates an attach type. For example, "attach type=subscription" is set. In this case, the attach request message may include an identity of the terminal 2f-100, for example, an International Mobile Station Equipment Identity (IMEI). Further, a Non-Access Stratum (NAS) of the terminal 2f-100 may indicate that the access request message is for SIM provisioning when the attach request message is transferred to an Access Stratum (AS). Information that indicates the SIM provisioning may be transferred to a base station, and may be used for the base station to select a suitable CP function.

The CP function 2f-200 or authenticator 2f-200 that has received the attach request triggers an authentication process between the eUICC and a network. For example, the CP function 2f-200 or authenticator 2f-200 triggers an EAP process 2f-005 to perform mutual authentication between the eUICC of the terminal and an AAA 2f on the basis of an AAA certificate and an eUICC certificate through EAP-TLS or EAP-TTLS. In the process of completing the authentication process, the AAA 2f-400 may transfer the result of the authentication to the CP function 2f-200 or the authenticator 2f-200 (2f-005a). For example, if the EAP authentication has been successfully completed, a Master Session Key (MSK) that is created in the authentication process may be transferred while an EAP success is transmitted to the CP function or the authenticator 2f-200. However, if the EAP authentication has failed, an EAP failure may be transmitted to the CP function or the authenticator 2f-200. In this case, the CP function or the authenticator 2f-200 may perform an attach reject (2f-005b). On the other hand, the terminal 2f-100 and the CP function or the authenticator 2f-200 may share a security context on the basis of the MSK that is acquired at operation 2f-005a, and may perform sync-up of security keys to be used in a Non-Access Stratum (NAS) and an Access Stratum (AS) (2f-006).

If the security is set up as described above, a process of checking whether to permit an eUICC may be performed. For this, the CP function 2f-200 may request eUICC information from the terminal 2f-100 (2f-007a). If the eUICC information request message is received (2f-007a) or the setup of the security keys is completed (2f-006), the terminal 2f-100 may encrypt and transmit an eUICC ID of the terminal to the CP function 2f-200 (2f-007b).

The eUICC information may include an eUICC ID (i.e., EID), and may also include an address of a server (e.g., SM-DP+) for provisioning of the SIM profile that is preset in the terminal 2f-100 or the eUICC or an address of a server (e.g., SM-DS) for searching for the address of the provisioning server.

The CP function 2f-200 that has received the eUICC information transmits an eUICC ID check request message that includes the eUICC information to the user data repository 2f-500 in order to determine whether the eUICC is a permitted eUICC (2f-007c). The user data repository 2f-500 determines whether the received eUICC ID has been permitted (2f-007d). The user data repository 2f-500 transfers information of a related provisioning server to the CP function together with information whether to permit the eUICC ID (2f-007e).

For example, in the case of the eUICC that has been permitted in the PLMN that is being attached to, address information of the provisioning server (e.g., SM-DP+) in which the SIM profile of the eUICC ID is stored may be included therein. Of course, address information of the server (e.g., SM-DS) that can search for the provisioning server may also be included therein. However, if the eUICC is determined as an eUICC that has not been permitted in the PLMN that is being attached to, it may be notified that the eUICC is an eUICC that has not been permitted in the PLMN. Further, address information of the provisioning server (e.g., SM-DP+) in which the SIM profile of the eUICC ID is stored may also be included therein. Of course, address information of the server (e.g., SM-DS) that can search for the provisioning server may also be included therein. However, if the eUICC is determined to be inferior in the corresponding PLMN and thus an attach to the network is not permitted (2f-007f), an attach reject is performed. In this case, when an attach reject message is sent to the terminal 2f-100, the terminal is notified that the eUICC has not been permitted in the corresponding PLMN as a reject cause. For example, "cause=invalid eUICC" or "eUICC is not available in this PLMN" may be set.

In the case of receiving the attach reject message (2f-008), the terminal 2f-100 may store the ID of the corresponding PLMN in a forbidden PLMN list for SIM provisioning, and may apply a backoff timer for a predetermined time. When the terminal 2f-100 selects a PLMN among available PLMNs to perform the next attach, the PLMN that is included in the forbidden PLMN list for SIM provisioning is excluded from the available PLMN list. In this case, the selection of the PLMN is performed in the same method as 2f-003, and the terminal 2f-100 performs again an attach request process for the subscription.

If the setup of the security keys is completed, the CP function 2f-200 or the authenticator 2f-200 may send an attach accept message to the terminal 2*f*-100 to notify of successful attach to the network (2*f*-010).

The attach accept message may include address information of the provisioning server to which the terminal 2*f*-100 should attach in order to subscribe to the subscription.

The terminal 2*f*-100 requests the CP function 2*f*-200 to create a PDU connection for SIM provisioning (2*f*-011). A PDU connection request message may configure a separate type to notify that the PDU connection is to notify that the PDU connection is for the SIM provisioning. For example, "type=SIM provisioning" may be set. On the other hand, at operation 2*f*-004, the terminal 2*f*-100 may piggyback a PDU connection request message on an attach request message, and even if the PDU connection request message is not transferred together in the case where the access type of the attach request message is for the subscription, the terminal may proceed with a session creation process for making the PDU connection for the SIM provisioning.

The CP function 2*f*-200 that has received a PDU connection creation request selects a suitable UP function in order to send a create session request message. In this case, the CP function may select the UP function in consideration of the SIM provisioning, or may select a suitable network slice and select a suitable UP function of the selected network slice.

The CP function 2*f*-200 transmits a create session request message to a suitable UP function 2*f*-300 (2*f*-012). The create session request message may include an address of a SM-DS server or an address of a SM-DP+ server that is received at operation 2*f*-007*e*. Further, the create session request message may include an address of a SM-DS server or an address of a SM-DP+ server that is received from the terminal 2*f*-100. The create session request message may also include an indication capable of notifying of the request for the SIM provisioning. Then, the UP function selects a GW for the SIM provisioning, and allocates an IP address thereto. In this case, the PDU connection may be configured so that the terminal can attach only to an address of a SM-DP+ server for provisioning, an address of a SM-DS server for searching for the SM-DP+, an address of a DNS server, and an address of a subscription portal so that the terminal can use the same only for the purpose of traffic for the SIM provisioning (2*f*-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2*f*-100, or the address of the SM-DS server or the address of the SM-DP+ server that is transferred through operations 2*f*-007*e* and 2*f*-012, or an address that is serviced by the terminal 2*f*-100 may be used for authorization. Further, in the case of attempting an attach to another address other than the above-described address, a redirection rule may be set in the UP function so as to redirect the attach to the subscription portal.

The UP function 2*f*-300 may transfer a response to the CP function 2*f*-200, and may transfer a PDU connection response message up to the terminal 2*f*-100. In this case, address information of the subscription portal to which the terminal 2*f*-100 should attach for subscription may be transferred together up to the terminal.

Thereafter, like operation 2*f*-017, the terminal 2*f*-100 selects and subscribes to a desired subscription plan through attaching to the subscription portal using the acquired PUD connectivity. In this case, the terminal 2*f*-100 may transfer EID information to the subscription portal, or may transfer the EID information through encrypted transmission in order to safely transfer the EID information.

Further, the SM-DP+ may prepare provisioning, and if the provisioning has been prepared, it may notify the terminal 2*f*-100 of the prepared provisioning.

Further, the terminal 2*f*-100 may receive provisioning of a SIM profile through attaching to the corresponding SM-DP (2*f*-018).

However, if the terminal 2*f*-100 attempts an attach to an address other than the address that is permitted so that the terminal can use the address only for the purpose of traffic for the SIM provisioning, the attach may be redirected to the subscription portal (2*f*-016).

On the other hand, if the SIM provisioning is delayed for a predetermined time or the SIM provisioning has failed, the terminal 2*f*-100 may add an ID of the currently attached PLMN to a forbidden PLMN list for initial provisioning, and then may perform detach and attach request processes in order (2*f*-019). If the provisioning of the SIM profile has been successfully performed, the terminal 2*f*-100 may perform a detach process for the attach using the downloaded SIM profile (2*f*-020). After selecting the downloaded SIM profile, the terminal 2*f*-100 may perform an attach process to use a data service (2*f*-021). Instead of performing operations 2*f*-020 and 2*f*-021, the terminal 2*f*-100 may not perform the detach process, but may select the downloaded SIM profile, and then may update the existing attach information to use a normal data service.

Figure 2G:
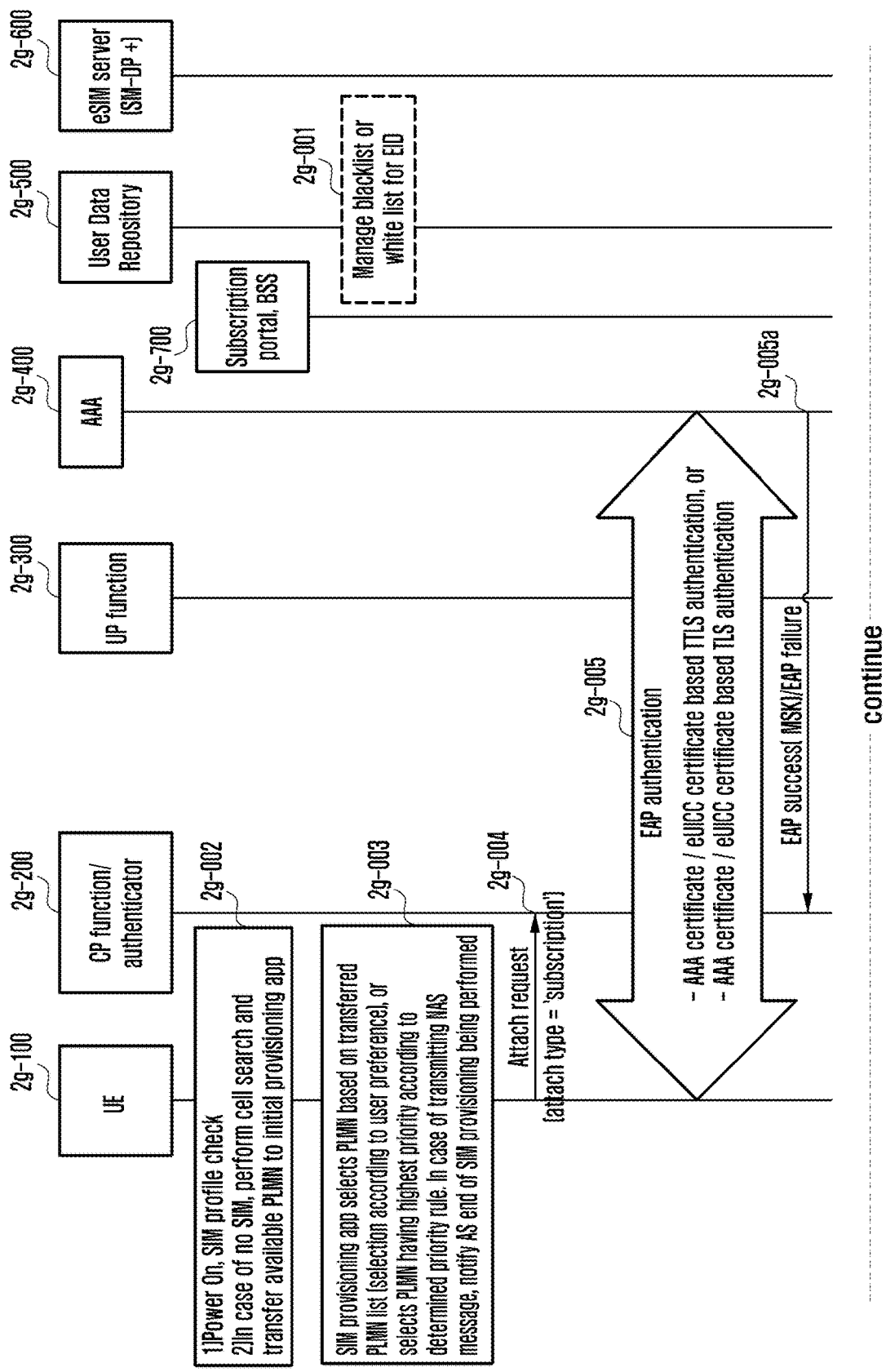
FIGS. 2GA to 2GD are diagrams illustrating detailed network connection schemes for a terminal that is mounted with an eSIM to make a subscription and to perform provisioning through determination of whether to permit eUICC separately from an EAP process.
Figure 2G:
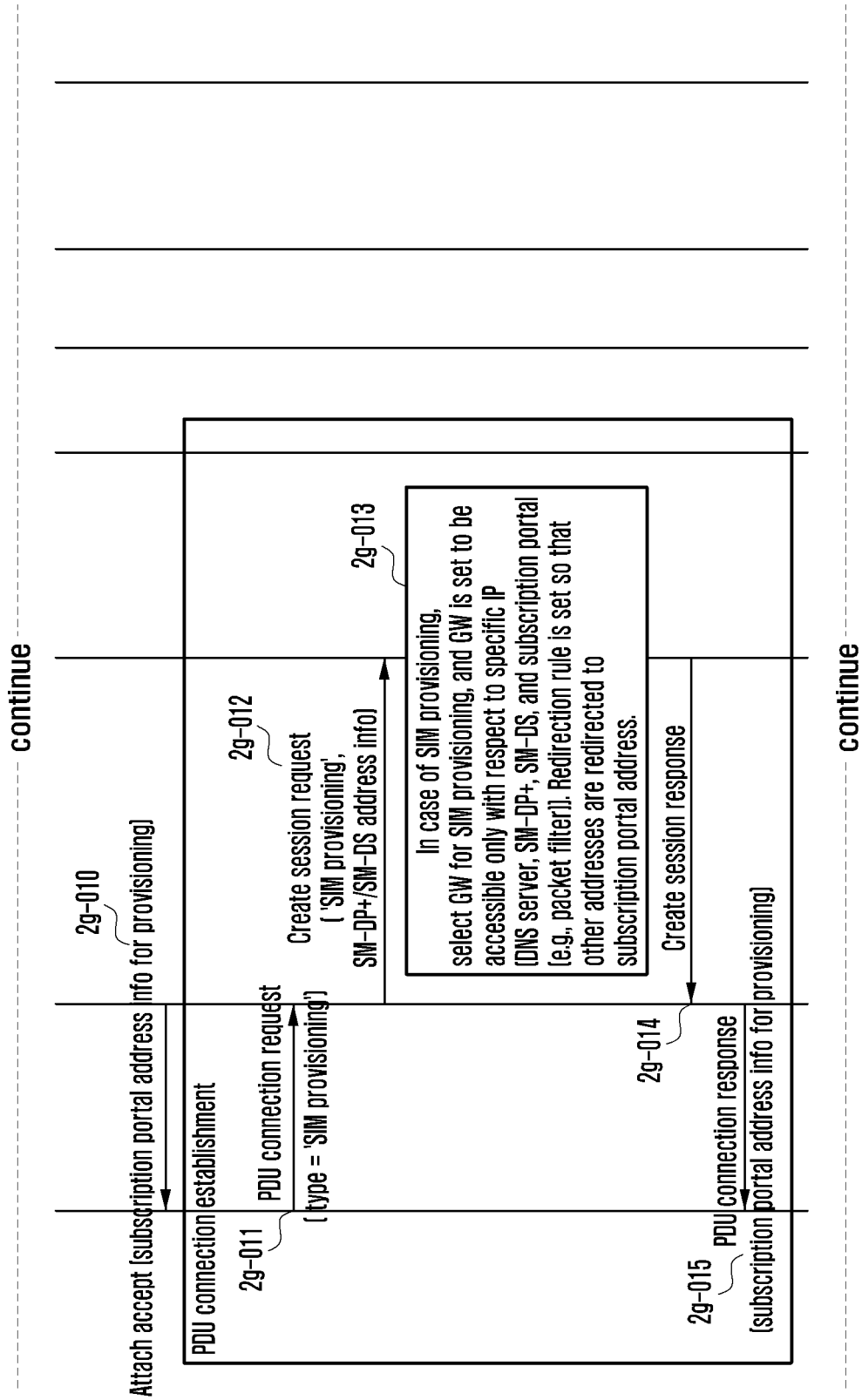

FIGS. 2GA to 2GD are diagrams illustrating detailed network connection schemes for a terminal that is mounted with an eSIM to make a subscription and to perform provisioning through determination of whether to permit eUICC separately from an EAP process. Hereinafter, FIGS. 2GA to 2GD are commonly called FIG. 2G.

Referring to FIG. 2G, in an embodiment of the present disclosure, a process is illustrated, in which a terminal that has not yet subscribed to any communication company acquires connectivity through attaching to a cellular network, subscribes online to the network, and receives provisioning of a SIM profile through an eSIM server.

Accordingly, at operation 2*g*-001, a user data repository 2*g*-500 stores therein white list information for an ID (i.e., EID) of a valid or permitted eUICC that is possessed by each service provider or blacklist information for an ID of an invalid eUICC that is reported to have a problem. For example, if an accident, such as an illegal use or theft, occurs for the corresponding EID in a specific communication company, the corresponding EID may be classified into a blacklist as unpermitted EID, and blacklist information may be shared with other communication companies in accordance with the relationship between the communication companies. Further, in the case of terminals that are made for a specific communication company, EID information of the respective terminals are managed in the white list, and may be used to determine whether to permit their attaching for provisioning.

On the other hand, a terminal that has not yet been subscribed may select a subscription plan that is provided by a corresponding service provider through attaching to a subscription portal 2*g*-700. In this case, selected information interlocks with a Business Sales System (BSS), and an eSIM server 2*g*-600 that provides provisioning of a SIM profile that corresponds to an EID of the terminal prepares a SIM profile for the corresponding selected subscription plan.

For example, the eSIM server that provides provisioning of the SIM profile may be, for example, a SM-DP+. In the description of the present disclosure, for convenience, the SM-DP+ is used to commonly call a SM-DP+ that is authenticated by GSMA and an eSIM server that provides SIM profile provisioning.

In a turn-on state, the terminal 2g-100 checks a SIM profile, and if there is not the SIM profile, the terminal recognizes that it is necessary to receive provisioning of the SIM profile, and acquires PDU connection in order to receive the provisioning. If it is determined or set for the terminal 2g-100 to receive the PDU connection through a cellular network, the terminal 2g-100 transfers a list of available PLMNs to an application of the terminal or an entity that takes charge of the provisioning on the basis of a list of PLMNs that are sensed through a cell search (2g-002). The terminal may select a PLMN to be connected to for the provisioning on the basis of the transferred list of available PLMNs (2g-003).

The selection of the PLMNs by the terminal 2g-100 may be performed through a user's selection input or in accordance with the priority order according to a specific priority rule in the terminal 2g-100. For example, if a user desires to subscribe to a PLMN, a provisioning app presents a list of PLMNs that can be selected through a UI, and the user may select a subscribed PLMN through which the user desires to receive the provisioning. As another method, if the subscribed PLMN information has already been set in the terminal 2g-100, it becomes possible to select the subscribed PLMN through which the user desires to receive the provisioning. As still another method, if the user does not have a separate preference to the PLMN to which the user desires to subscribe, a PLMN that corresponds to the highest priority may be selected in accordance with the priority rule of the terminal 2g-100 itself, such as selection of a PLMN having the highest signal strength among available PLMNs or random selection of a PLMN among the available PLMNs.

The terminal 2g-100 requests a network connection through the PLMN that is selected in the above-described process while transmitting an attach request to a CP function 2g-200 (2g-004). In this case, in order to indicate that the terminal 2g-100 subscribes to a communication company and attaches thereto to receive provisioning of a SIM profile, the terminal separately indicates an attach type. For example, "attach type=subscription" is set. In this case, the attach request message may include an identity of the terminal, for example, an International Mobile Station Equipment Identity (IMEI). Further, a Non-Access Stratum (NAS) of the terminal may indicate that the access request message is for SIM provisioning when the attach request message is transferred to an Access Stratum (AS). Information that indicates the SIM provisioning may be transferred to a base station, and may be used for the base station to select a suitable CP function.

The CP function 2g-200 or authenticator 2g-200 that has received the attach request triggers an authentication process between the eUICC and a network. For example, the CP function 2g-200 or authenticator 2g-200 triggers an EAP process 2g-005 to perform mutual authentication between the eUICC of the terminal 2g-100 and an AAA 2g-400 on the basis of an AAA certificate and an eUICC certificate through EAP-TLS or EAP-TTLS. In the process of completing the authentication process, the AAA 2g-400 may transfer the result of the authentication to the CP function 2g-200 or the authenticator 2g-200 (2g-005a). For example, if the EAP authentication has been successfully completed, a Master Session Key (MSK) that is created in the authentication process may be transferred while an EAP success is transmitted to the CP function 2g-200 or the authenticator 2g-200. However, if the EAP authentication has failed, an EAP failure may be transmitted to the CP function 2g-200 or the authenticator 2g-200. In this case, the CP function 2g-200 or the authenticator 2g-200 may perform an attach reject (2g-005b). On the other hand, the terminal 2-100 and the CP function 2g-200 or the authenticator 2g-200 may share a security context on the basis of the MSK that is acquired at operation 2g-005a, and may perform sync-up of security keys to be used in a Non-Access Stratum (NAS) and an Access Stratum (AS) (2g-006).

If the security is set up as described above, a process of checking whether to permit an eUICC may be performed. For this, the CP function 2g-200 may request eUICC information from the terminal 2g-100 (2g-007a). If the eUICC information request message is received (2g-007a) or the setup of the security keys is completed (2g-006), the terminal 2g-100 may encrypt and transmit an eUICC ID of the terminal to the CP function 2g-200 (2g-007b).

The eUICC information may include an eUICC ID (i.e., EID), and may also include an address of a server (e.g., SM-DP+) for provisioning of the SIM profile that is preset in the terminal 2g-100 or the eUICC or an address of a server (e.g., SM-DS) for searching for the address of the provisioning server.

The CP function 2g-200 that has received the eUICC information transmits an eUICC ID check request message that includes the eUICC information to the user data repository 2g-500 in order to determine whether the eUICC is a permitted eUICC (2g-007c). The user data repository 2g-500 determines whether the received eUICC ID has been permitted (2g-007d). The user data repository 2g-500 transfers information of a related provisioning server to the CP function together with information whether to permit the eUICC ID (2g-007e).

For example, in the case of the eUICC that has been permitted in the PLMN to which the terminal 2g-100 is attaching, address information of the provisioning server (e.g., SM-DP+) in which the SIM profile of the eUICC ID is stored may be included therein. Of course, address information of the server (e.g., SM-DS) that can search for the provisioning server may also be included therein. However, if the eUICC is determined as an eUICC that has not been permitted in the PLMN to which the terminal 2g-100 is attaching, it may be notified that the eUICC is an eUICC that has not been permitted in the PLMN. Further, address information of the provisioning server (e.g., SM-DP+) in which the SIM profile of the eUICC ID is stored may also be included therein. Of course, address information of the server (e.g., SM-DS) that can search for the provisioning server may also be included therein. However, if the eUICC is determined to be inferior in the corresponding PLMN and thus an attach to the network is not permitted (2g-007f), an attach reject is performed. In this case, when an attach reject message is sent to the terminal 2g-100, the terminal 2g-100 is notified that the eUICC has not been permitted in the corresponding PLMN as a reject cause. For example, "cause=invalid eUICC" or "eUICC is not available in this PLMN" may be set.

In the case of receiving the attach reject message (2g-008), the terminal 2g-100 may store the ID of the corresponding PLMN in a forbidden PLMN list for SIM provisioning, and may apply a backoff timer for a predetermined time. When the terminal 2g-100 selects a PLMN among available PLMNs to perform the next attach, the PLMN that is included in the forbidden PLMN list for SIM provisioning is excluded from the available PLMN list. In this case, the selection of the PLMN is performed in the same method as 2g-003, and the terminal 2g-100 performs again an attach request process for the subscription.

If the setup of the security keys is completed, the CP function 2g-200 or the authenticator 2g-200 may send an attach accept message to the terminal 2g-100 to notify of successful attach to the network (2g-010).

The attach accept message may include address information of the provisioning server to which the terminal should attach in order to subscribe to the subscription.

The terminal 2g-100 requests the CP function 2g-200 to create a PDU connection for SIM provisioning (2g-011). A PDU connection request message may configure a separate type to notify that the PDU connection is to notify that the PDU connection is for the SIM provisioning. For example, "type=SIM provisioning" may be set. On the other hand, at operation 2g-004, the terminal 2g-100 may piggyback a PDU connection request message on an attach request message, and even if the PDU connection request message is not transferred together in the case where the access type of the attach request message is for the subscription, the terminal may proceed with a session creation process for making the PDU connection for the SIM provisioning.

The CP function 2g-200 that has received a PDU connection creation request selects a suitable UP function in order to send a create session request message. In this case, the CP function may select the UP function in consideration of the SIM provisioning, or may select a suitable network slice and select a suitable UP function 2g-300 of the selected network slice.

The CP function 2g-200 transmits a create session request message to a suitable UP function 2g-300 (2g-012). The create session request message may include an address of a SM-DS server or an address of a SM-DP+ server that is received at operation 2g-007e. Further, the create session request message may include an address of a SM-DS server or an address of a SM-DP+ server that is received from the terminal 2g-100. The create session request message may also include an indication capable of notifying of the request for the SIM provisioning. Then, the UP function selects a GW for the SIM provisioning, and allocates an IP address thereto. In this case, the PDU connection may be configured so that the terminal can attach only to an address of a SM-DP+ server for provisioning, an address of a SM-DS server for searching for the SM-DP+, an address of a DNS server, and an address of a subscription portal so that the terminal can use the same only for the purpose of traffic for the SIM provisioning (2g-013). For example, an uplink/downlink packet filter of a packet filter may be configured so that communication becomes possible only in the case where an address for specific provisioning (e.g., an address of the SM-DP+ server for provisioning, an address of the SM-DS server for searching for the SM-DP+, an address of a DNS server, or an address of a subscription portal) is included as a destination/source IP address.

In the process of configuring the uplink/downlink packet filter, an IP address to be used for specific filtering may be determined on the basis of the address of the SM-DS server or the address of the SM-DP+ server that is received from the terminal 2g-100, or the address of the SM-DS server or the address of the SM-DP+ server that is transferred through operations 2g-007e and 2g-012, or an address that is serviced by the terminal 2g-100 may be used for authorization.

Further, in the case of attempting an attach to another address other than the above-described address, a redirection rule may be set in the UP function so as to redirect the attach to the subscription portal. The UP function may transfer a response to the CP function, and may transfer a PDU connection response message up to the terminal 2g-100. In this case, address information of the subscription portal to which the terminal 2g-100 should attach for subscription may be transferred together up to the terminal.

Thereafter, like operation 2g-017, the terminal selects and subscribes to a desired subscription plan through attaching to the subscription portal using the acquired PUD connectivity. In this case, the terminal 2g-100 may transfer EID information to the subscription portal, or may transfer the EID information through encrypted transmission in order to safely transfer the EID information.

On the other hand, a subscription portal 2g-700 transfers selected subscription plan information to the user data repository 2g-500. For example, activated plan information and an identifier (e.g., IMSI or the like) that is allocated to a SIM of the terminal 2g-100 may be included in the user data repository 2g-500. Further, the subscription portal transfers to the SM-DP+ 2g-600 a message for notifying the SM-DP+ 2g-600 having the SIM profile for the EID of the subscription of the corresponding EID that the corresponding EID has been subscribed (2g-019). For example, the message may include ID information of the eUICC of the terminal 2g-100, or may include an Integrated Circuit Card Identifier (ICCID) that is information on the corresponding profile.

Further, the SM-DP+ that has received the transferred message transfers to the SM-DS information that it has its own EID and the corresponding profile, so that the terminal 2g-100 can search for a provisioning server that corresponds to the ID value of the eUICC thereof (2g-020). For example, the SM-DP+ may transfer the EID value to the SM-DS. Further, the SM-DP+ may also transfer the ICCID that is profile information on the EID.

On the other hand, if the subscription portal completes the operations 2g-018 and 2g-019 with respect to the user data repository and the SM-DP+, it may notify the terminal 2e-100 that the SIM profile provisioning has been prepared (2g-021). A notification message that is sent at this time may include address information of the SM-DP+ to which the terminal 2g-100 can attach to receive the SIM profile provisioning. Further, the notification message may also include address information of the SM-DS that can notify of the address information of the SM-DP+ having the SIM profile for the eUICC of the terminal 2g-100. Further, the terminal 2g-100 may receive the SIM profile provisioning through attaching to the corresponding SM-DP+ (2g-022).

However, if the terminal 2g-100 attempts an attach to an address other than the address that is permitted so that the terminal can use the address only for the purpose of traffic for the SIM provisioning, the attach may be redirected to the subscription portal (2g-016).

On the other hand, if the SIM provisioning is delayed for a predetermined time or the SIM provisioning has failed, the terminal 2g-100 may add an ID of the currently attached PLMN to a forbidden PLMN list for initial provisioning, and then may perform detach and attach request processes in order (2g-023). If the provisioning of the SIM profile has been successfully performed, the terminal 2g-100 may perform a detach process for the attach using the downloaded SIM profile (2g-024). After selecting the downloaded SIM profile, the terminal may perform an attach process to use a data service (2g-025). Instead of performing operations 2g-024 and 2g-025, the terminal may not perform the detach process, but may select the downloaded SIM profile, and then may update the existing attach information to use a normal data service.

Figure 3A:
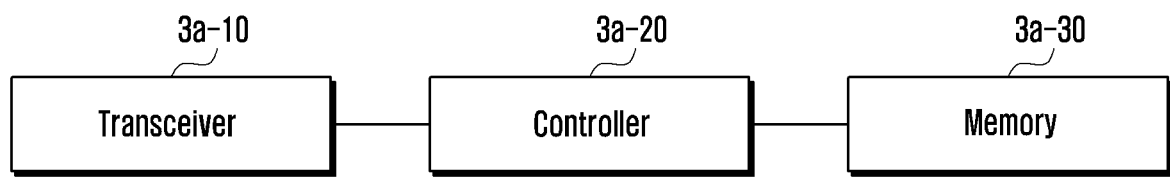
FIG. 3A is a diagram illustrating the structure of a terminal according to an embodiment of the present disclosure.

FIG. 3A is a diagram illustrating the structure of a terminal according to an embodiment of the present disclosure.

Referring to FIG. 3A, a terminal may include a transceiver unit 3a-10, a controller 3a-20, and a storage unit 3a-30. The controller according to the present disclosure may be defined as a circuit, an application specific integrated circuit, or at least one processor.

The transceiver unit 3a-10 may transmit and receive signals with another network entity. The transceiver unit 3a-10 may transmit and receive signals under the control of the controller 3a-20.

The controller 3a-20 may control the whole operation of the terminal according to an embodiment proposed in the present disclosure. The controller 3a-20 may control the operation of the terminal according to the first and second embodiments of the present disclosure. For example, the controller 3a-20 may control the operation of the terminal as described above with reference to FIGS. 1A to 2G.

According to an embodiment of the present disclosure, the controller 3a-20 may operate to check whether there is a profile for a Universal Integrated Circulated Card (UICC) of the terminal, to transmit an attach request message that includes identification information of the UICC to a Public Land Mobile Network (PLMN) that is selected by the terminal if there is no profile, and to receive an attach response message. The attach request message may include attach request type information, and the attach request type information may indicate initial provisioning. Further, the attach response message may include an active default bearer context request message if an attach to the selected PLMN is permitted. Further, the active default bearer context request message may include Traffic Flow Template (TFT) information for downloading the profile. Further, the TFT information may include address information of a server for downloading the profile.

The storage unit 3a-30 may store therein at least one of information that is transmitted and received through the transceiver unit 3a-10 and information that is generated through the controller 3a-20. Further, the storage unit 3a-30 may store therein information and codes for operating the controller 3a-20.

Figure 3B:
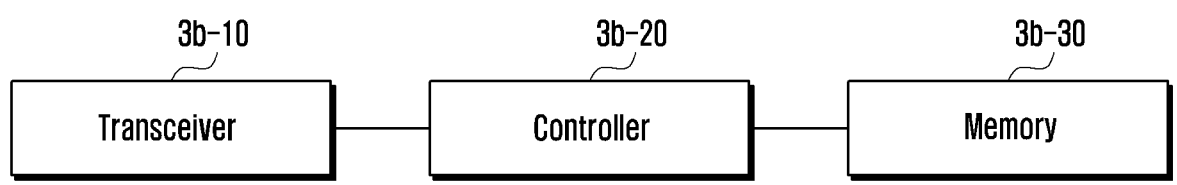
FIG. 3B is a diagram illustrating the structure of an MME according to an embodiment of the present disclosure.

FIG. 3B is a diagram illustrating the structure of an MME according to an embodiment of the present disclosure. The structure of an MME may be applied to the structure of a control function in the case where it is applied to a New Radio (NR) system. In the case of the control function, it may include an SM function entity and an MM function entity, and each function may include a transceiver unit and a controller.

Referring to FIG. 3B, the MME may include a transceiver unit 3b-10, a controller 3b-20, and a storage unit 3b-30. The controller according to the present disclosure may be defined as a circuit, an application specific integrated circuit, or at least one processor.

The transceiver unit 3b-10 may transmit and receive signals with another network entity. The transceiver unit 3b-10 may transmit and receive signals under the control of the controller 3b-20.

The controller 3b-20 may control the whole operation of the MME according to an embodiment proposed in the present disclosure. The controller 3b-20 may control the operation of the MME or the control function according to the first and second embodiments of the present disclosure. For example, the controller 3b-20 may control the operation of the MME or the control function as described above with reference to FIGS. 1A to 2G.

The storage unit 3b-30 may store therein at least one of information that is transmitted and received through the transceiver unit 3b-10 and information that is generated through the controller 3b-20. Further, the storage unit 3b-30 may store therein information and codes for operating the controller 3b-20.

Figure 3C:
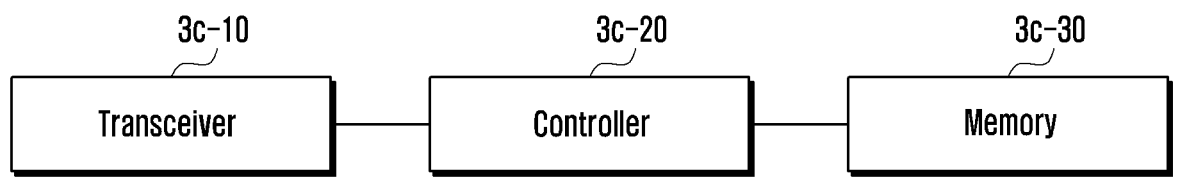
FIG. 3C is a diagram illustrating the structure of a GW according to an embodiment of the present disclosure.

FIG. 3C is a diagram illustrating the structure of a GW according to an embodiment of the present disclosure.

Referring to FIG. 3C, a GW may include a transceiver unit 3c-10, a controller 3c-20, and a storage unit 3c-30. The controller according to the present disclosure may be defined as a circuit, an application specific integrated circuit, or at least one processor.

The transceiver unit 3c-10 may transmit and receive signals with another network entity. The transceiver unit 3c-10 may transmit and receive signals under the control of the controller 3c-20.

The controller 3c-20 may control the whole operation of the GW according to an embodiment proposed in the present disclosure. The controller 3c-20 may control the operation of the terminal according to the first and second embodiments of the present disclosure. For example, the controller 3c-20 may control the operation of the GW as described above with reference to FIGS. 1A to 2G.

According to an embodiment of the present disclosure, the controller 3c-20 may operate to receive from a terminal an attach request message that includes identification information of a Universal Integrated Circulated Card (UICC) of the terminal, to transmit to an Equipment Identity Register (EIR) a message for requesting to check whether to permit an attach of the UICC with respect to a Public Land Mobile Network (PLMN) that is selected by the terminal, to receive from the EIR a message that includes information on whether to permit the attach of the UICC, and to transmit an attach response message to the terminal on the basis of the information on whether to permit the attach of the UICC. Further, the storage unit 3c-30 may store therein at least one of information that is transmitted and received through the transceiver unit 3c-10 and information that is generated through the controller 3c-20. Further, the attach request message may include attach request type information, and the attach request type information may indicate initial provisioning. Further, the controller 3c-20 may operate to omit an authentication process for the terminal and to select a gateway for downloading a profile if the attach request type information indicates the initial provisioning and information that indicates attach permission of the UICC is received from the EIR. Further, the attach response message may include an active default bearer context request message if the information that indicates the attach permission of the UICC is received. Further, the active default bearer context request message may include Traffic Flow Template (TFT) information for the profile download.

The storage unit 3c-30 may store therein information and codes for operating the controller 3c-20.

Figure 3D:
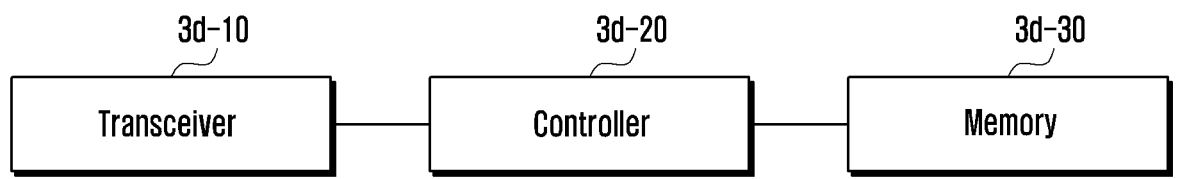
FIG. 3D is a diagram illustrating the structure of an UP function according to an embodiment of the present disclosure.

FIG. 3D is a diagram illustrating the structure of an UP function according to an embodiment of the present disclosure.

Referring to FIG. 3D, the MME may include a transceiver unit 3d-10, a controller 3d-20, and a storage unit 3d-30. The controller according to the present disclosure may be defined as a circuit, an application specific integrated circuit, or at least one processor.

The transceiver unit 3d-10 may transmit and receive signals with another network entity. The transceiver unit 3d-10 may transmit and receive signals under the control of the controller 3d-20.

The controller 3d-20 may control the whole operation of the UP function according to an embodiment proposed in the present disclosure. The controller 3d-20 may control the operation of the UP function according to the first and second embodiments of the present disclosure. For example, the controller 3d-20 may control the operation of the UP function as described above with reference to FIGS. 1A to 2G.

The storage unit 3d-30 may store therein at least one of information that is transmitted and received through the transceiver unit 3d-10 and information that is generated through the controller 3d-20. Further, the storage unit 3d-30 may store therein information and codes for operating the controller 3d-20.

In the detailed embodiments of the present disclosure as described above, the constituent elements included in the present disclosure are described as singular expressions or plural expressions in accordance with the presented embodiments. However, the singular or plural expressions are selected to suit the presented situations for convenience in explanation, and thus the present disclosure is not limited to such singular or plural constituent elements. Even the constituent elements that are expressed by plural expressions may correspond to a singular constituent element, while even the constituent element that is expressed by singular expressions may correspond to plural constituent elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for downloading a profile by a terminal in a wireless communication system, the method comprising:
   identifying whether a profile for a universal integrated circuit card (UICC) of the terminal is stored;
   transmitting, to a mobility management entity, a first message associated with an attach request in case that the profile is not stored in the terminal, the first message including attach type information indicating an initial provisioning and an identity for the terminal;
   receiving, from the mobility management entity, a second message as a response to the first message in case that the terminal is permitted to download the profile based on the identity for the terminal, the second message including information associated with a default bearer for the initial provisioning; and
   downloading the profile based on the information associated with the default bearer for the initial provisioning,
   wherein an authentication procedure is not performed with the mobility management entity in case that the first message includes the attach type information indicating the initial provisioning.

2. The method of claim 1, wherein the identity for the terminal includes an international mobile station equipment identity (IMEI).

3. The method of claim 1, wherein a public land mobile network (PLMN) is selected from an available PLMN list for initial provisioning, and
   wherein the mobility management entity is determined based on the selected PLMN.

4. The method of claim 1, wherein the information associated with the default bearer for the initial provisioning comprises traffic flow template (TFT) information associated with a packet filter for downloading the profile.

5. The method of claim 1, wherein the information associated with the default bearer is associated with at least one of a subscription manager discovery service (SM-DS) or a subscription manager data preparation plus (SM-DP+).

6. A terminal for downloading a profile in a wireless communication system, the terminal comprising:
   a transceiver; and
   a controller configured to:
      identify whether a profile for a universal integrated circuit card (UICC) of the terminal is stored,
      transmit, to a mobility management entity via the transceiver, a first message associated with an attach request in case that the profile is not stored in the terminal, the first message including attach type information indicating an initial provisioning and an identity for the terminal;
      receive, from the mobility management entity via the transceiver, a second message as a response to the first message in case that the terminal is permitted to download the profile based on the identity for the terminal, the second message including information associated with a default bearer for the initial provisioning; and
      download the profile based on the information associated with the default bearer for the initial provisioning,
   wherein an authentication procedure is not performed with the mobility management entity in case that the first message includes the attach type information indicating the initial provisioning.

7. The terminal of claim 6, wherein the identity for the terminal includes an international mobile station equipment identity (IMEI).

8. The terminal of claim 6, wherein a public land mobile network (PLMN) is selected from an available PLMN list for initial provisioning, and
   wherein the mobility management entity is determined based on the selected PLMN.

9. The terminal of claim 6, wherein the information associated with the default bearer for the initial provisioning comprises traffic flow template (TFT) information associated with a packet filter for downloading the profile.

10. The terminal of claim 6, wherein the information associated with the default bearer is associated with at least one of a subscription manager discovery service (SM-DS) or a subscription manager data preparation plus (SM-DP+).

11. A method for supporting downloading of a profile by a mobility management entity in a wireless communication system, the method comprising:
    receiving, from a terminal, a first message associated with an attach request in case that the profile is not stored in the terminal, the first message including an identity for the terminal;
    identifying whether the first message includes attach type information indicating an initial provisioning;
    skipping an authentication procedure with the terminal in case that the first message includes the attach type information indicating the initial provisioning; and
    transmitting, to the terminal, a second message as a response to the first message in case that the terminal is permitted to download the profile based on the identity for the terminal.

12. The method of claim 11, wherein the identity for the terminal includes an international mobile station equipment identity (IMEI).

13. The method of claim 11, wherein a public land mobile network (PLMN) is selected from an available PLMN list for initial provisioning, and
wherein the mobility management entity is determined based on the selected PLMN.

14. The method of claim 11, wherein information associated with a default bearer for the initial provisioning comprises traffic flow template (TFT) information associated with a packet filter for downloading the profile.

15. The method of claim 14, wherein the information associated with the default bearer is associated with at least one of a subscription manager discovery service (SM-DS) or a subscription manager data preparation plus (SM-DP+).

16. A mobility management entity for supporting a profile download in a wireless communication system, the mobility management entity comprising:
a transceiver; and
a controller configured to:
receive, from a terminal via the transceiver, a first message associated with an attach request in case that a profile is not stored in the terminal, the first message including an identity for the terminal,
identify whether the first message includes attach type information indicating an initial provisioning,
skip an authentication procedure with the terminal in case that the first message includes the attach type information indicating the initial provisioning, and
transmit, to the terminal via the transceiver, a second message as a response to the first message in case that the terminal is permitted to download the profile based on the identity for the terminal.

17. The mobility management entity of claim 16, wherein the identity for the terminal includes an international mobile station equipment identity (IMEI).

18. The mobility management entity of claim 16, wherein a public land mobile network (PLMN) is selected from an available PLMN list for initial provisioning, and
wherein the mobility management entity is determined based on the selected PLMN.

19. The mobility management entity of claim 16, wherein information associated with a default bearer for the initial provisioning comprises traffic flow template (TFT) information associated with a packet filter for downloading the profile.

20. The mobility management entity of claim 19,
wherein the information associated with the default bearer is associated with at least one of a subscription manager discovery service (SM-DS) or a subscription manager data preparation plus (SM-DP+).

* * * * *